Oct. 30, 1945.　　　　E. E. WOLLER　　　　2,388,106
METHOD AND APPARATUS FOR MAKING SPRING ASSEMBLIES
Filed July 11, 1942　　　38 Sheets-Sheet 1
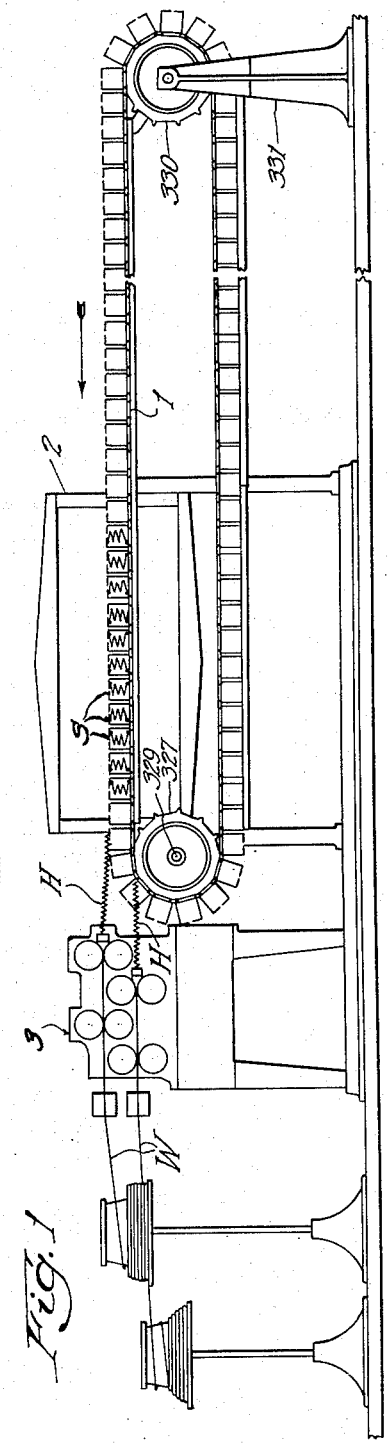
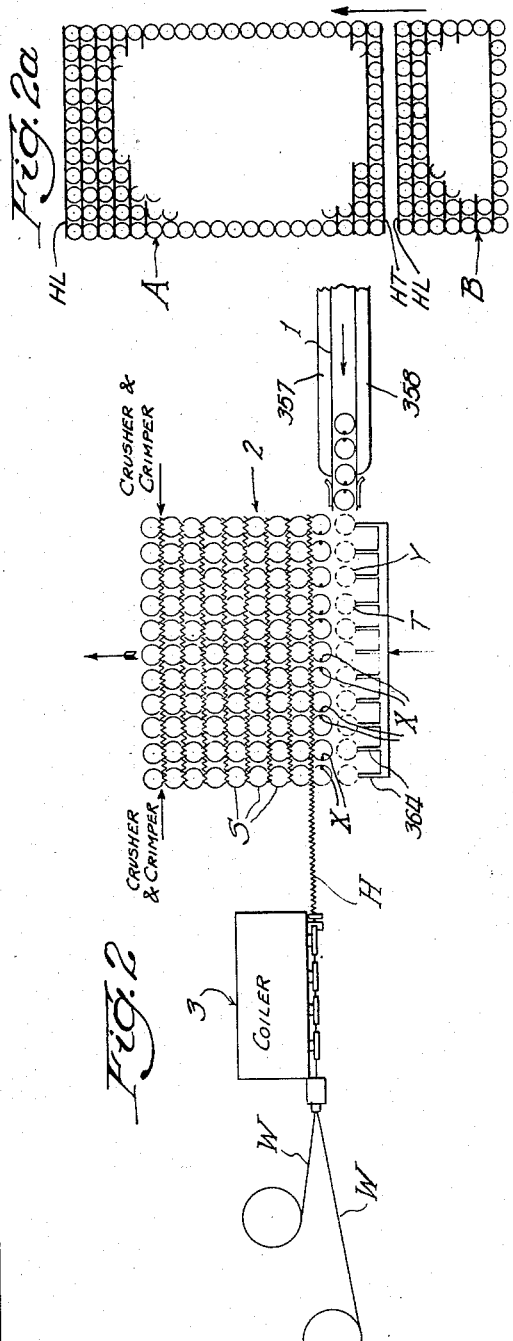
Inventor:
Edward E. Woller
By: Soans, Pond, & Anderson
Attys

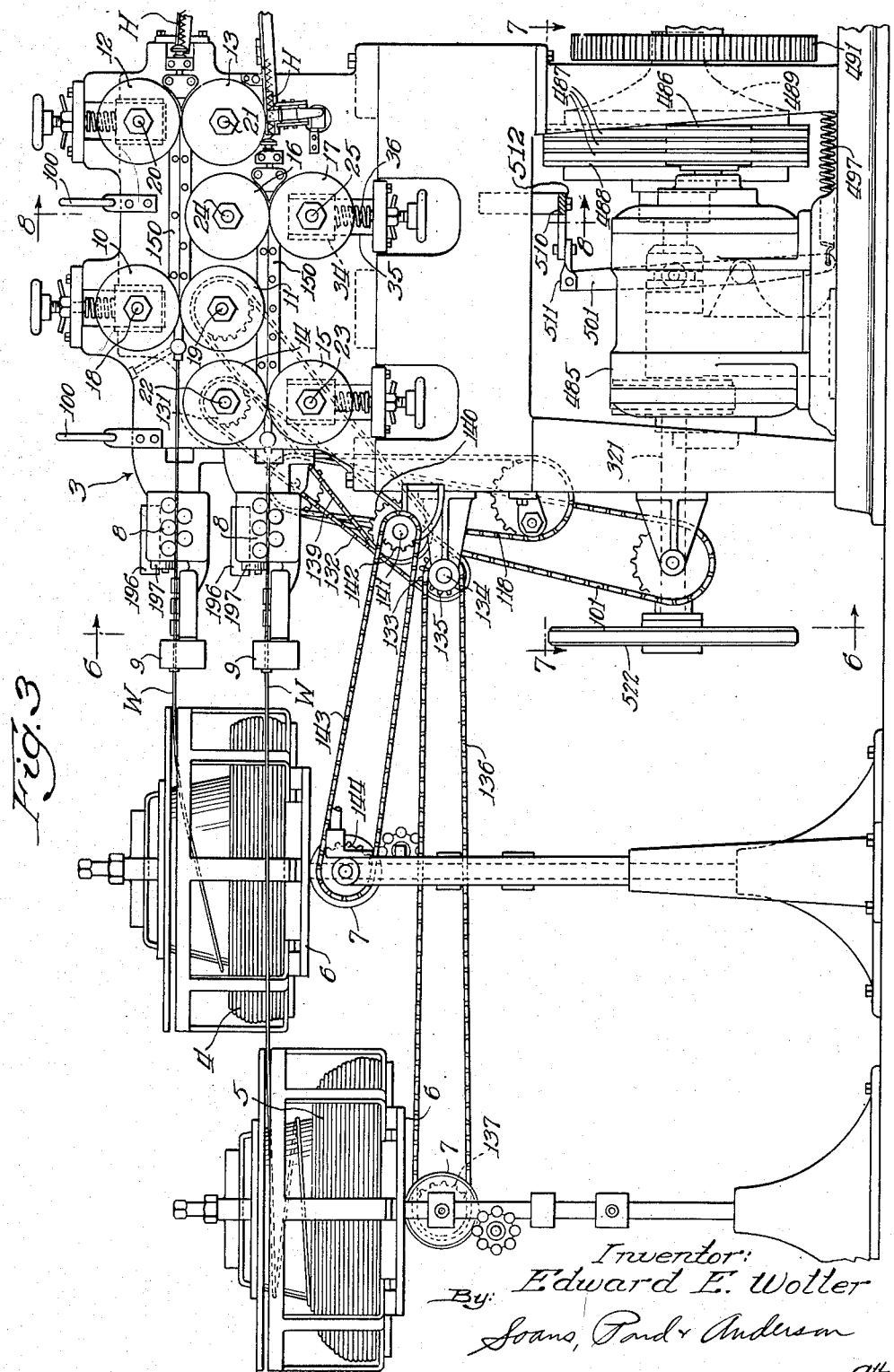

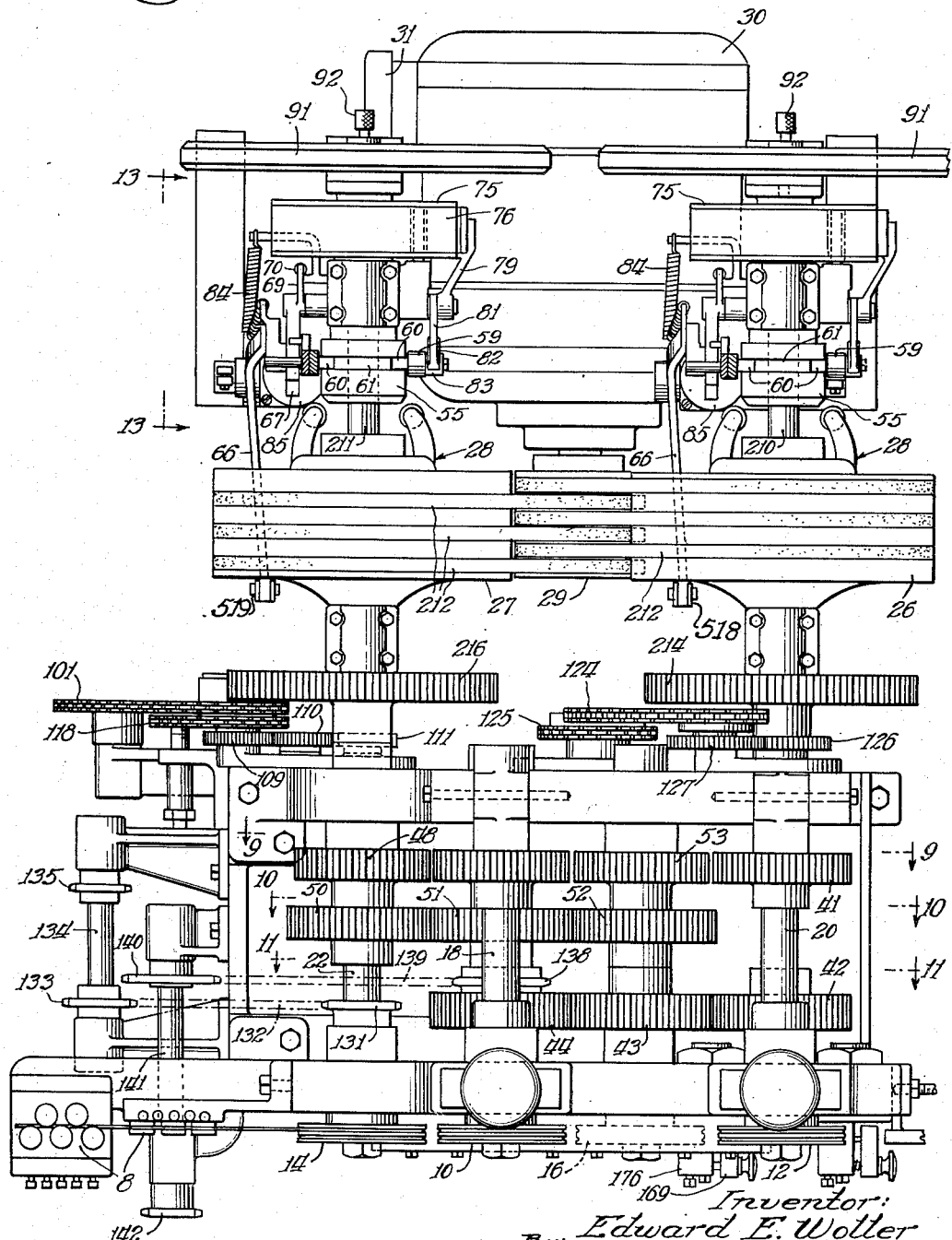

Oct. 30, 1945.  E. E. WOLLER  2,388,106
METHOD AND APPARATUS FOR MAKING SPRING ASSEMBLIES
Filed July 11, 1942  38 Sheets-Sheet 7

Inventor:
Edward E. Woller
By Soans, Pond & Anderson
Attys.

Oct. 30, 1945.  E. E. WOLLER  2,388,106
METHOD AND APPARATUS FOR MAKING SPRING ASSEMBLIES
Filed July 11, 1942  38 Sheets-Sheet 9

Inventor:
Edward E. Woller
By: Evans, Pond & Anderson
Attys.

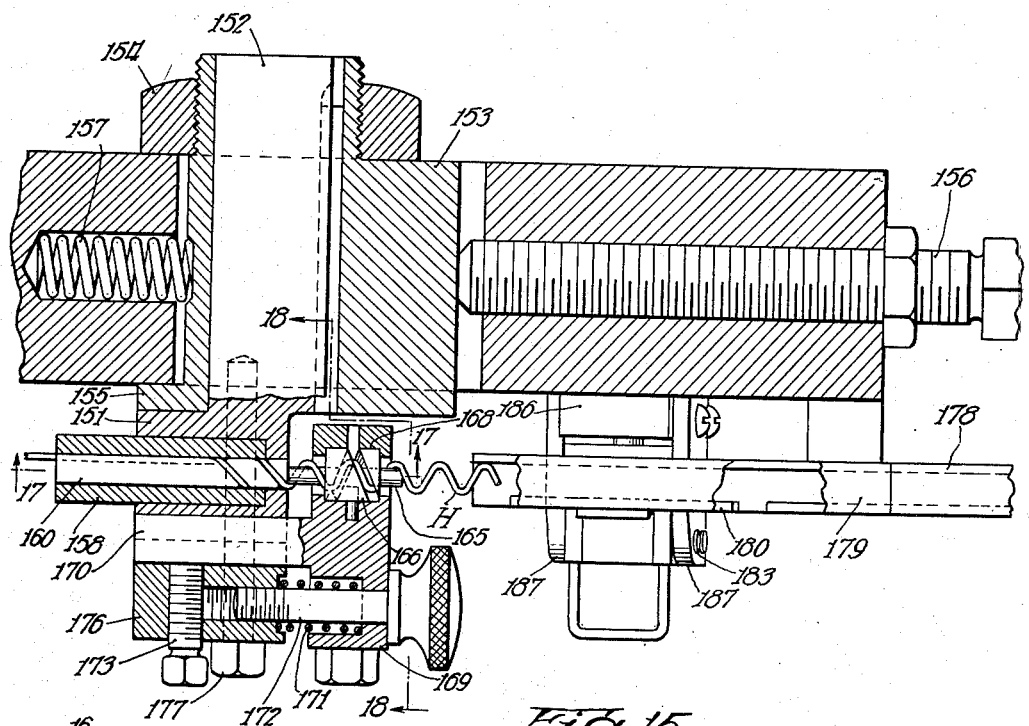

Oct. 30, 1945.  E. E. WOLLER  2,388,106
METHOD AND APPARATUS FOR MAKING SPRING ASSEMBLIES
Filed July 11, 1942  38 Sheets-Sheet 11
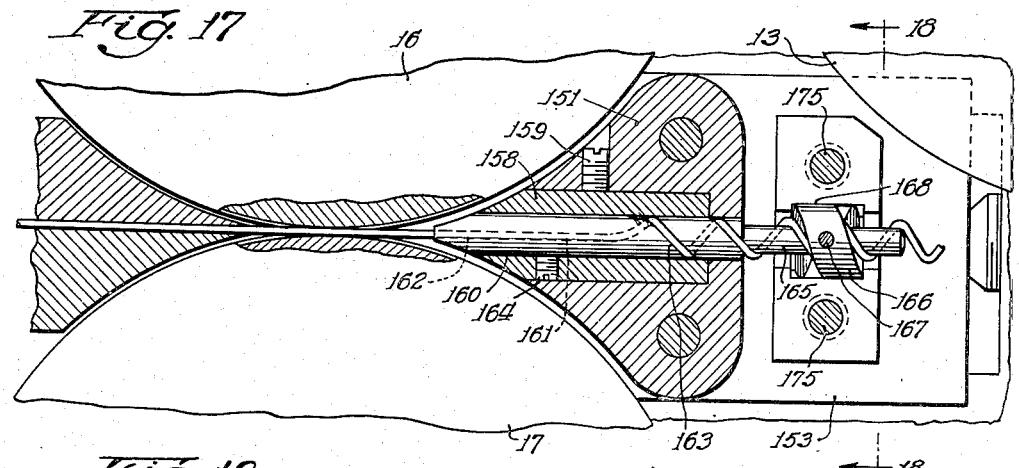
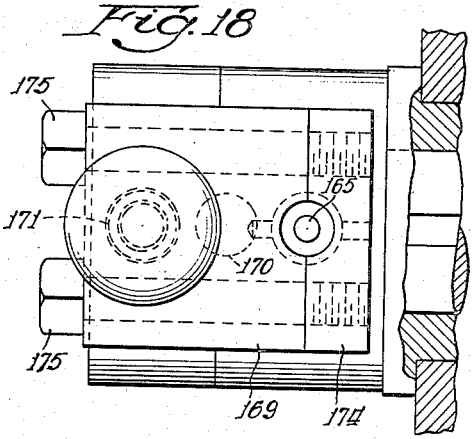
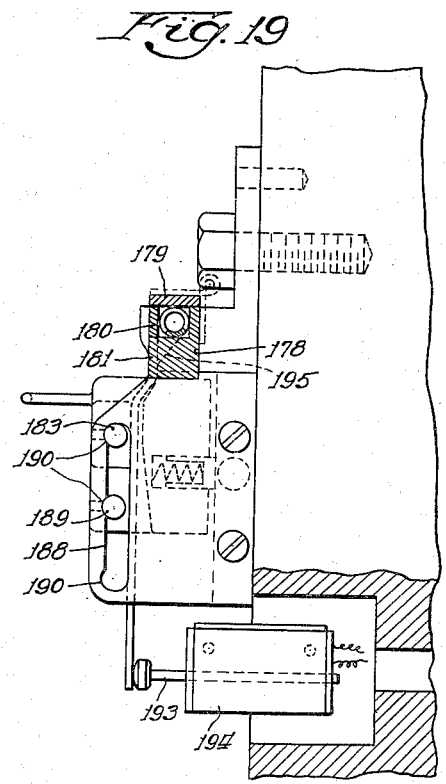
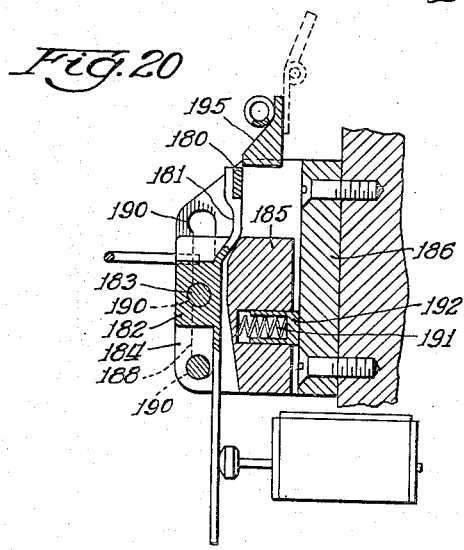
Inventor:
Edward E. Woller
By Soans, Pond & Anderson
Attys.

Oct. 30, 1945.  E. E. WOLLER  2,388,106
METHOD AND APPARATUS FOR MAKING SPRING ASSEMBLIES
Filed July 11, 1942  38 Sheets-Sheet 12
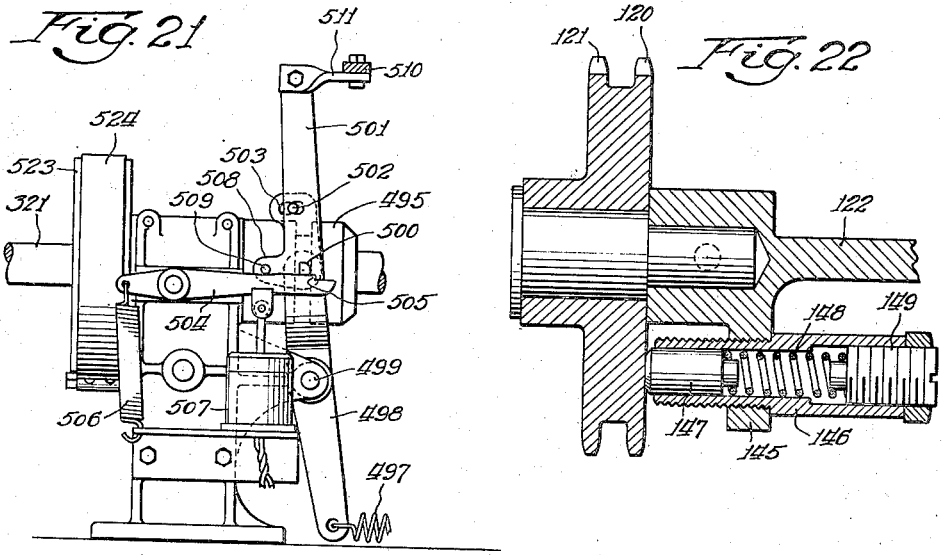
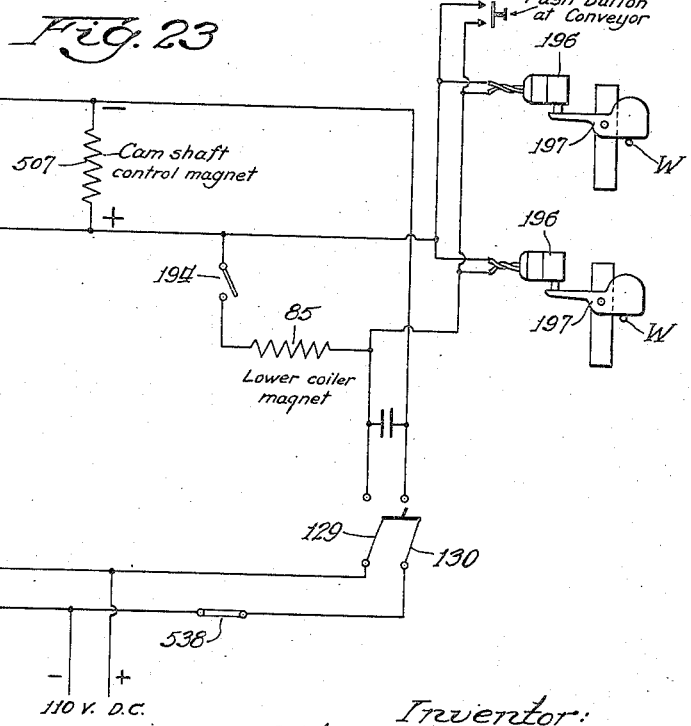
Inventor:
Edward E. Woller

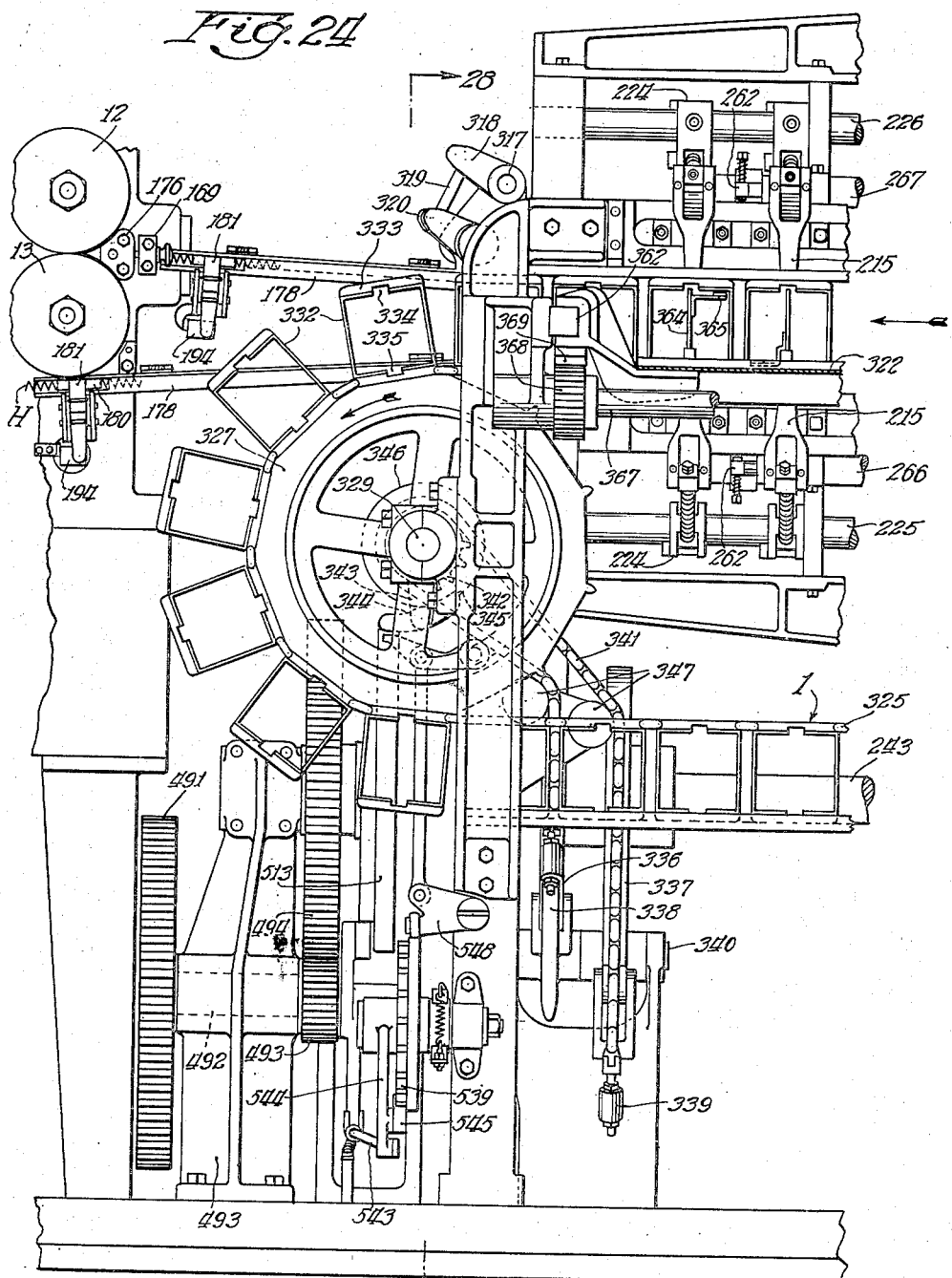

Oct. 30, 1945.  E. E. WOLLER  2,388,106
METHOD AND APPARATUS FOR MAKING SPRING ASSEMBLIES
Filed July 11, 1942  38 Sheets-Sheet 14

Inventor:
By: Edward E. Woller
Soans, Pond & Anderson
Attys

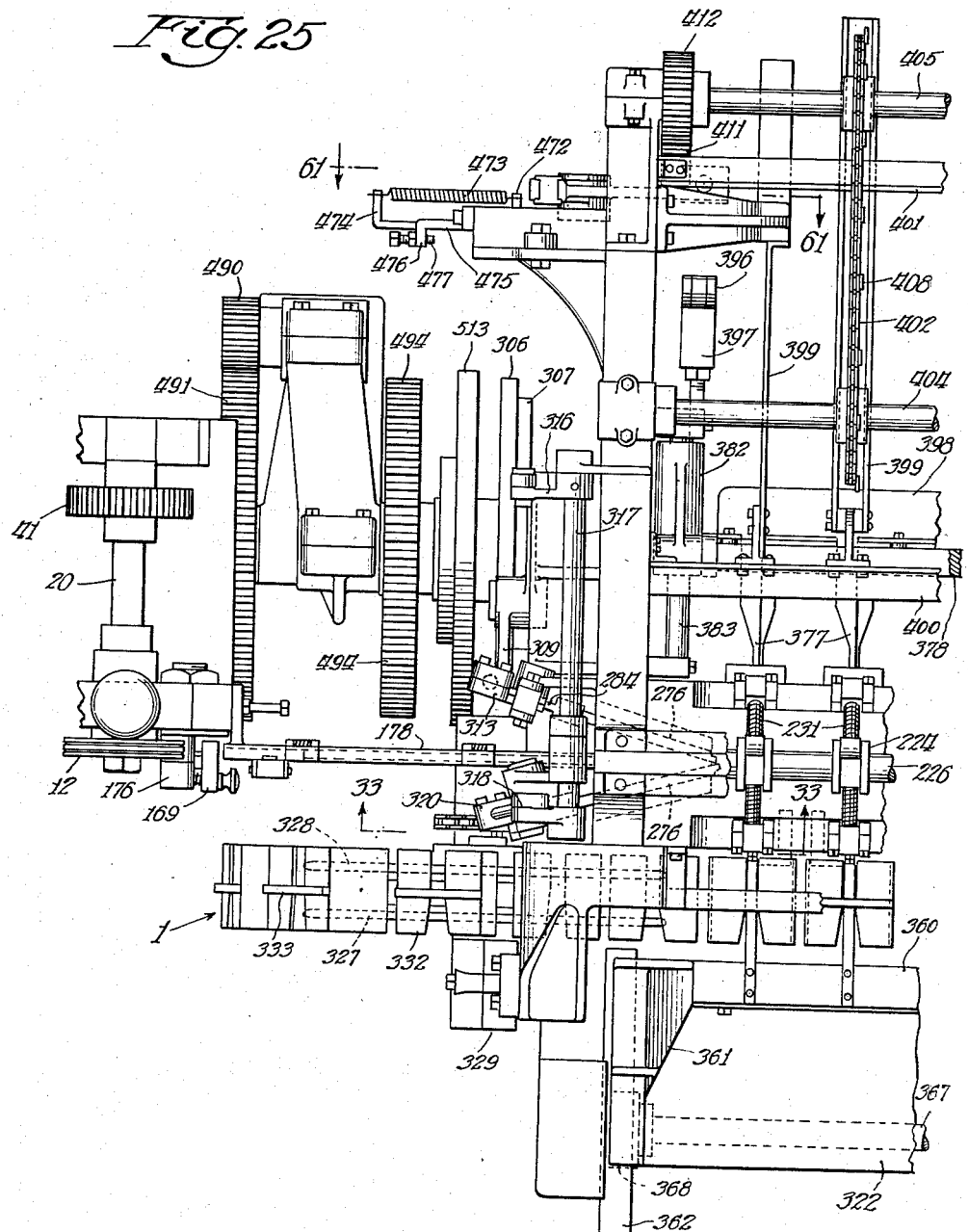

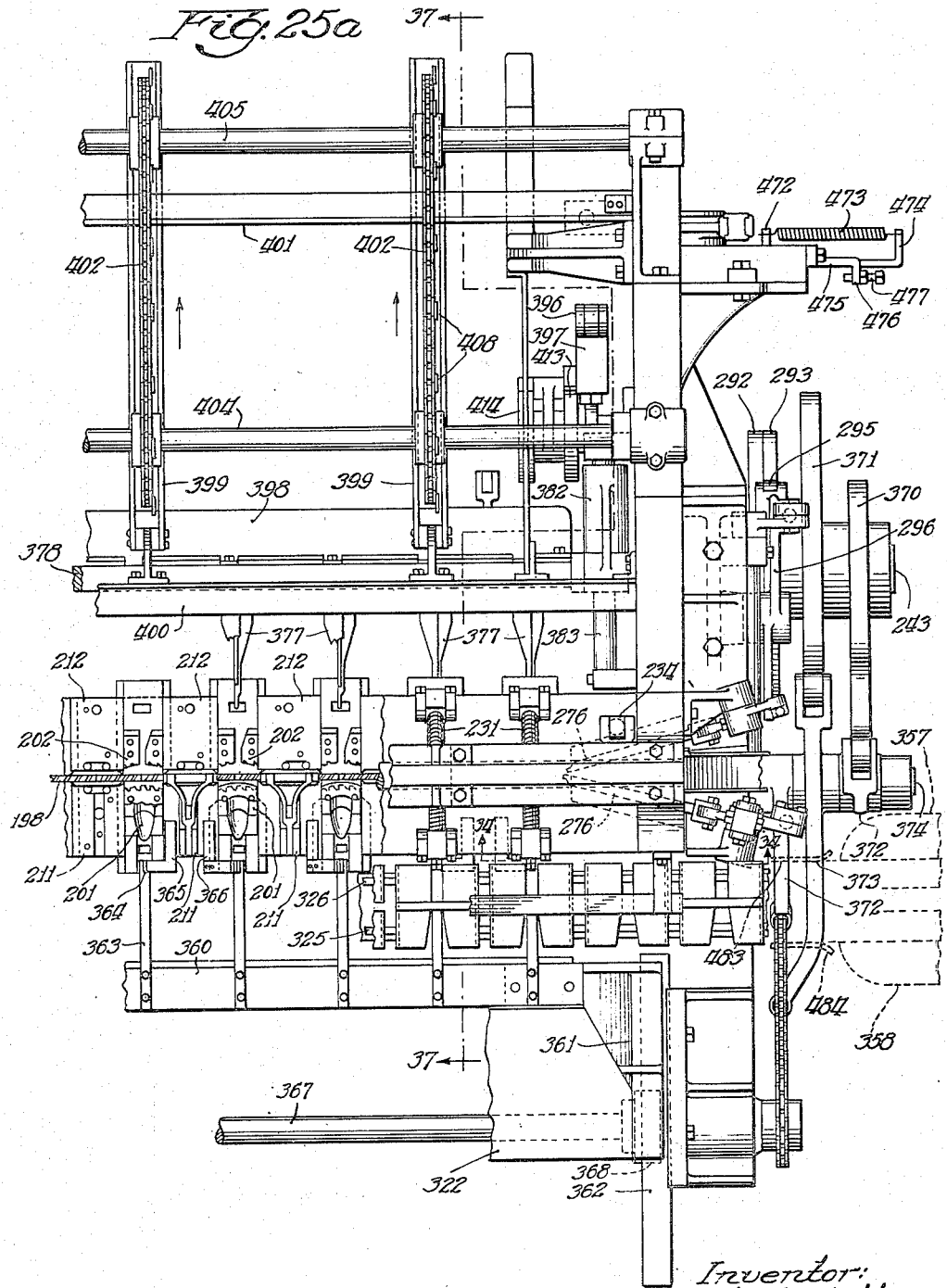

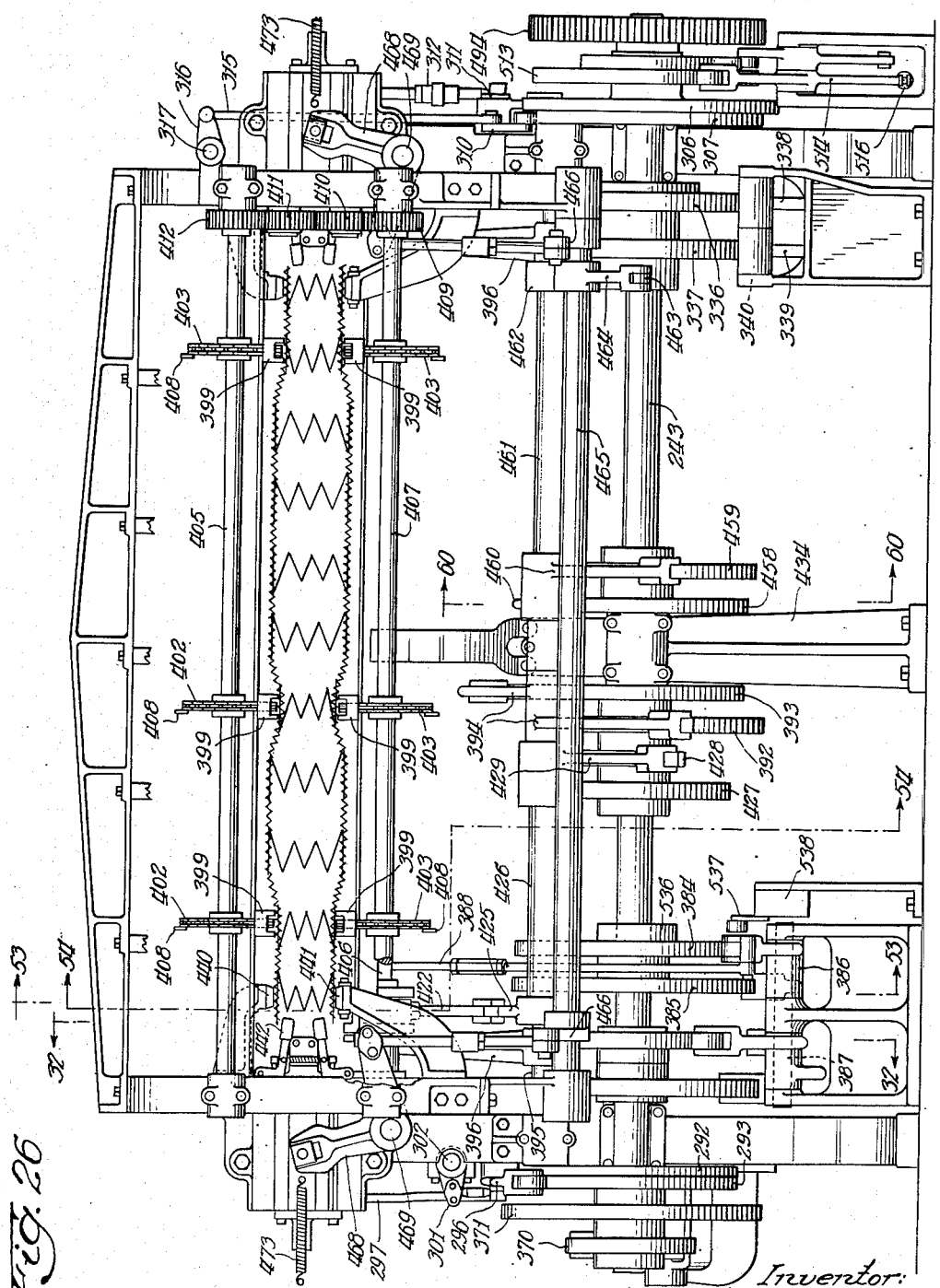

Oct. 30, 1945.  E. E. WOLLER  2,388,106
METHOD AND APPARATUS FOR MAKING SPRING ASSEMBLIES
Filed July 11, 1942  38 Sheets-Sheet 18

Inventor:
Edward E. Woller
By:
Soans, Pond & Anderson
Attys.

Oct. 30, 1945. E. E. WOLLER 2,388,106
METHOD AND APPARATUS FOR MAKING SPRING ASSEMBLIES
Filed July 11, 1942 38 Sheets-Sheet 20

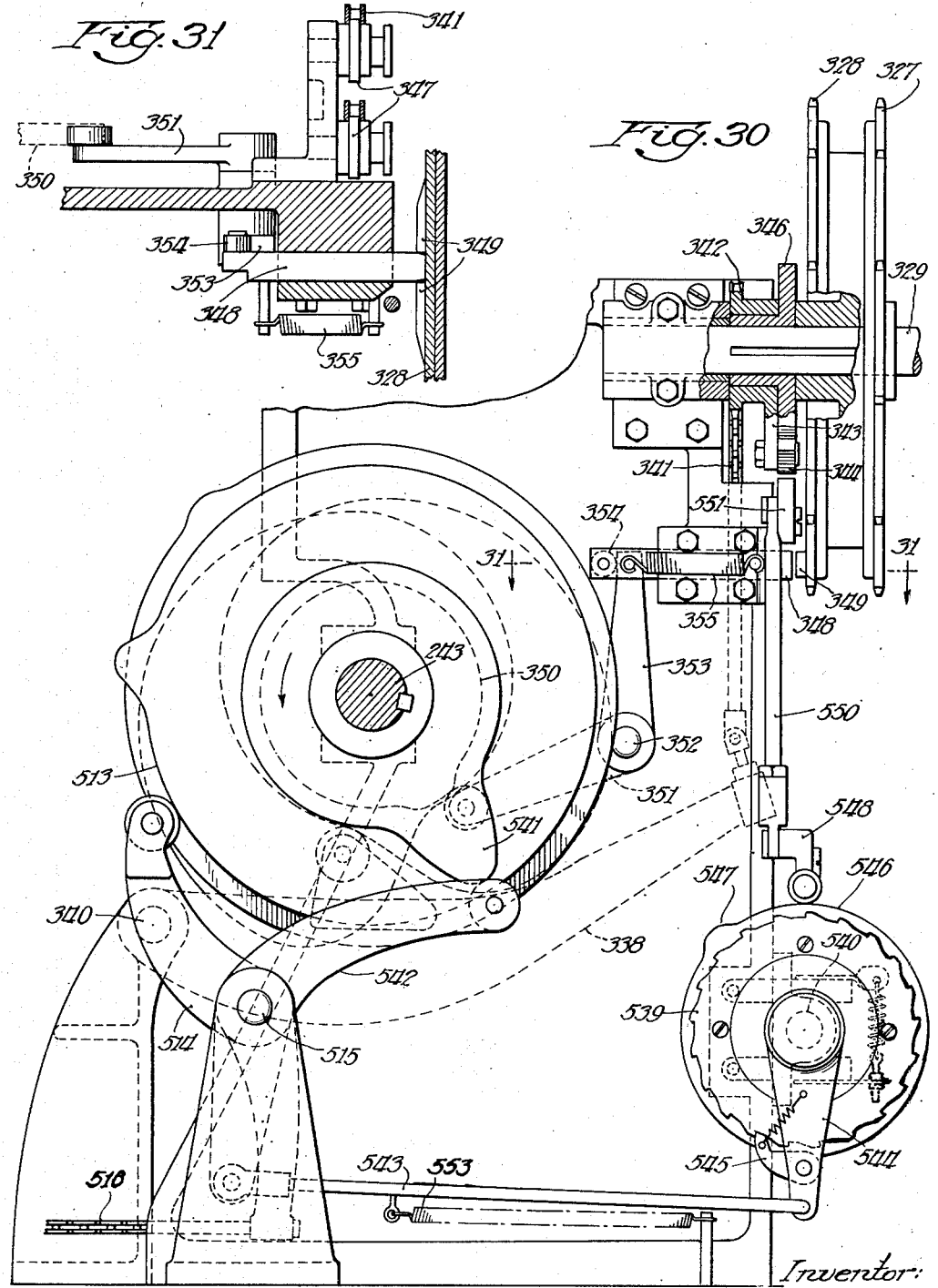

Oct. 30, 1945. E. E. WOLLER 2,388,106
METHOD AND APPARATUS FOR MAKING SPRING ASSEMBLIES
Filed July 11, 1942 38 Sheets-Sheet 25

Inventor:
Edward E. Woller
By Soans, Pond & Anderson
Attys

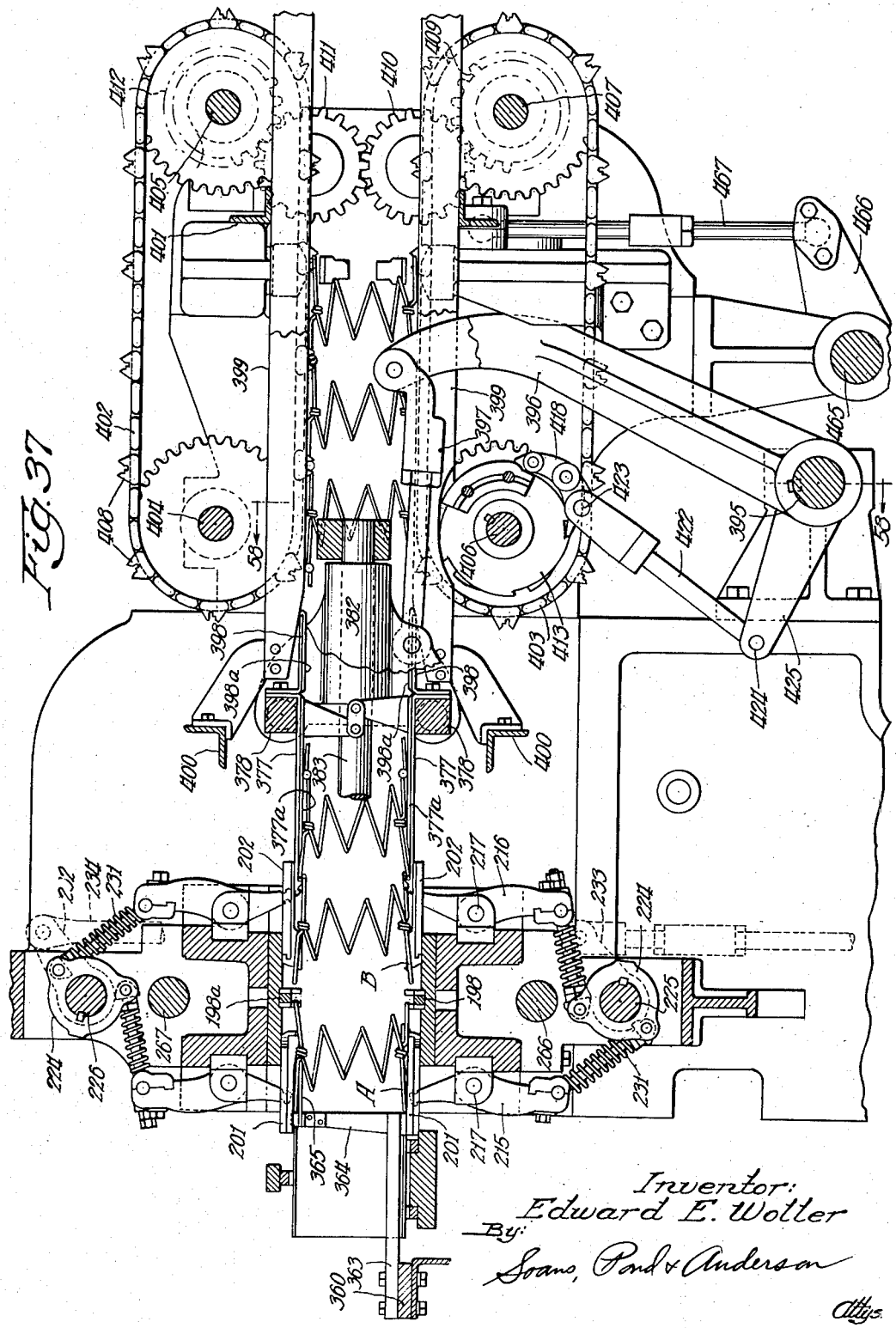

Oct. 30, 1945. E. E. WOLLER 2,388,106
METHOD AND APPARATUS FOR MAKING SPRING ASSEMBLIES
Filed July 11, 1942 38 Sheets-Sheet 27
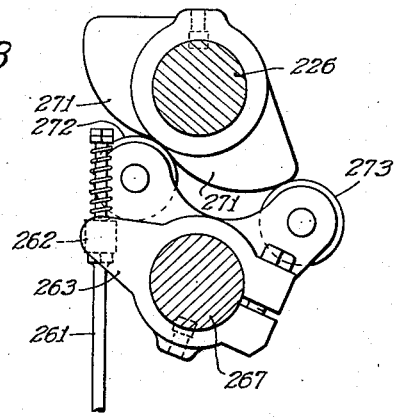
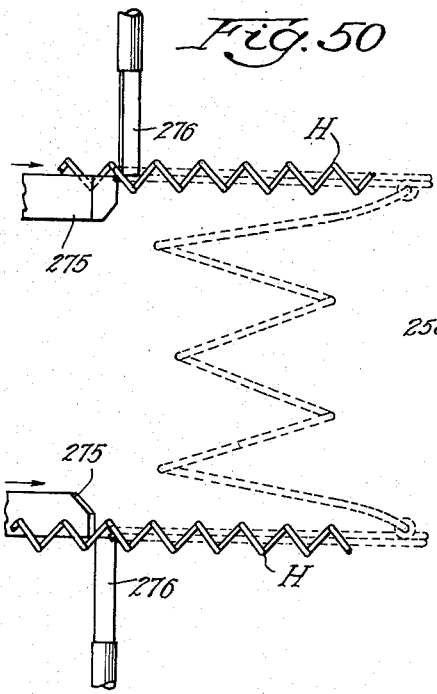
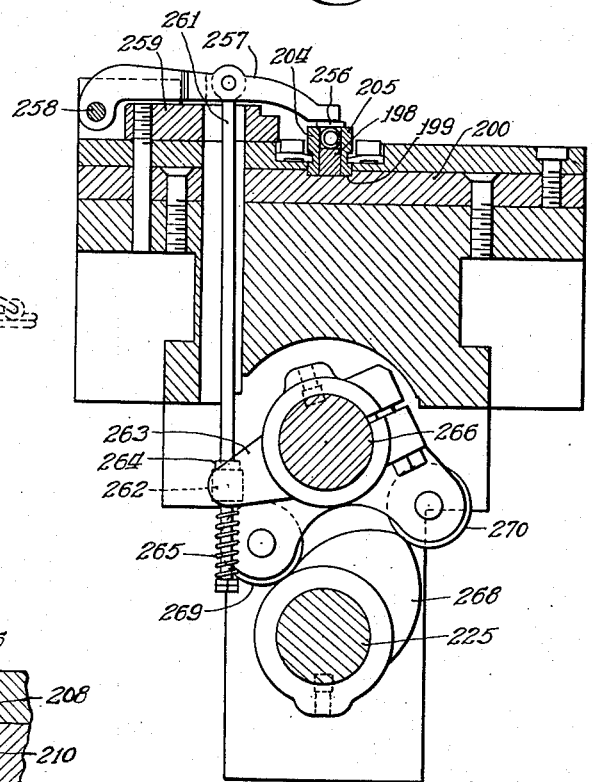
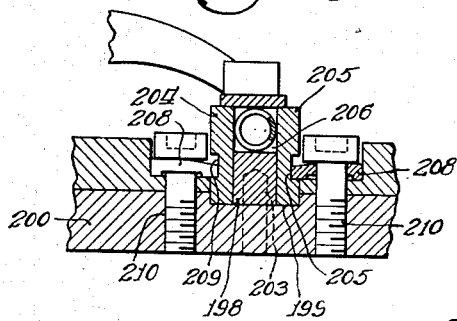
Inventor
Edward E. Woller
By: Soans, Pond & Anderson
Attys.

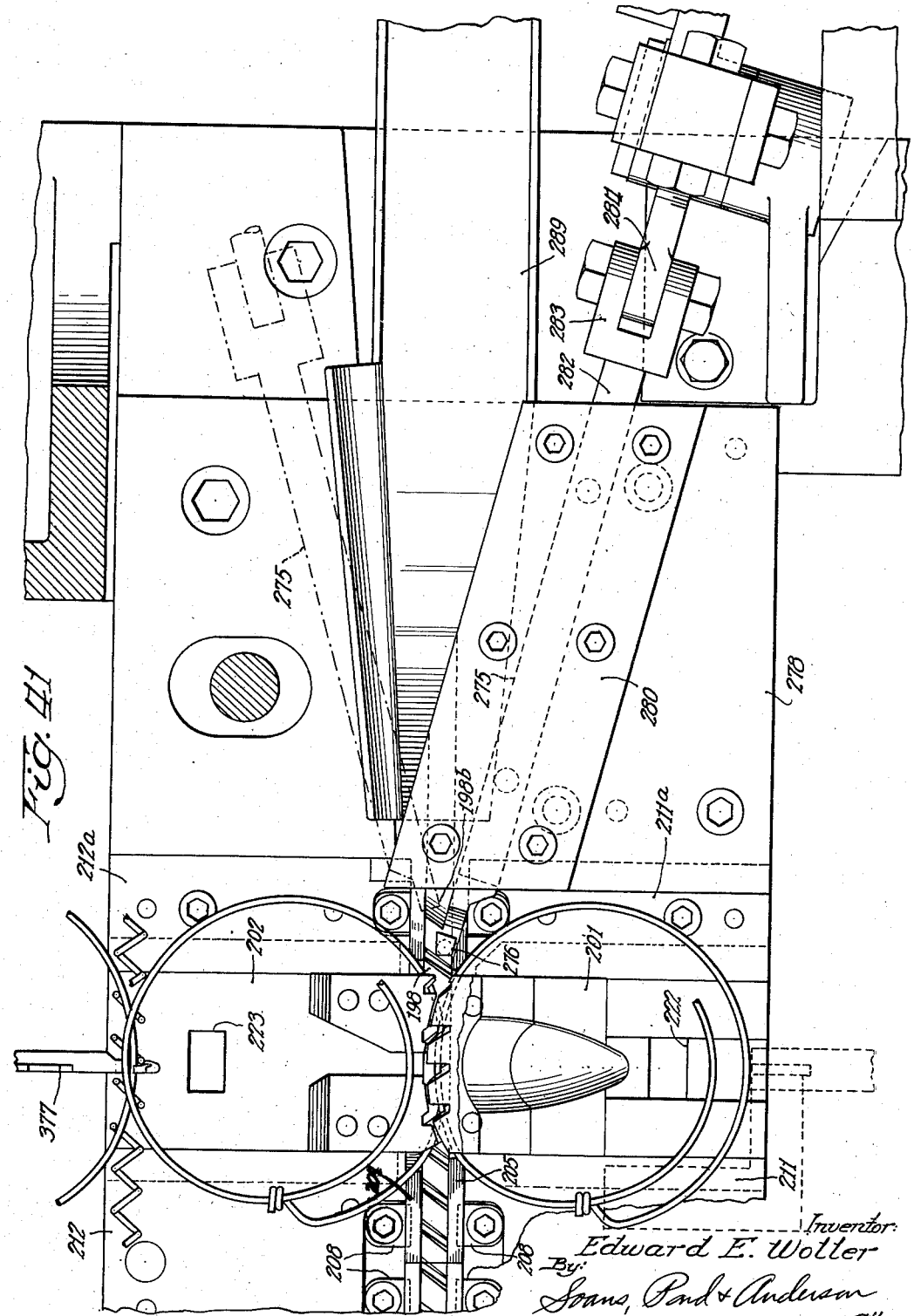

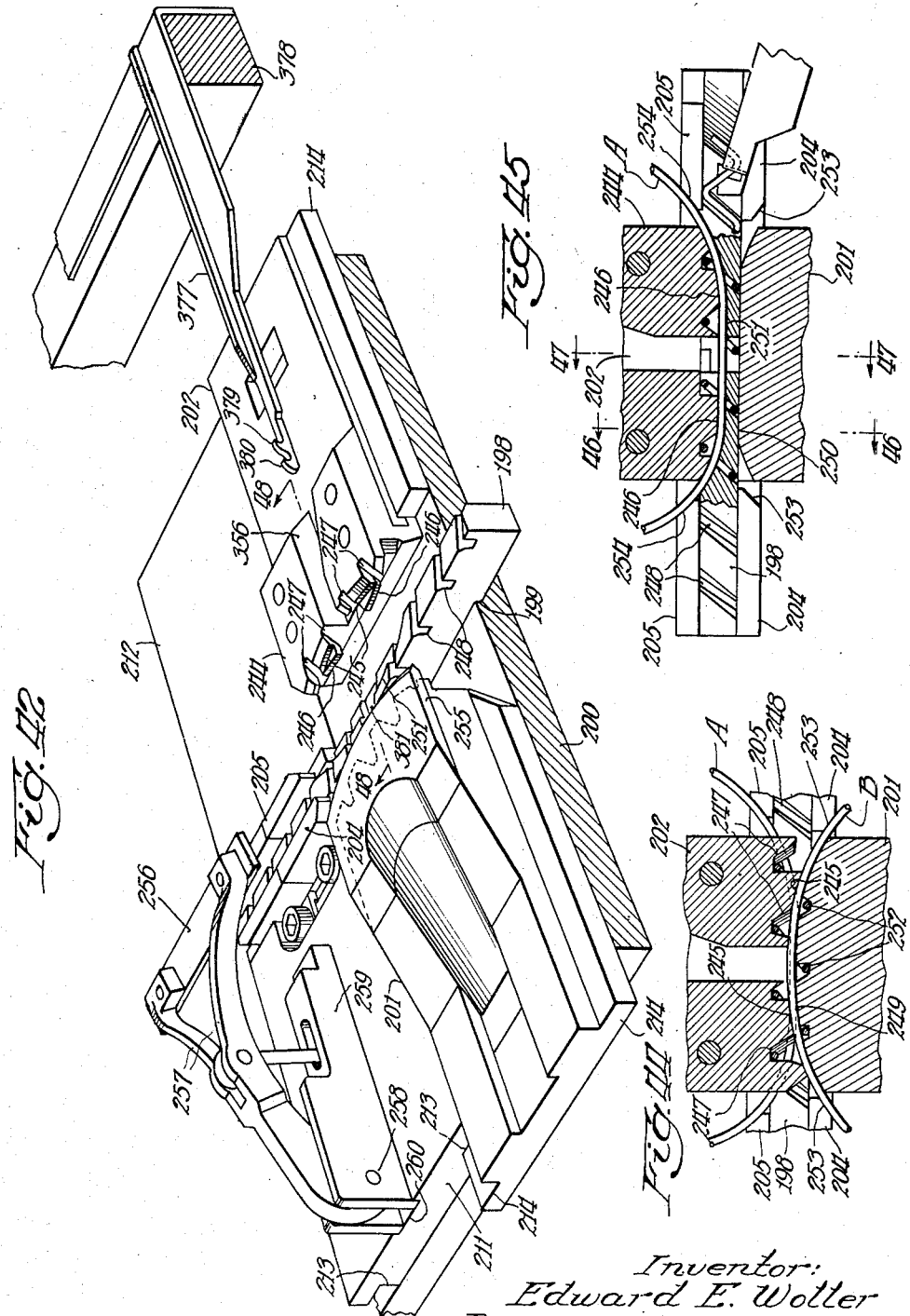

Oct. 30, 1945.  E. E. WOLLER  2,388,106
METHOD AND APPARATUS FOR MAKING SPRING ASSEMBLIES
Filed July 11, 1942
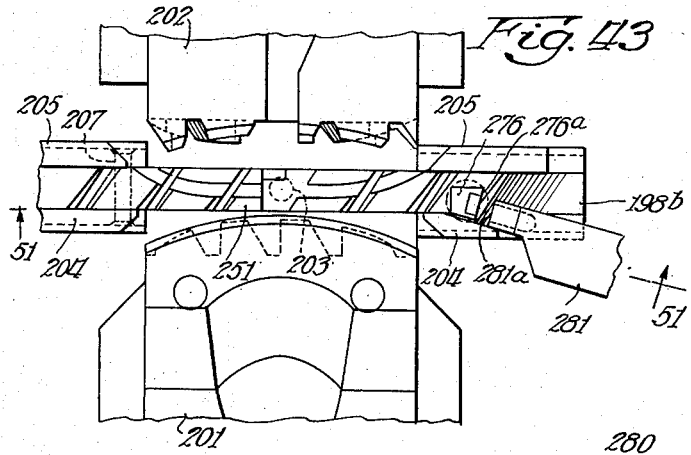
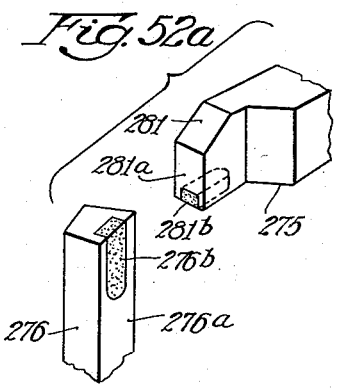
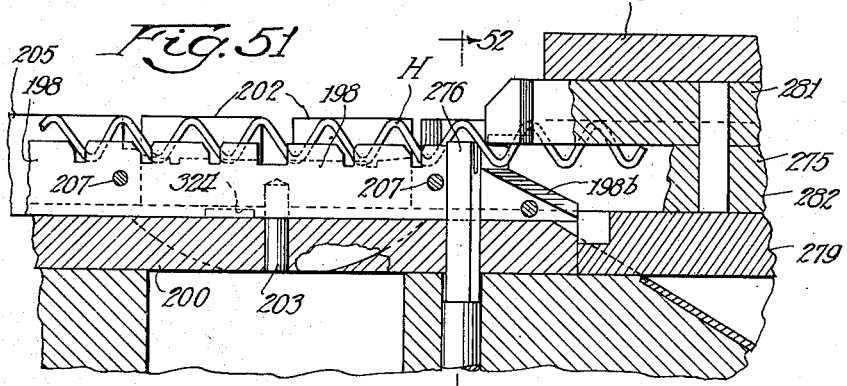
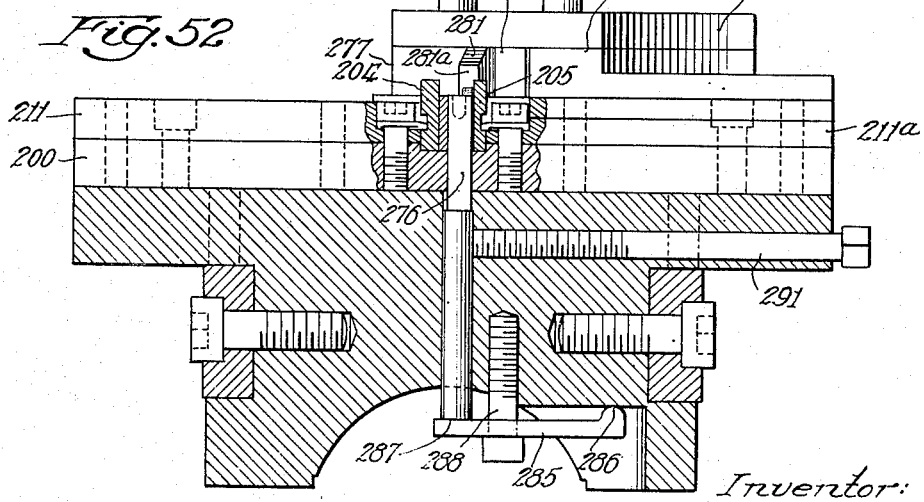
Inventor:
Edward E. Woller
By: Evans, Pond & Anderson
Attys.

Oct. 30, 1945.  E. E. WOLLER  2,388,106
METHOD AND APPARATUS FOR MAKING SPRING ASSEMBLIES
Filed July 11, 1942  38 Sheets-Sheet 31
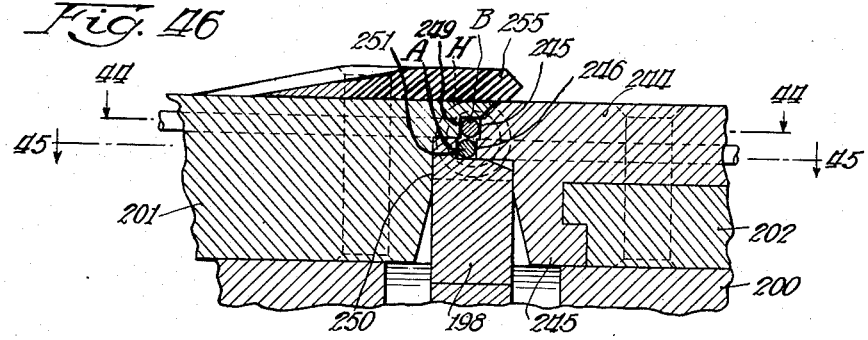
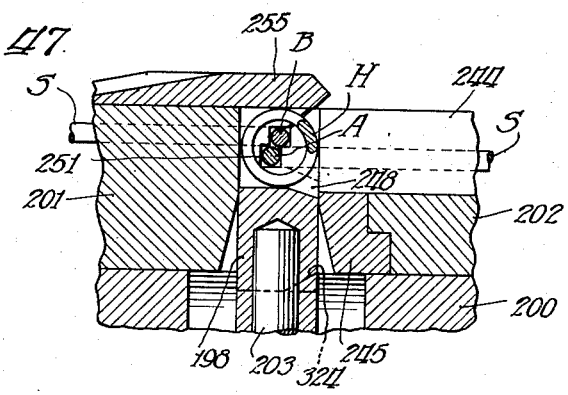
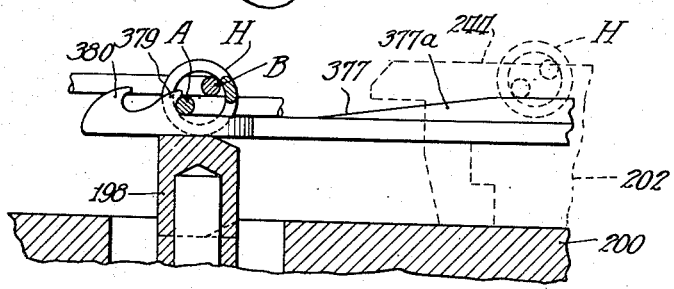
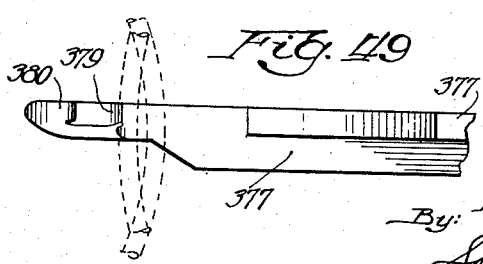
Inventor:
Edward E. Woller
By: Soans, Pond & Anderson
Attys

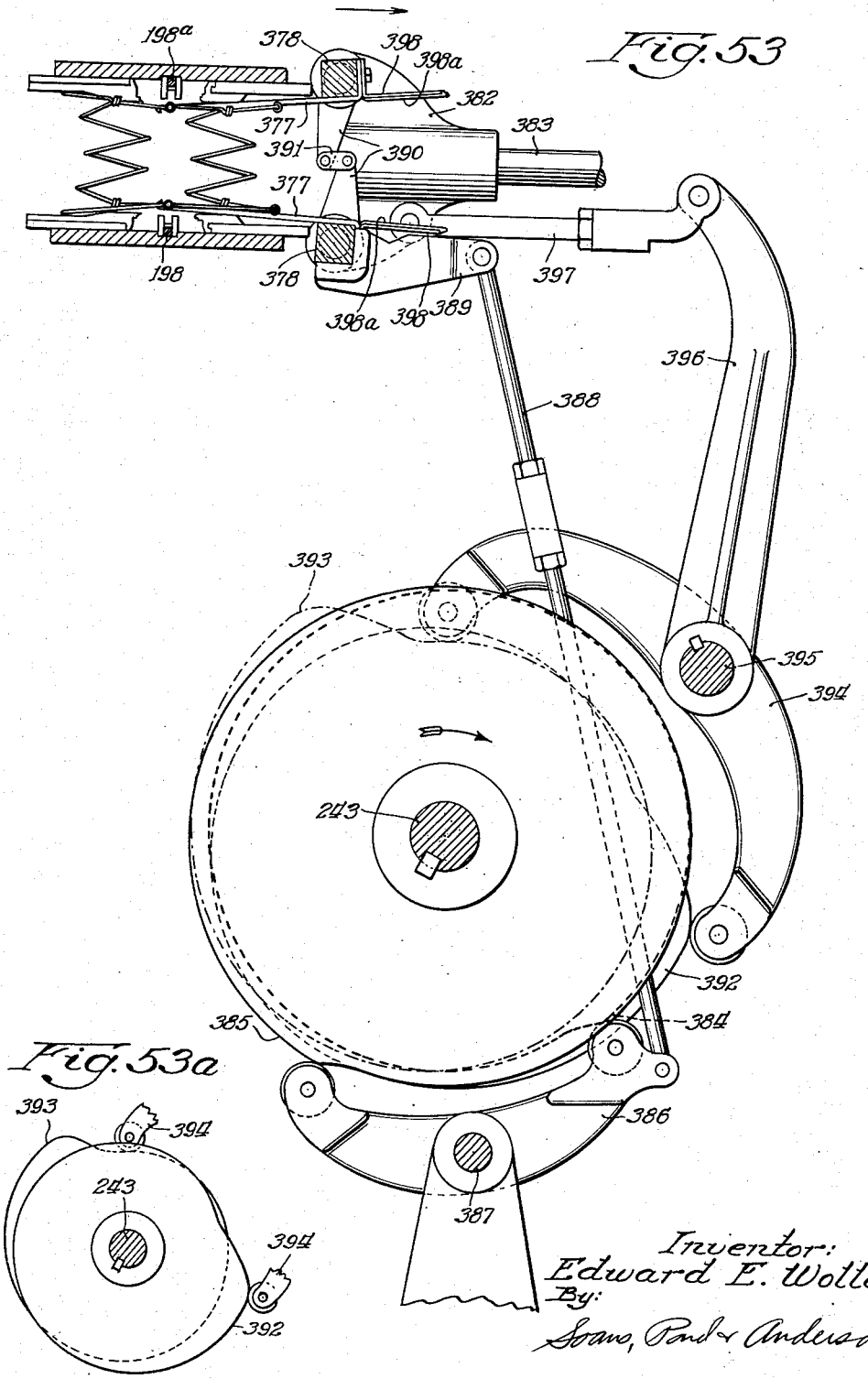

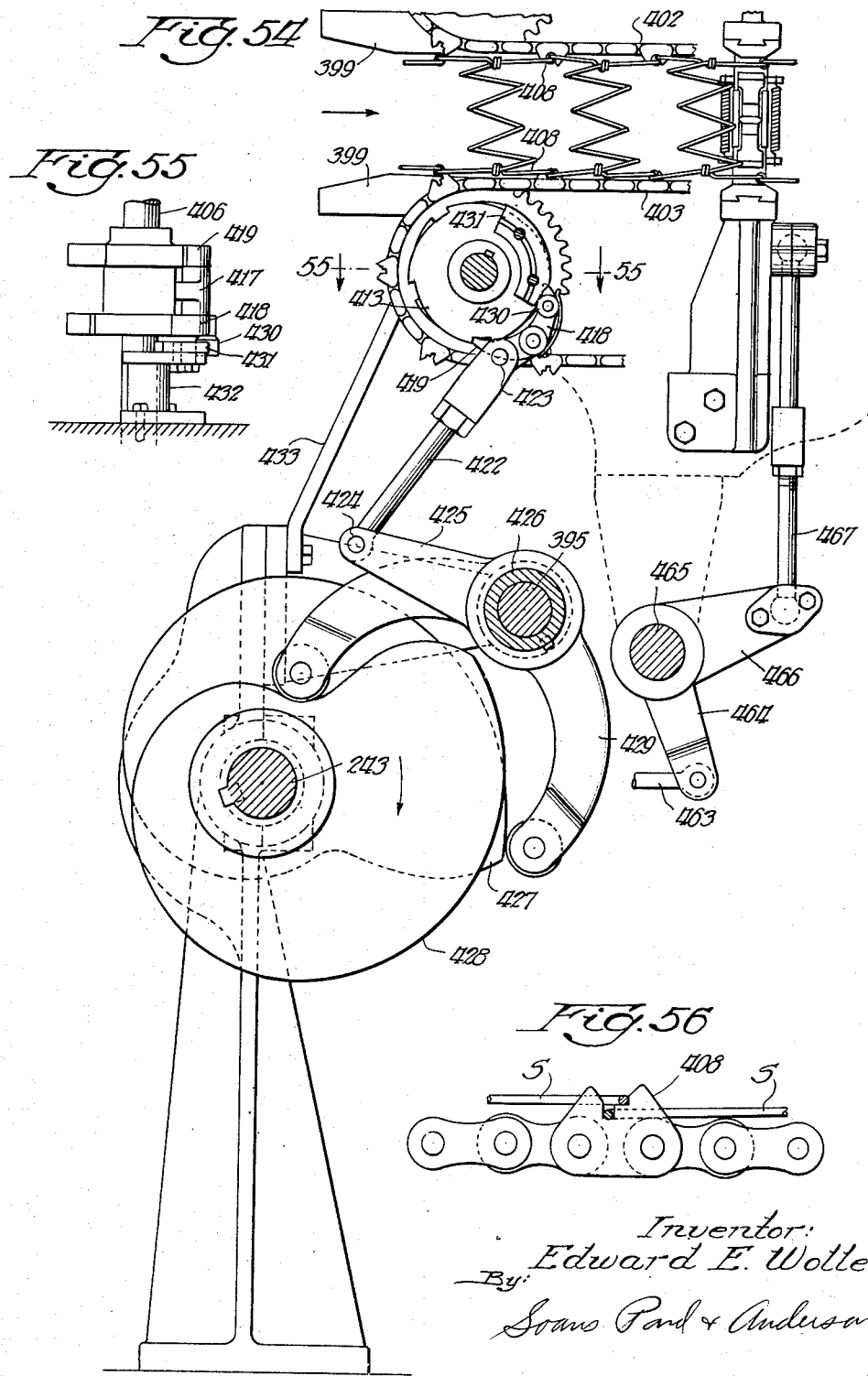

Oct. 30, 1945.   E. E. WOLLER   2,388,106
METHOD AND APPARATUS FOR MAKING SPRING ASSEMBLIES
Filed July 11, 1942   38 Sheets-Sheet 34
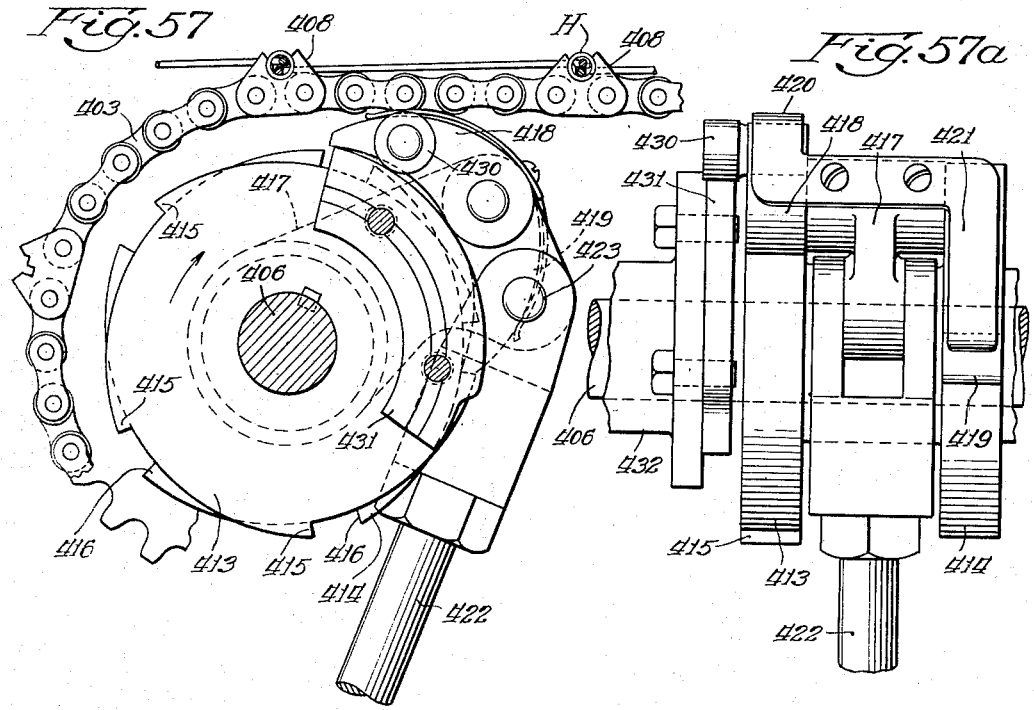
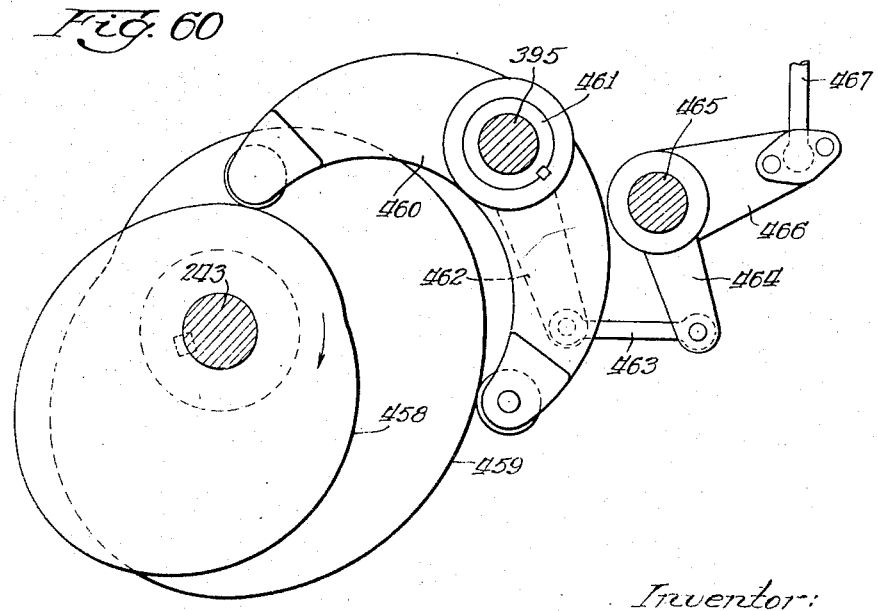
Inventor:
Edward E. Woller
By Soans, Pond & Anderson
Attys Oct. 30, 1945.  E. E. WOLLER  2,388,106
METHOD AND APPARATUS FOR MAKING SPRING ASSEMBLIES
Filed July 11, 1942  38 Sheets-Sheet 35
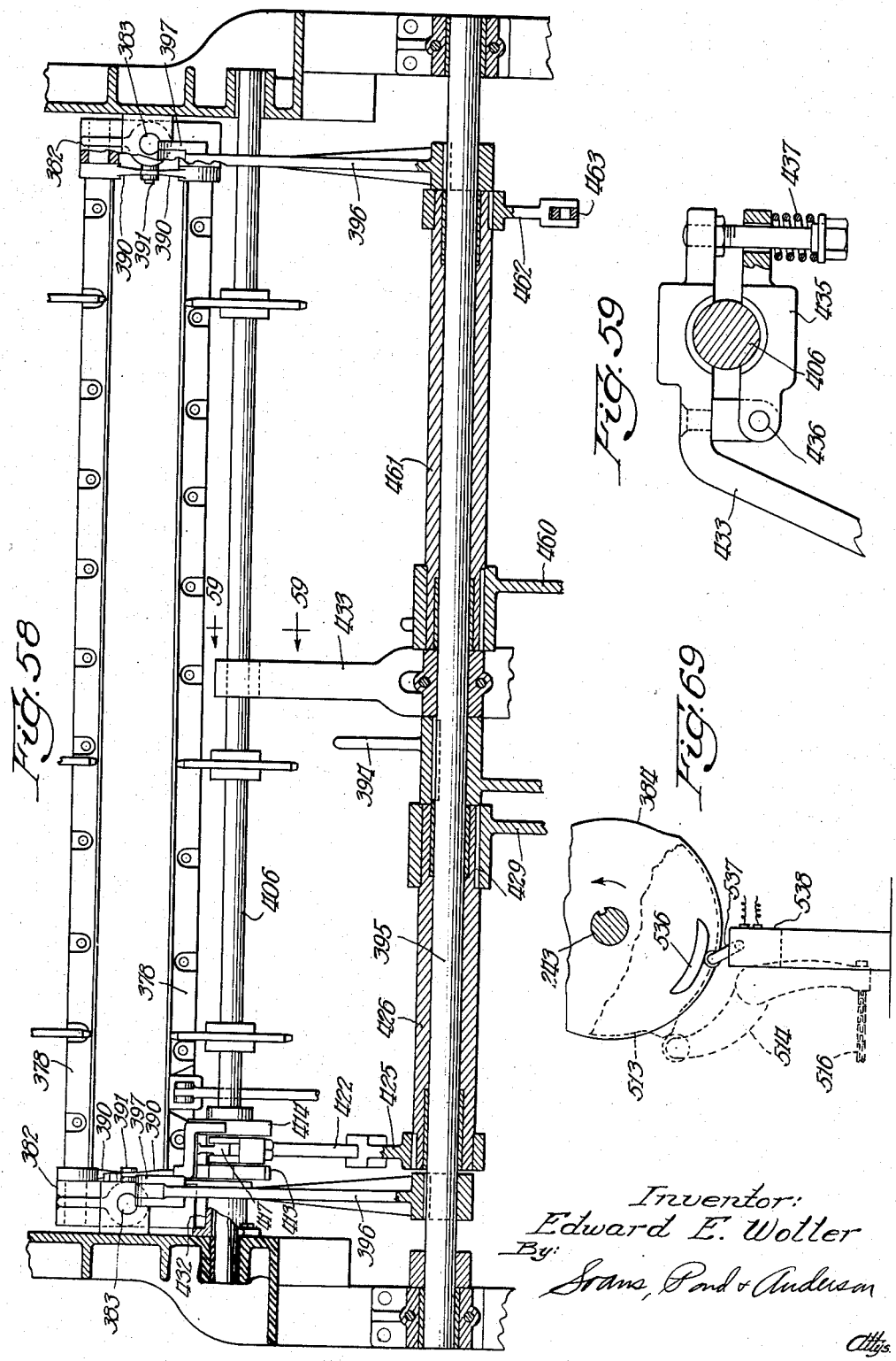

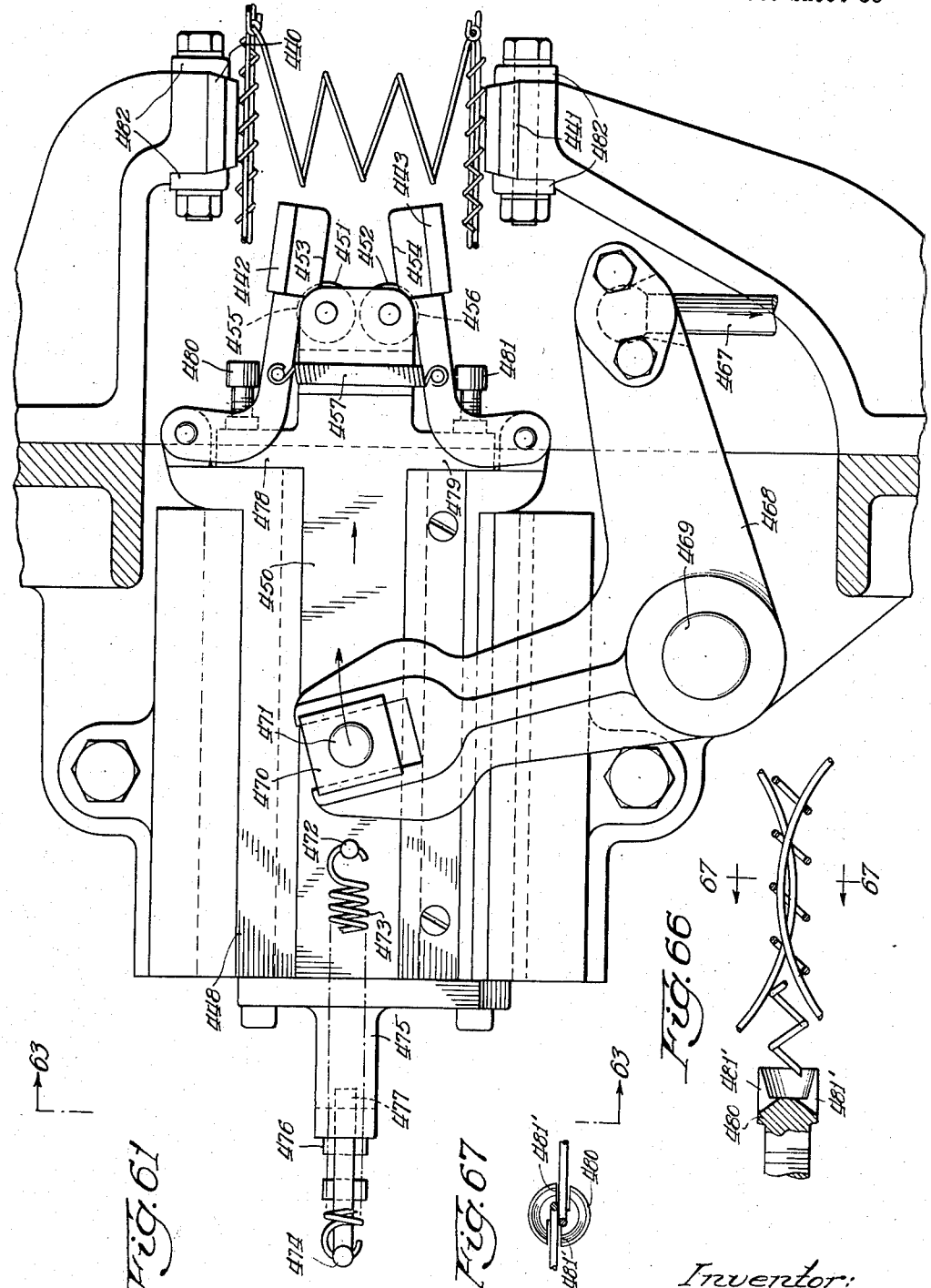

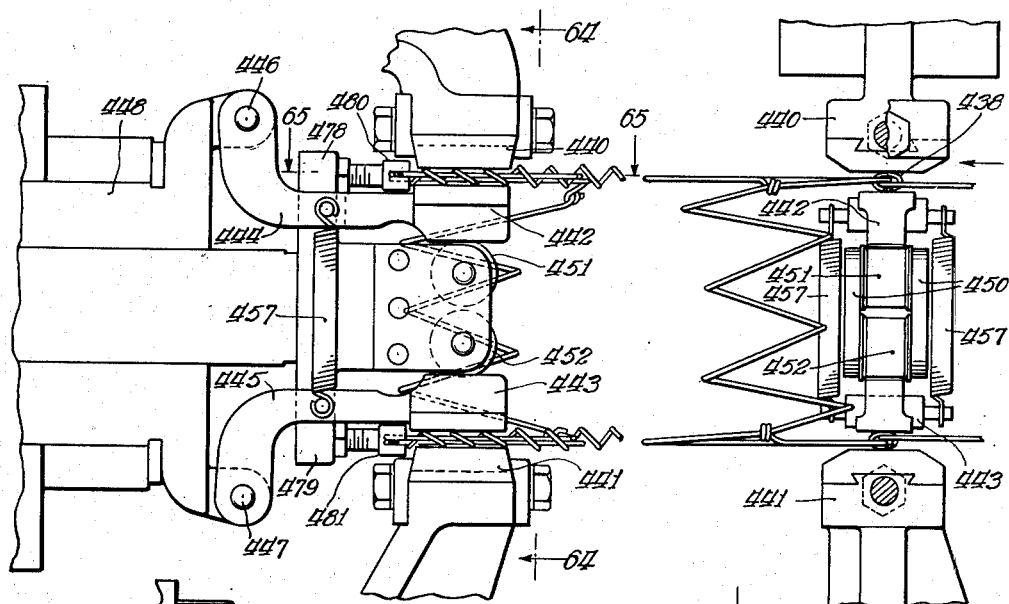

Oct. 30, 1945. E. E. WOLLER 2,388,106
METHOD AND APPARATUS FOR MAKING SPRING ASSEMBLIES
Filed July 11, 1942 38 Sheets-Sheet 38
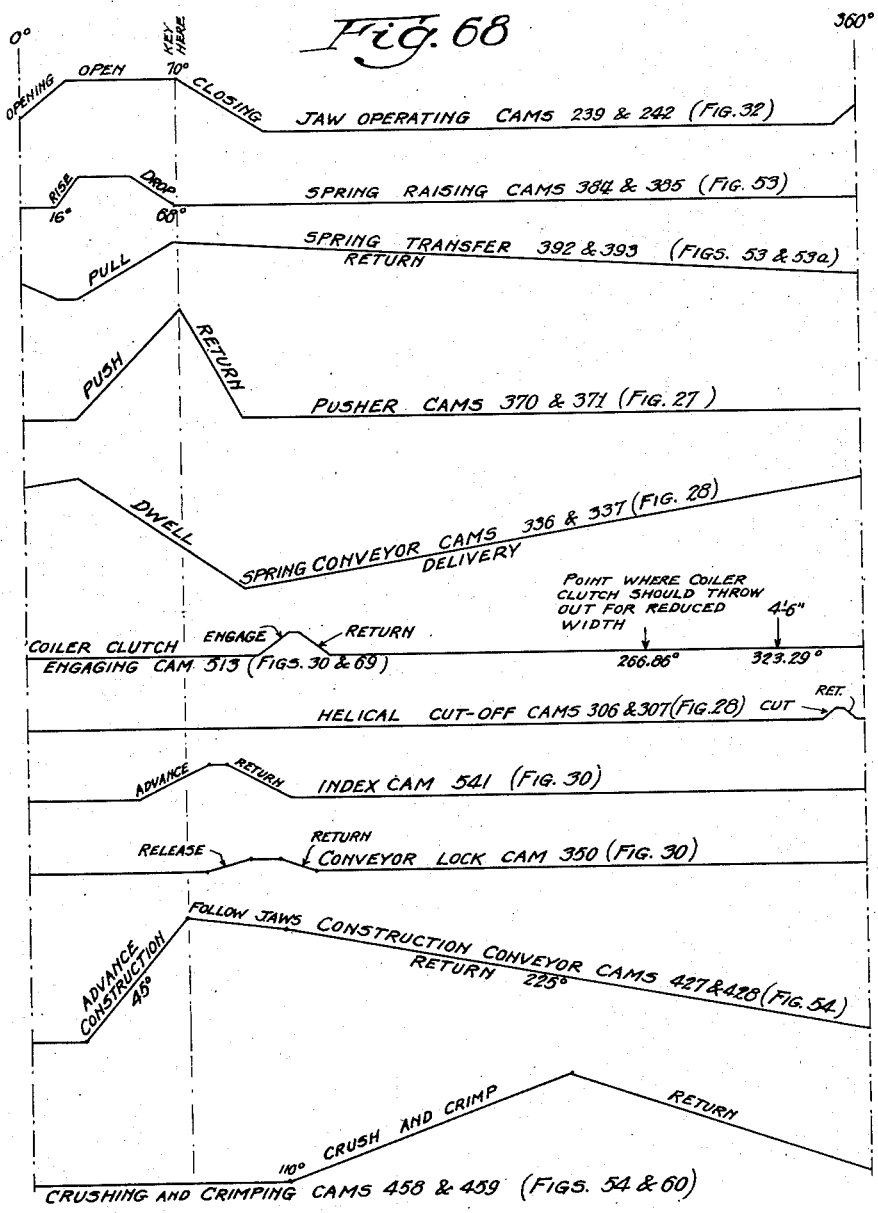

Patented Oct. 30, 1945

2,388,106

UNITED STATES PATENT OFFICE 2,388,106

METHOD AND APPARATUS FOR MAKING SPRING ASSEMBLIES

Edward E. Woller, Kenosha, Wis., assignor to Simmons Company, a corporation of Delaware Application July 11, 1942, Serial No. 450,574

63 Claims. (Cl. 140—3)

This invention relates to the manufacture of spring assemblies (commonly known as "inner constructions" or "inner construction units") which are employed in bed springs, cushions, mattresses and the like. The said spring assemblies usually comprise a multiplicity of axially vertical, spiral springs arranged in rows. The springs in each row may be spaced somewhat from each other and the springs of adjacent rows are interconnected by means of helical wires or tie members which extend the length of the said rows and are threaded around relatively overlapping or juxtaposed portions of selected coils of the springs, usually around portions of the top and bottom coils.

The method and apparatus herein disclosed constitutes an improvement upon the spring assembling machine structure shown in Patent No. 1,905,459 issued April 25, 1933 to John F. Gail.

In general, the object of this invention is to provide an improved and more efficient method and apparatus for making spring assemblies than has heretofore been available.

Among the many specific objects of the invention, the following more important objects may be mentioned; namely: to provide a simplified and improved method and arrangement for producing and delivering a helical tie wire to the spring assembling mechanism; to provide effective means for automatically stopping the operation of the mechanism or an appropriate part thereof in the event of improper functioning of the same; to provide apparatus of the character indicated which may be readily adjusted to produce spring assemblies or inner construction units of different sizes; to provide mechanism for locking the helical wires in assembled relation to the coil springs; to provide various adjustments which will facilitate the proper setting of the apparatus for most efficient operation; to provide for readily removable or detachable mounting means for certain of the elements which, from time to time require refinishing or replacement; to provide means whereby the apparatus or an appropriate portion thereof may be manually operated for certain purposes; to provide mechanism for automatically positioning the coils to be assembled in proper position for that purpose and to effectively control the delivery or discharge of the assembled coils from the assembling mechanism and to provide an improved arrangement for feeding coils to be assembled to the assembling apparatus.

Other objects of the invention will also become apparent and be understood by reference to the following specification and accompanying drawings (38 sheets) wherein there is disclosed a preferred embodiment of the invention.

In the drawings:

Figure 1 is a more or less diagrammatic side elevation.

Figure 2 is a diagrammatic plan.

Figure 2A is also a diagrammatic plan.

Figure 3 is a side elevation of the improved helical-forming mechanism.

Figure 4 is a plan of the helical-forming mechanism.

Figure 9:
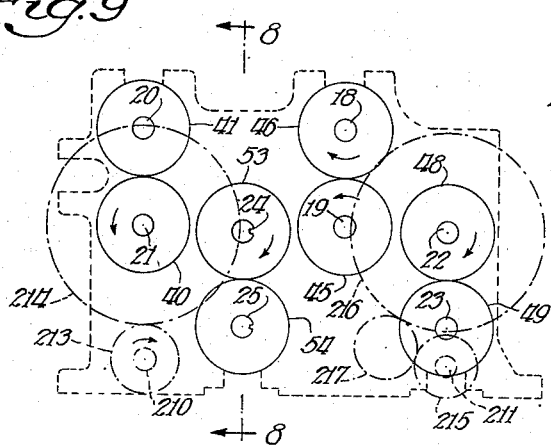
Figure 8:
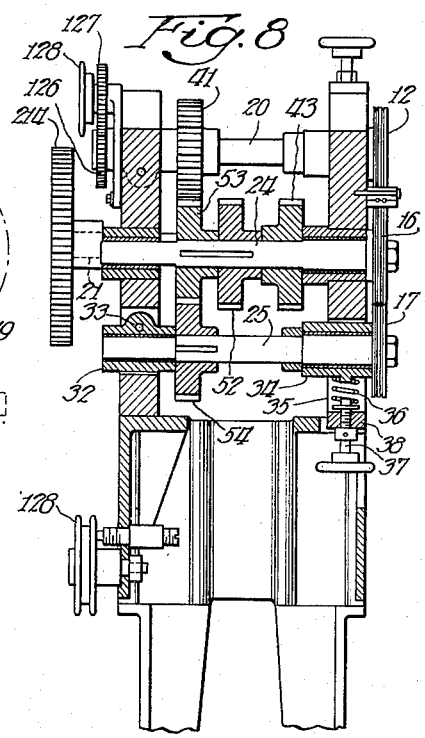
Figure 8 is a section on the plane indicated by the line 8—8 on Figures 3 and 9.
Figure 10:
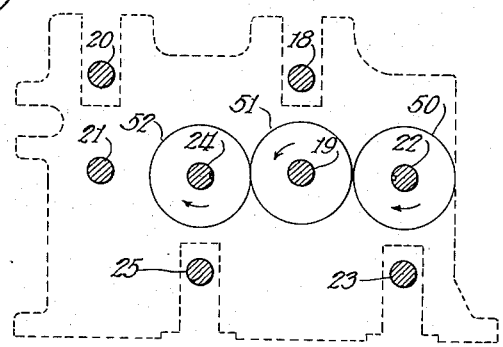
Figure 11:
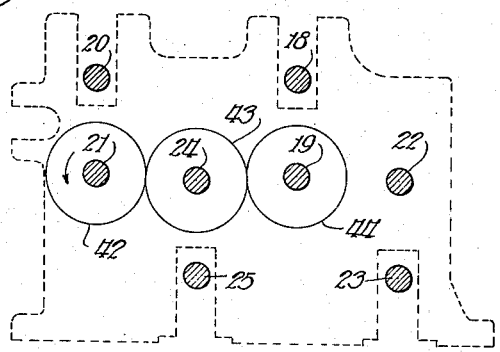

Figures 9, 10 and 11 are more or less diagrammatic illustrations of certain gear connections employed in the helical-forming apparatus and appearing mainly in Figures 4 and 8. The location of these diagrammatic views is represented by the lines 9—9, 10—10 and 11—11 respectively of Figures 4 and 6.

Figure 5:
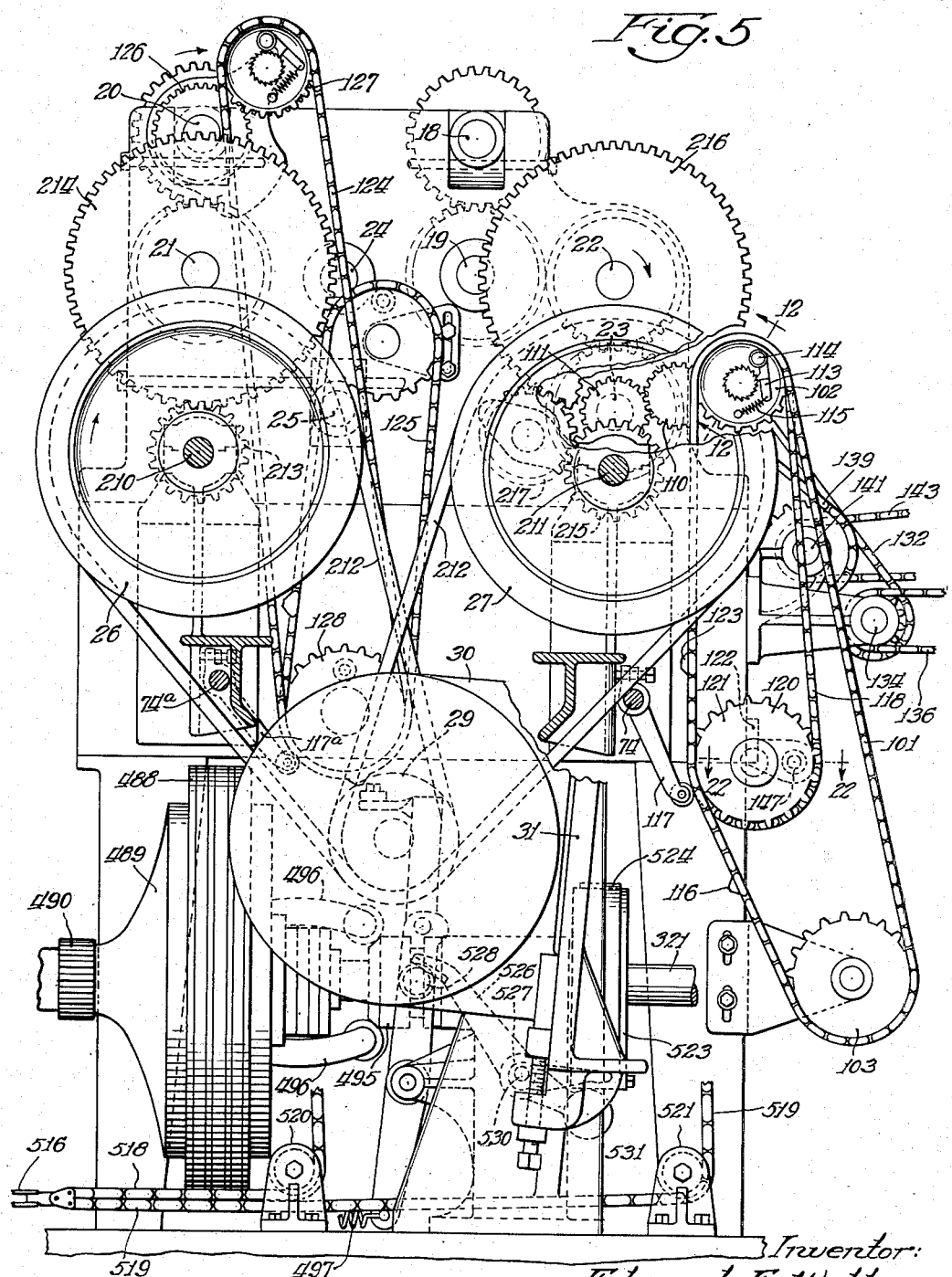
Figure 5 is a side elevation of the helical-forming mechanism, showing the side opposite to that shown in Figure 3, certain parts being shown in section on a plane represented by the line 5—5 on Figure 6.
Figure 12:
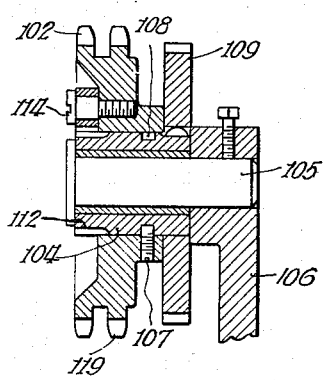

Figure 12 is a section on the line 12—12 of Figure 5.

Figure 13:
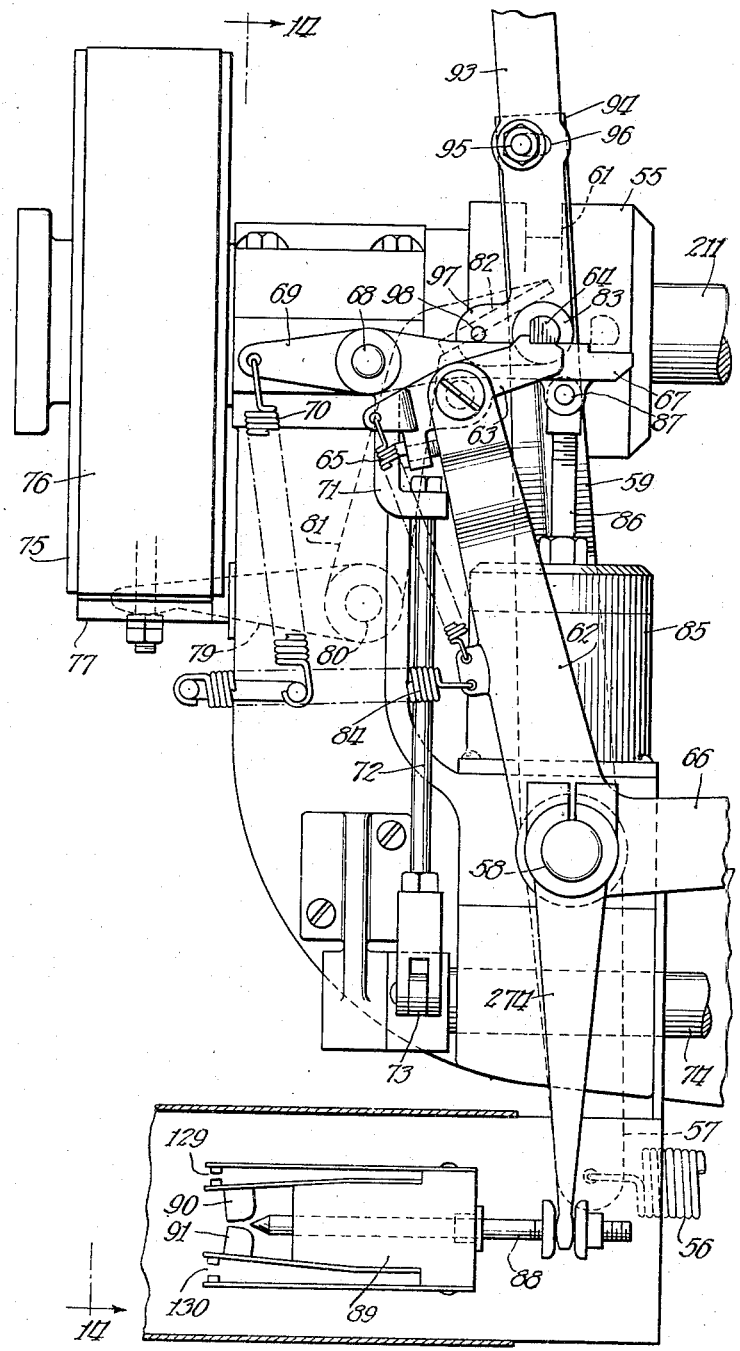

Figure 13 is a fragmentary rear end elevational view of certain clutch controlling mechanism, the location of this view being also represented by the line 13—13 of Figure 4.

Figure 14:
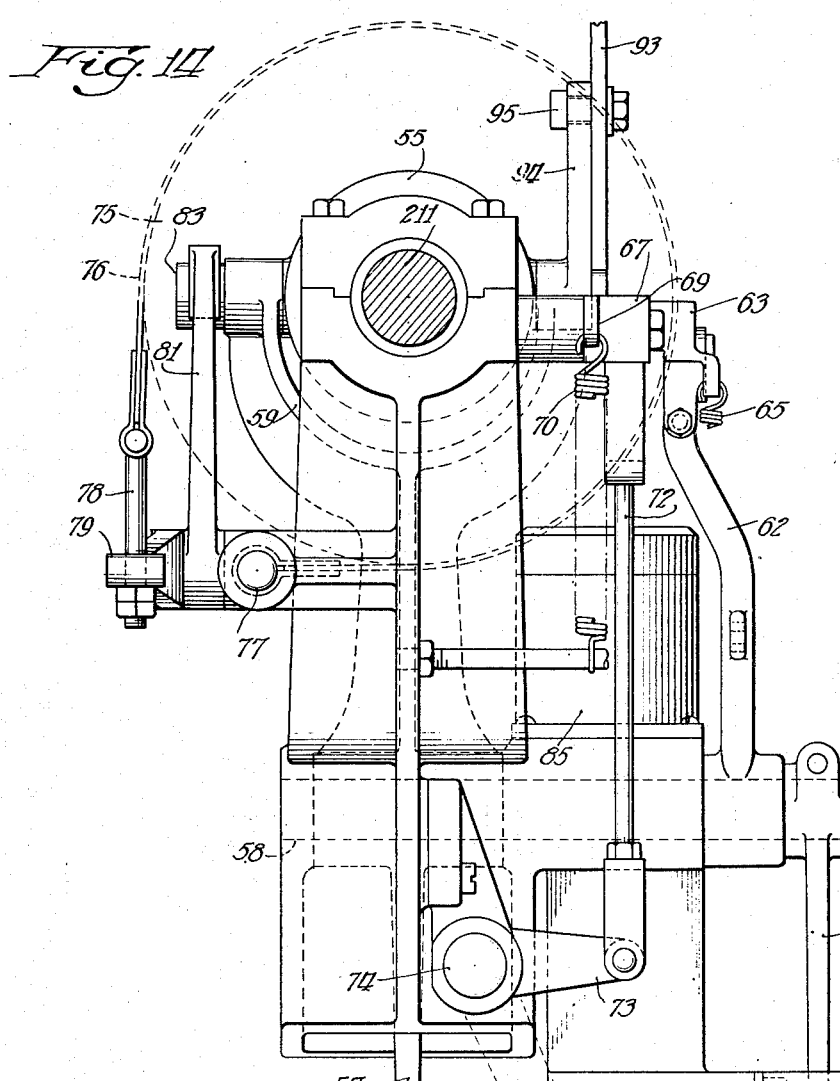

Figure 14 is a section on the line 14—14 of Figure 13.

Figure 14A:
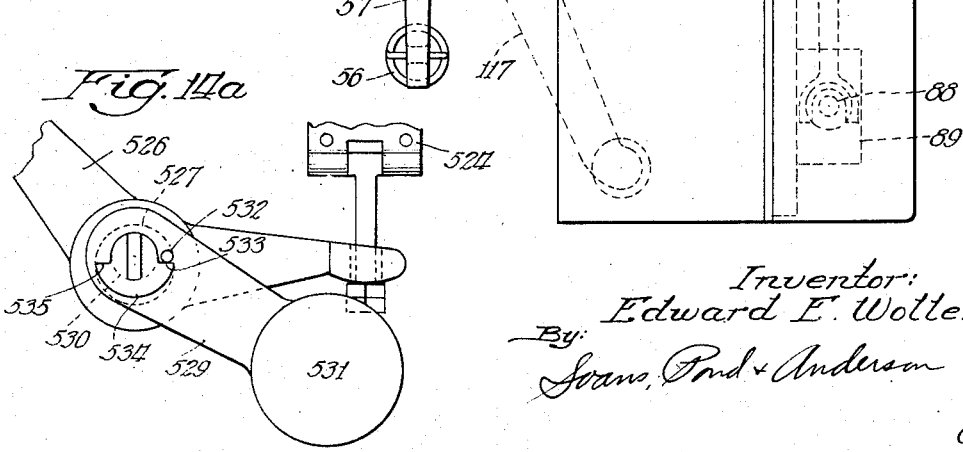

Figure 14A is a detail illustration of certain brake-controlling mechanism designed to permit release of a brake under certain circumstances.

Figure 15 is an enlarged fragmentary side elevation of a portion of the mechanism appearing in Figure 1.

Figure 16 is a section on the line 16—16 of Figure 15.

Figure 17 is a section on the line 17—17 of Figure 16 but on an enlarged scale.

Figure 18 is a section on the line 18—18 of Figure 17.

Figures 19 and 20 are sections respectively on the lines 19—19 and 20—20 of Figure 15.

Figure 7:
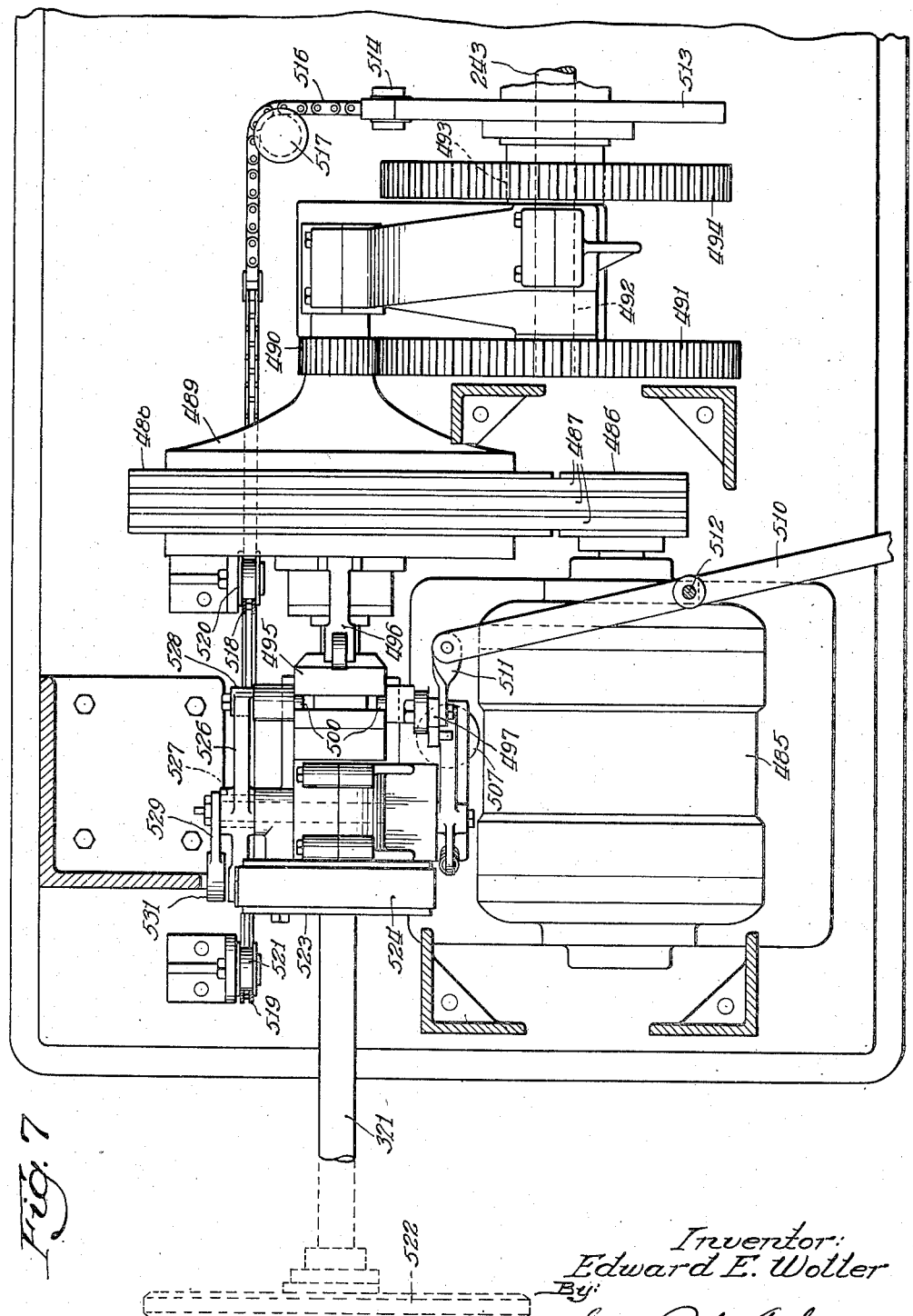
Figure 7 is a plan section on the line 7—7 of Figure 3.

Figure 21 is a fragmentary view of a portion of the clutch controlling mechanism shown also in Figure 7 but on a smaller scale and showing particularly certain electrical controlling mechanism.

Figure 6:
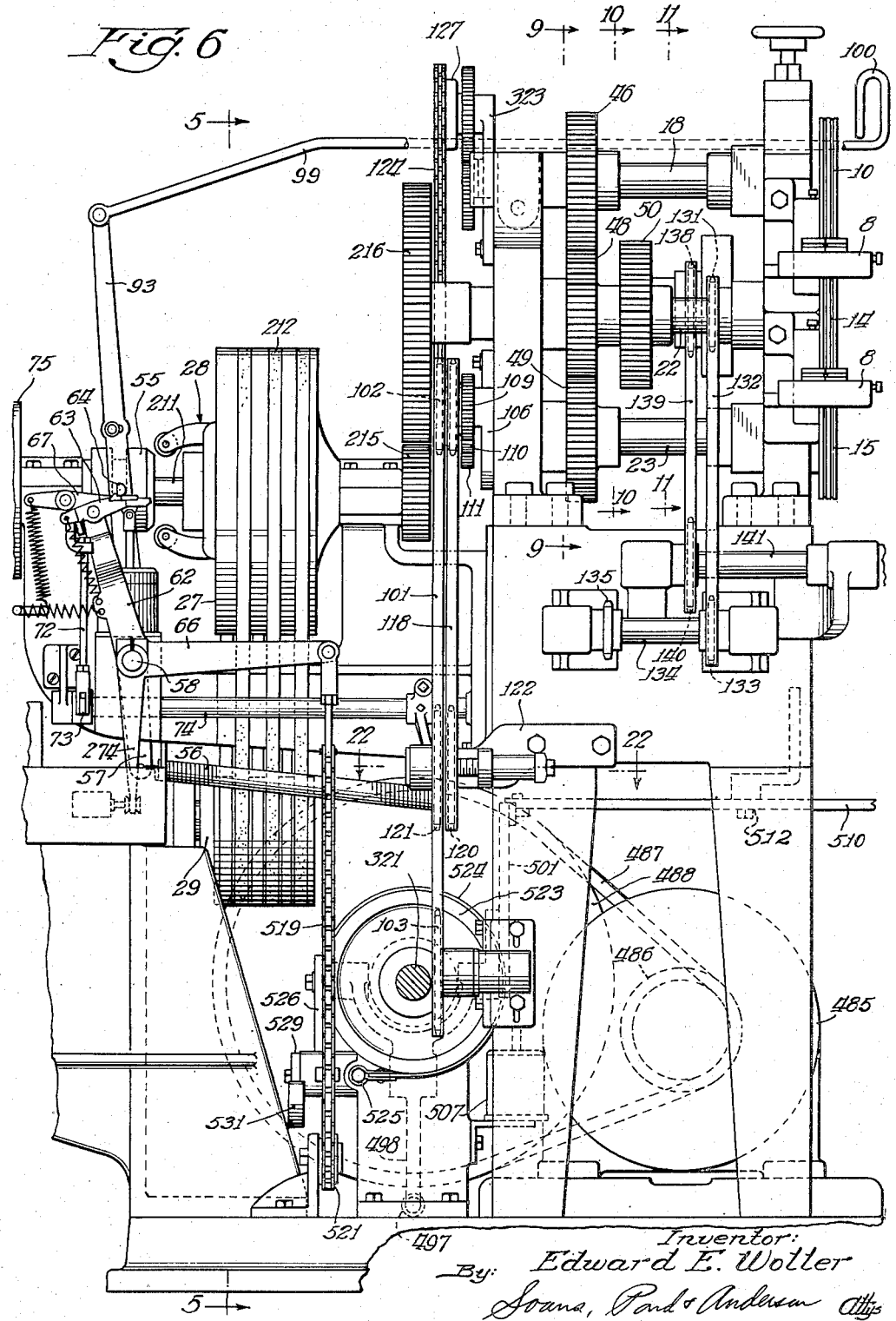
Figure 6 is a front end elevation of the helical-forming apparatus, certain portions being shown in section in the plane represented by the line 6—6 of Figure 3.

Figure 22 is a section on the line 22—22 of Figures 5 and 6.

Figure 23 is a diagram of certain electrical connections employed in the apparatus.

Figure 24A:
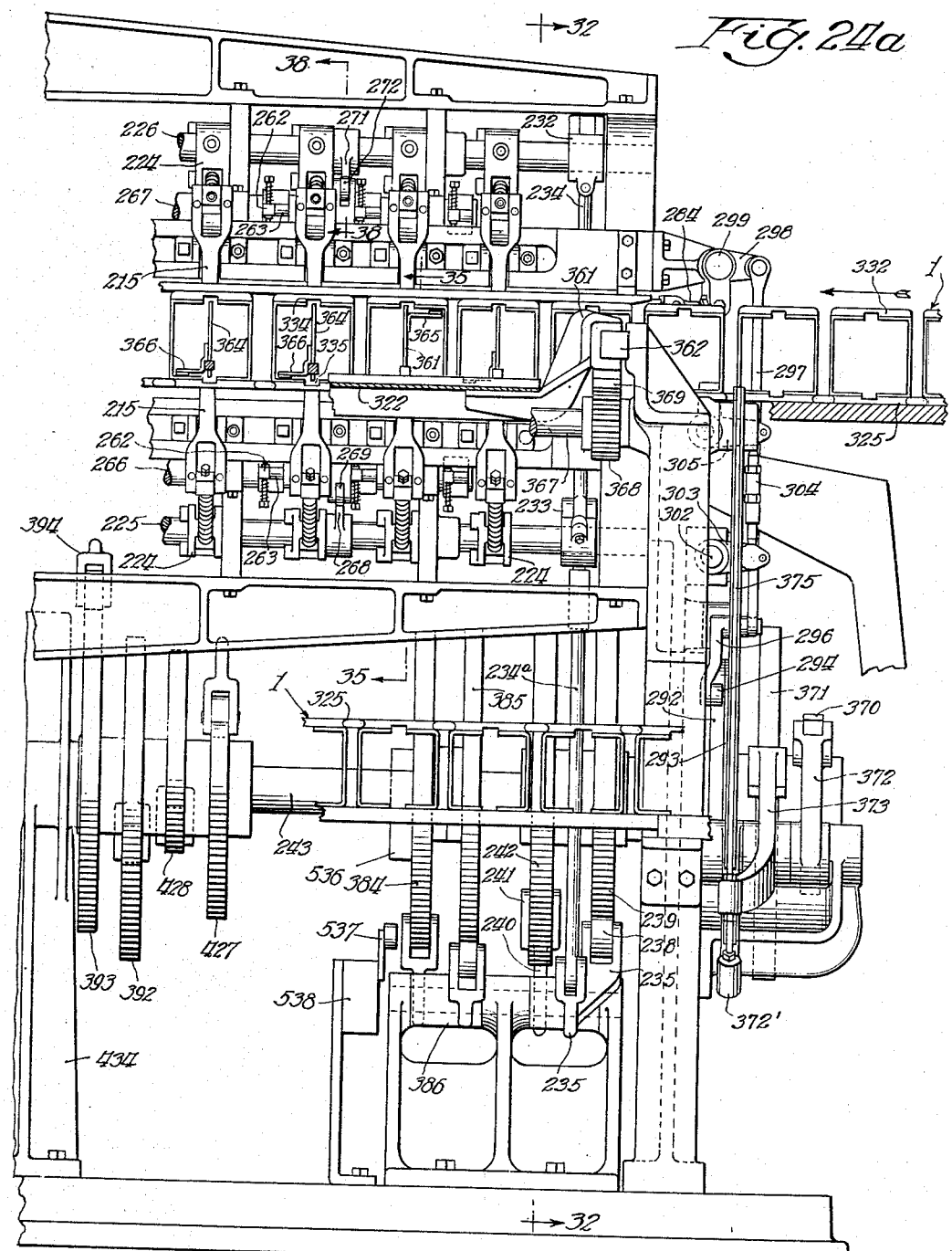

Figures 24 and 24A together constitute a side elevation of the spring assembling apparatus, certain intermediate portions which are substantially duplicated in the portions illustrated being omitted, a rear end or delivering portion of the helical forming apparatus being also illustrated in its operative relation to the spring assembling mechanism in Figure 24. (Because of a change in the direction in which the material operated upon travels through the spring assembling apparatus, the elevations of the latter shown in Figures 24 and 24A are properly referred to as end elevations, although these views are in planes which are at right angles to the plane of end views of the helical-forming mechanism, a portion of which is shown in side elevation in Figure 24. It should be understood that throughout this specification the sides and ends of the spring assembling mechanism are in planes at right angles to the planes of the sides and ends respectively of the helical-forming mechanism of the apparatus.)

Figure 25 is a plan of the mechanism shown in Figure 24.

Figure 25A is a plan of the mechanism shown in Figure 24A, certain parts being broken away to disclose other parts.

Figure 26 is a rear or delivery end elevation (the right hand end of Figure 24A) of the spring assembling mechanism.

Figure 27:
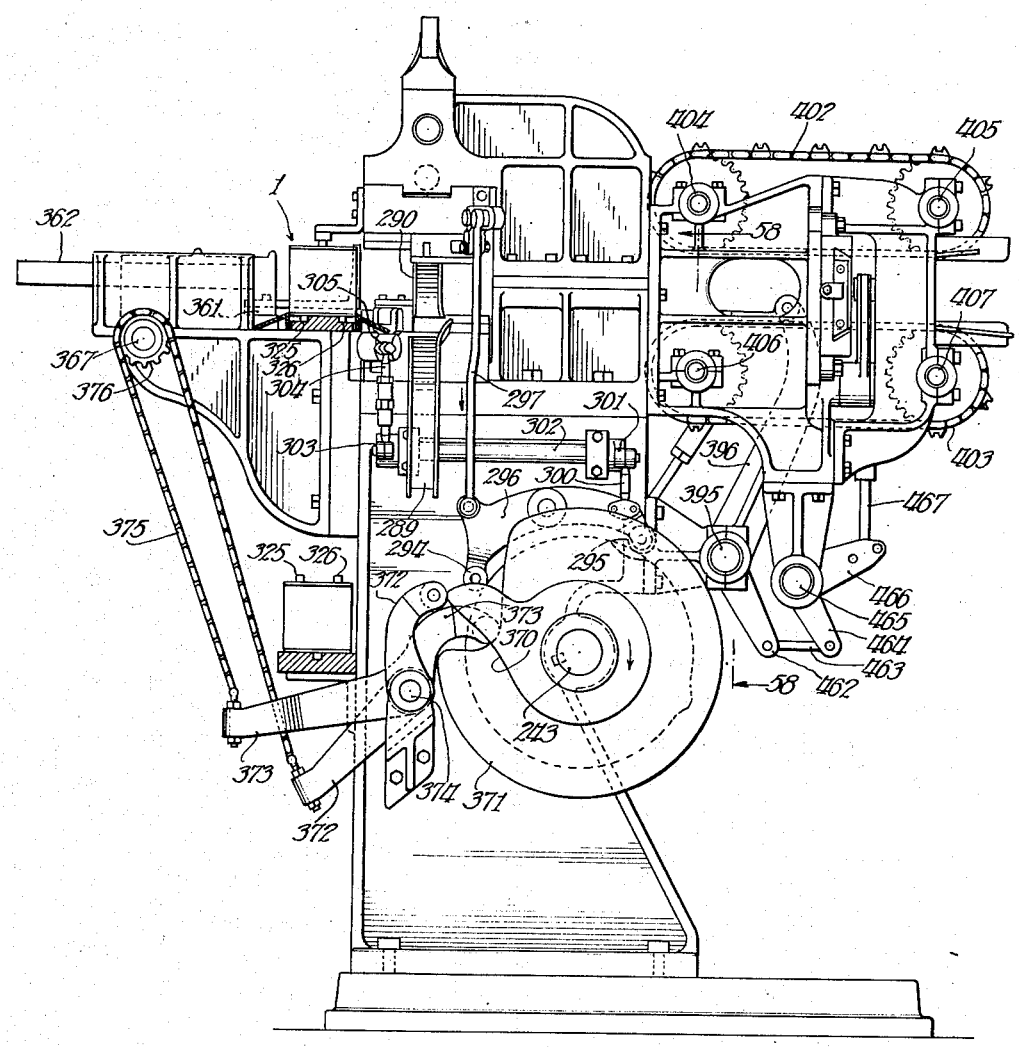

Figure 27 is an elevation of the right-hand side of the spring assembling mechanism as viewed in Figures 1, 24A and 25A.

Figure 28:
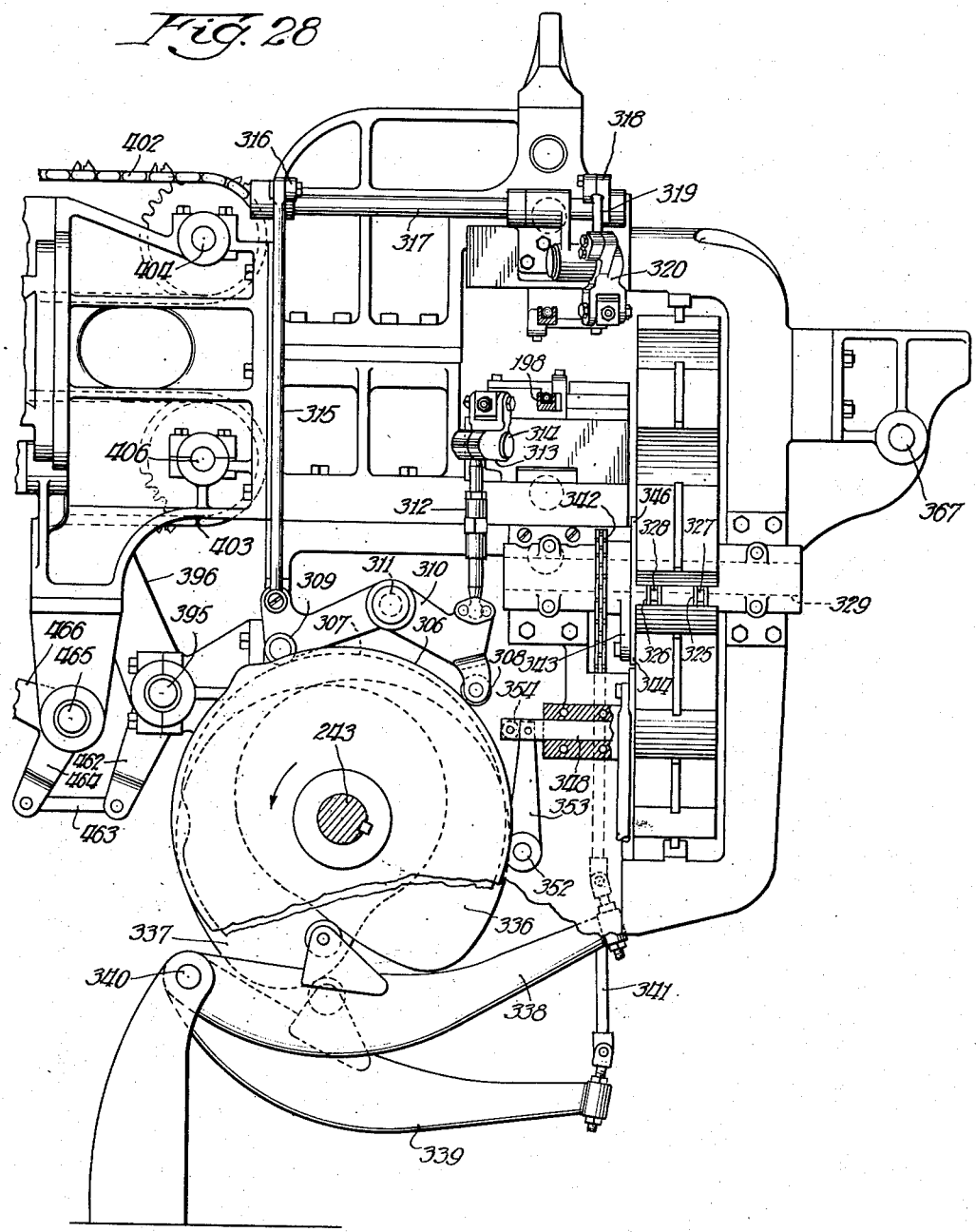

Figure 28 is a section on the line 28—28 of Figure 24.

Figure 29:
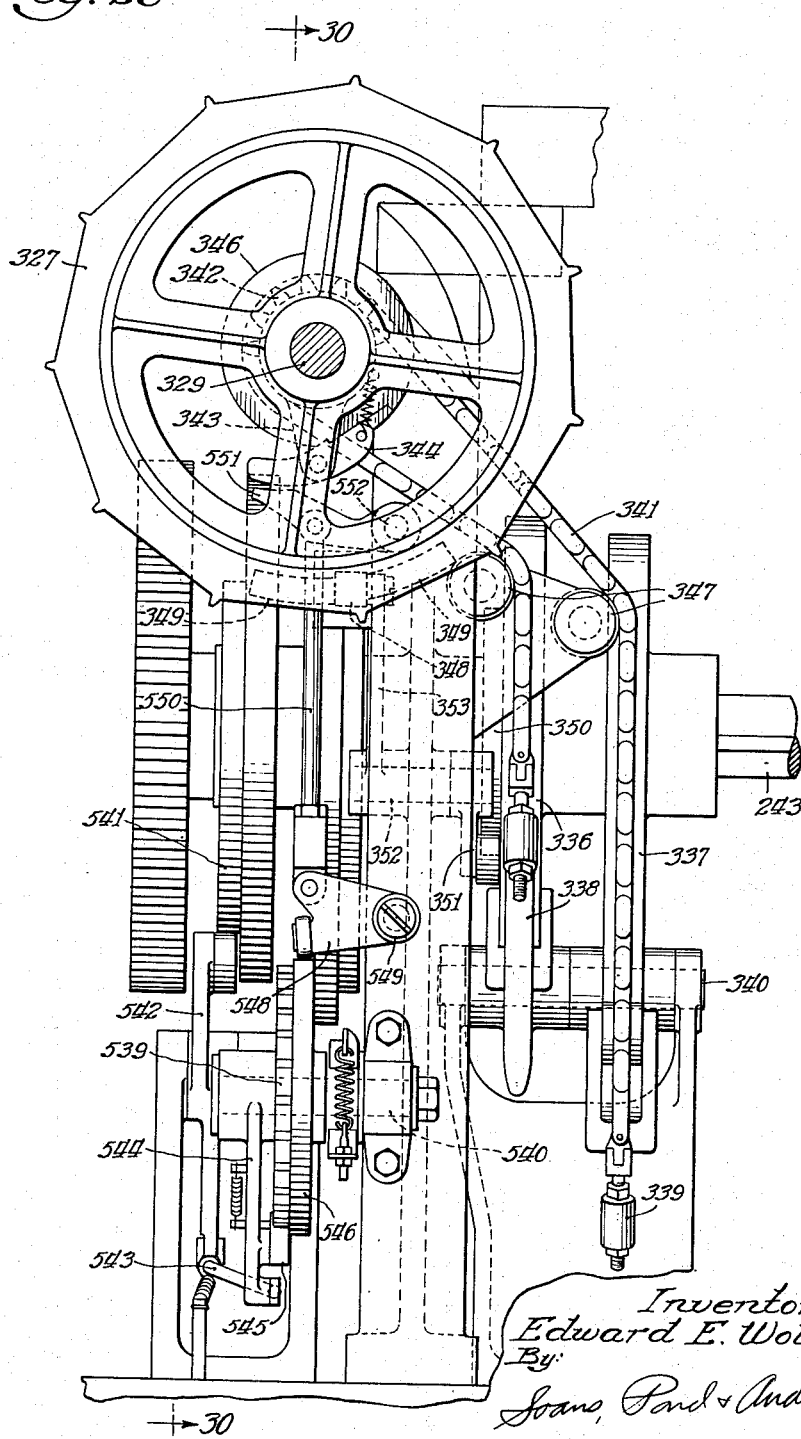

Figures 29 is an enlarged view of a portion of the mechanism shown in Figure 24.

Figure 30 is a section on the line 30—30 of Figure 29.

Figure 31 is a section on the line 31—31 of Figure 30.

Figure 32:
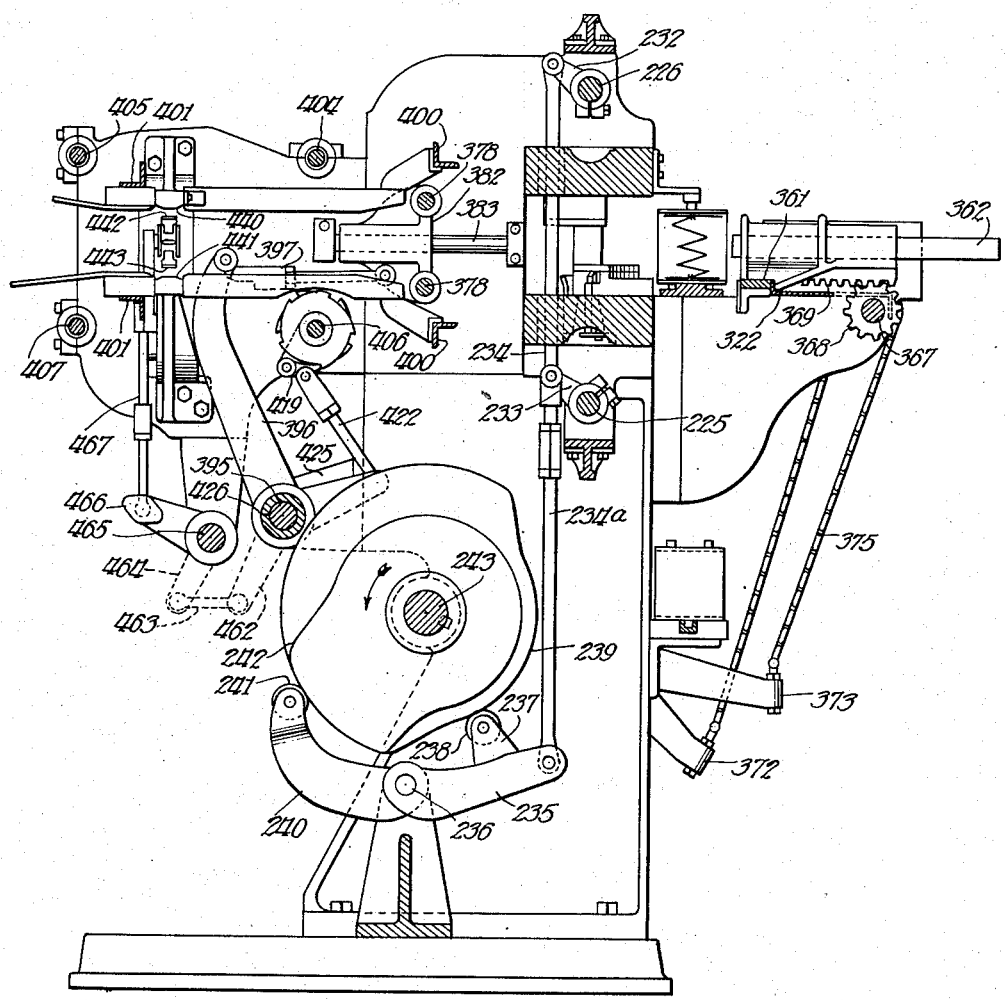

Figure 32 is a section on the line 32—32 of Figures 24A and 26.

Figure 33:
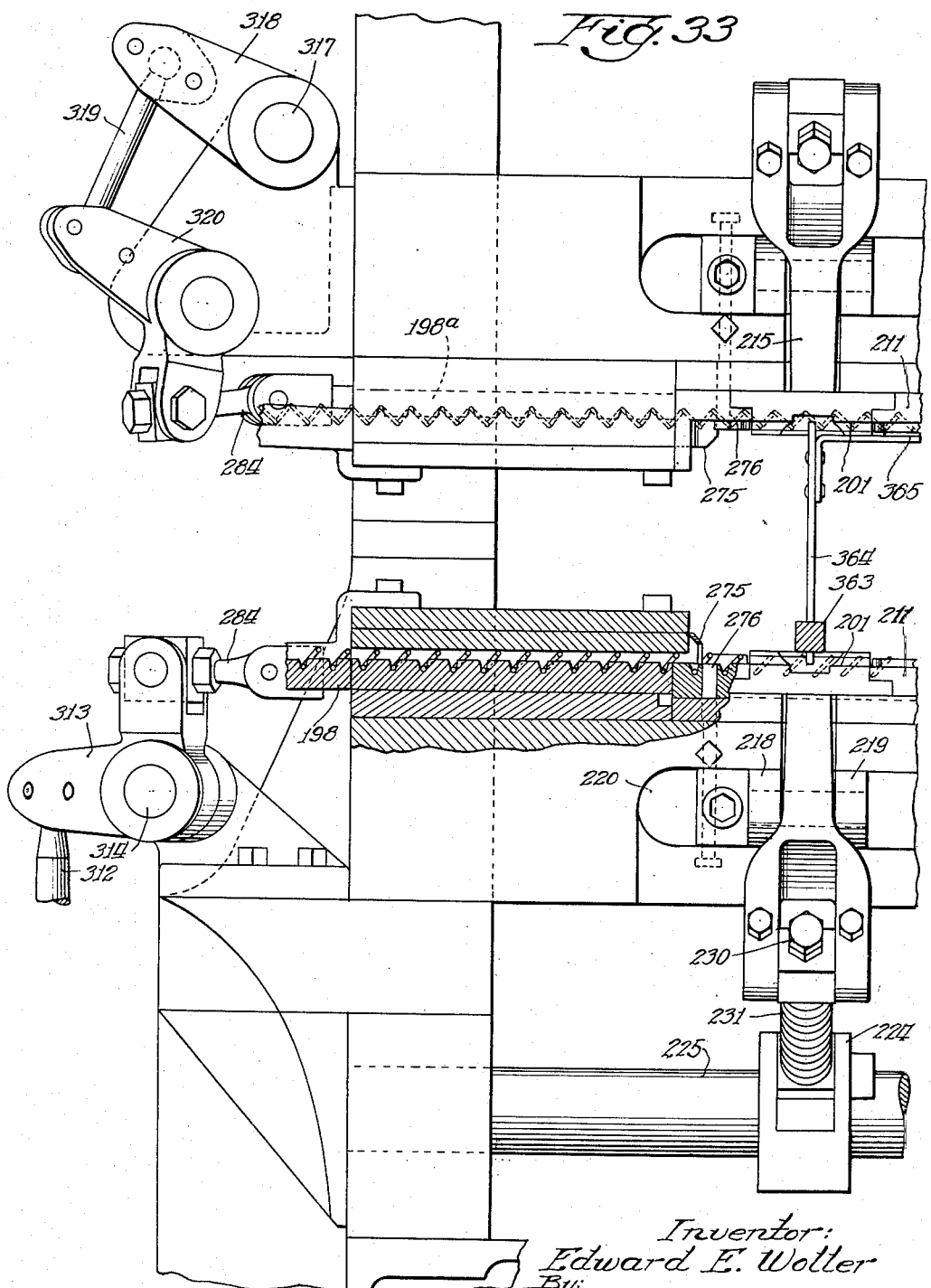

Figures 33 is a section on the lines 33—33 of Figure 25 but on an enlarged scale, certain portions being broken away to more completely illustrate the construction.

Figure 34:
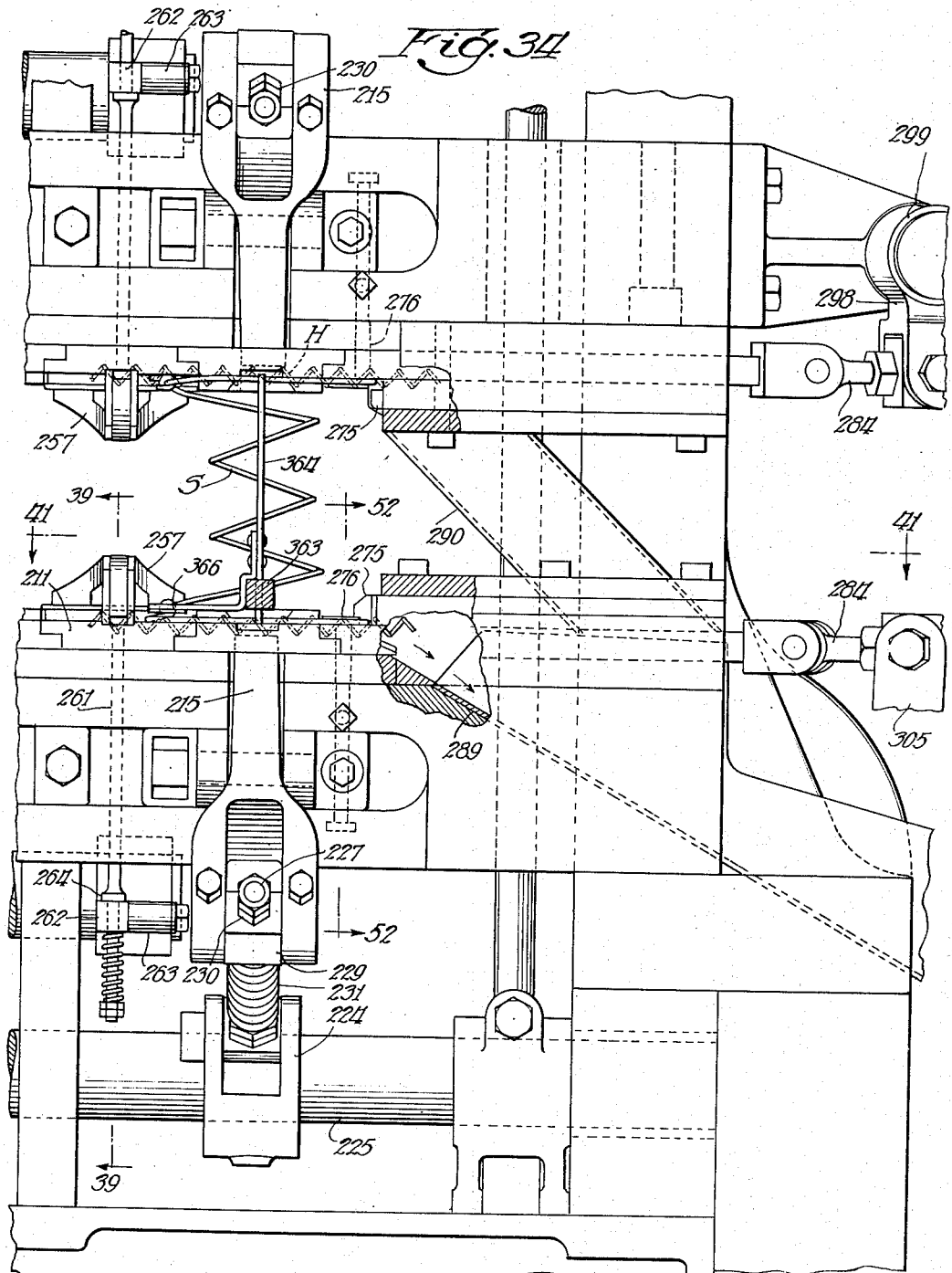

Figure 34 is a section on the line 34—34 of Figure 25A but on an enlarged scale.

Figure 35:
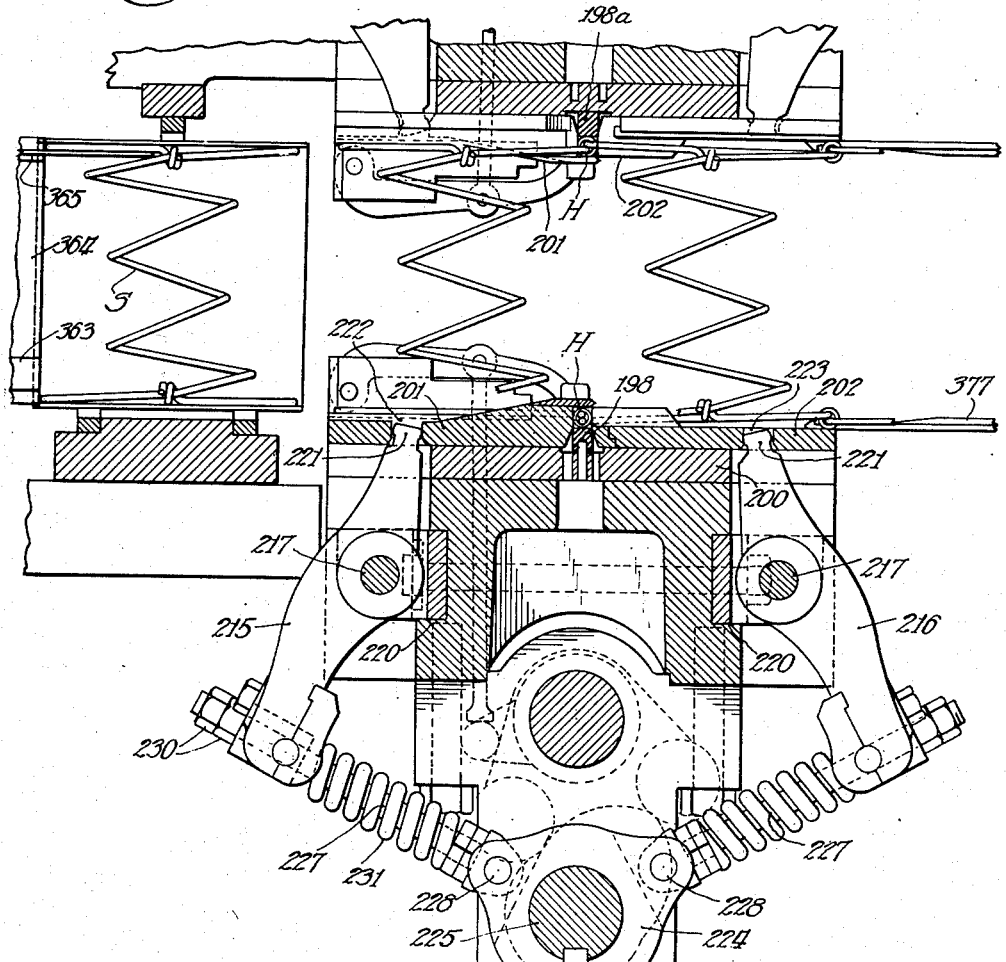

Figure 35 is a section on the line 35—35 of Figure 24A.

Figure 36:
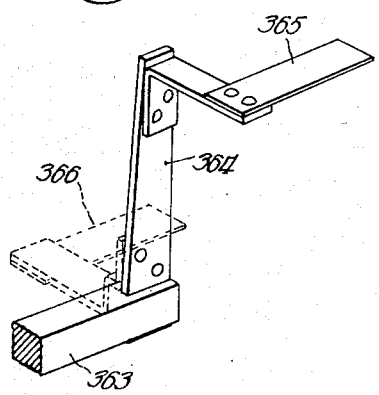

Figure 36 is a perspective illustrating a detail of construction.

Figure 37 is a section on the line 37—37 of Figure 25A.

Figure 38 is a fragmentary section on the line 38—38 of Figure 24A.

Figure 39 is a section on the line 39—39 of Figure 34.

Figure 40 is a fragmentary section corresponding to a portion of Figure 39 but on an enlarged scale.

Figure 41 is a plan section on the line 41—41 of Figure 34.

Figure 42 is a perspective illustrating certain details and the relationship of helical wire guiding mechanism and spring coil-holding mechanism.

Figure 43 is a plan view of a portion of the mechanism shown in Figure 42 together with a portion of certain cut-off mechanism employed for cutting off end portions of the helical wire.

Figures 44 and 45 are plan sections and Figures 46 and 47 are vertical cross sections through a portion of the mechanism shown in Figures 42 and 43, Figures 44 and 45 being approximately full size illustrations and Figures 46 and 47 being relatively enlarged. Figures 44 and 45 are also sections on the lines 44—44 and 45—45 respectively of Figure 46.

Figure 48 is a section on the line 48—48 of Figure 42.

Figure 49 is a plan of a portion of the mechanism shown in Figure 48.

Figure 50 is a more or less diagrammatic illustration of helical wire cut-off mechanism.

Figure 51 is a section on the line 51—51 of Figure 43.

Figure 52 is a section on the line 52—52 of Figures 34 and 51.

Figure 52A is a perspective illustrating certain details of the helical cut-off mechanism.

Figure 53 is a section on the line 53—53 of Figure 26.

Figure 53A is a detail illustration of certain cam mechanism included in Figure 53.

Figure 54 is a section on the line 54—54 of Figure 26.

Figure 55 is a section on the line 55—55 of Figure 54.

Figure 56 is an elevational view, approximately full size, showing certain details of the spring delivery control mechanism.

Figure 57 is an enlarged view of a portion of the mechanism appearing in Figure 54.

Figure 57A is an elevation of the mechanism appearing in Figure 57 as viewed from the right-hand side of the latter.

Figure 58 is a section on the line 58—58 of Figures 27 and 37.

Figure 59 is a section on the line 59—59 of Figure 58.

Figure 60 is a section on the line 60—60 of Figure 26.

Figure 61 is an elevation on an enlarged scale of a portion of the mechanism appearing in Figures 25 and 26, the location of this view being also indicated by the line 61—61 of Figure 25.

Figure 62 is a view corresponding to a portion of Figure 61 but showing the parts in a changed position.

Figure 63 is an elevation of the mechanism shown in Figure 61, the location of this view being indicated by the line 63—63 of Figure 61.

Figure 64 is an elevation of the mechanism shown in Figure 62, the location of this view being indicated by the line 64—64 of Figure 62.

Figure 65 is a plan section on the line 65—65 of Figure 62.

Figure 66 is a plan section corresponding to a portion of Figure 65 but on a somewhat enlarged scale.

Figure 67 is a section on the line 67—67 of Figure 66.

Figure 68 is a timing diagram showing the synchronized action of the various elements of mechanism.

Figure 69 is a detail view of mechanism for controlling electrically operated mechanisms employed for emergency stopping of the apparatus.

General explanation

The apparatus herein shown by way of example, is designed particularly for the production of inner construction units which are employed in the manufacture of inner spring mattresses. Such inner construction units embody a multiplicity of axial vertical coil springs S arranged in rows as indicated in Figures 2 and 2A. The top and bottom coils of the springs S in adjacent rows of springs are tied together by means of helical wires such as indicated at H which are fed end-wise and rotated about their own axes in such a manner as to be threaded around adjacent portions of the top and bottom coils respectively as is indicated at Figures 1 and 2.

In this instance the rows of springs extend cross-wise of the inner construction unit, that is to say, from side to side thereof rather than from end to end thereof and the connecting helicals accordingly extend cross-wise of the inner construction unit so as to connect the adjacent rows of springs. It may be observed that in the finished inner construction unit, the coil springs S are also disposed in rows extending from end to end of the unit, i.e., length-wise of the unit.

For a mattress of so-called full size, the inner spring construction produced by the illustrated apparatus embodies twenty rows of springs, each having eleven springs in the row. For a smaller or so-called twin bed size mattress, the inner spring construction unit would embody twenty rows of springs, each row containing eight springs.

As indicated in Figure 1, there is provided a conveyor 1 which is equipped with means for holding individual springs in predetermined relation to each other and feeding a row of springs into position for delivery to apparatus indicated generally at 2 for holding adjacent rows of springs in relatively fixed relation while the helical wires H are formed and threaded about the adjacent top and bottom coils of the adjacent spring rows. Mechanism indicated at 3 receives a pair of wires W from suitably supported coils thereof and forms such wires into the helicals H in such a manner as to rotate the respective helicals on their own axes. Suitable means is provided for guiding the helices thus formed into operative relation to the juxtaposed coil portions of the spring rows for tying the same together in the manner indicated.

As indicated in Figure 2, the conveyor 1 is an endless belt type conveyor and it will be understood that it is intermittently actuated to the extent required to feed a row of eleven coil springs to the assembling mechanism 2 in making a full sized inner construction unit. Suitable pushing means is provided for feeding the spring rows from the conveyor 1 to the assembling mechanism 2. In making a twin bed sized inner construction unit, the conveyor is advanced the usual distance to feed a row of eleven springs but the means for feeding the last three springs of each row of eleven springs is disabled so that a row of only eight springs will be fed from the conveyor to the assembling mechanism. Means is also provided to automatically stop the operation of the helix-forming mechanism or coiler 3 when a suitable length of the helix has been formed and assembled with the spring rows.

It should be understood of course that reference herein to spring rows embodying eight and eleven coil springs respectively is merely by way of one example and is by no means to be taken as a limitation upon the adaptability of the improved method and apparatus to the production of inner construction units and the like of different sizes and embodying different numbers of spring rows and different numbers of springs in each row. Also it should be understood that if desired the springs may be arranged in rows extending from end to end of the unit and united by helicals extending from end to end instead of in the manner above explained. Similarly other spring row arrangements and relationships may be employed if preferred, subject to the making of suitable changes to feed and to receive and hold the springs in the desired relationship and to guide the helicals H into operative connecting relation thereto.

In Figure 2A there is diagrammatically illustrated the method employed in separating the last formed or trailing end of one unit from the first formed or leading end of the next unit. As there shown, a unit A comprising the desired number of rows of coil springs is formed, the leading and trailing ends thereof being equipped with helicals HL and HT respectively, which unite the top and bottom coils respectively of the leading and trailing or end rows of springs in that particular unit. The next formed unit B similarly has the coils of its leading end thereof united by a helical HL. To apply the helicals HL and HT, the apparatus is operated in the same manner as though the said helicals were to be threaded around juxtaposed coil portions of adjacent rows of springs. However, after the last row of springs is fed to the apparatus to form the unit A, the conveyor 1 is caused to skip one step of movement so that the delivery of one row of coil springs is omitted while the other mechanisms continue to operate in the usual manner. Hence when the helicals HT and HL are formed and fed to the apparatus 2, said helicals engage only the coils of the trailing end row of springs of the unit A and of the leading row of springs of the unit B.

Supply and feed of helix wire

As shown in Figure 3, coils 4 and 5 of wire for forming the helicals H are suitably supported on stands. The supports are preferably of a type in which the coils 4 and 5 of spring wire are carried by suitable racks or baskets which are rotatably supported about vertical axes on upright stands. Also provision is preferably made for effecting rotation of the supporting baskets 4 and 5 in accordance with the direction in which the wire is withdrawn therefrom for delivery to the helical-forming mechanism or coiler 3. As shown, the racks for the coils 4 and 5 embody suitable bottom disks 6 which are engaged by friction wheels 7, the latter being journaled on the supporting posts of the stands and driven at such a speed as to feed the wire at a slightly slower speed than the speed of travel of the wire through the coiling mechanism. The main feed of the wire comprises cooperating pairs of wire feed disks which propel the wire at the required rate of speed and pull the wire through suitable straightening rolls indicated at 8 and cleaning devices 9. The friction drive of the wire coil racks permits the latter to advance as may be required by the pull on the wires and the friction drives serve primarily to reduce the resistance of the baskets to the required feed of the wire. The wire straightening devices 8 and cleaning devices 9 are known constructions.

The feed wheels for the upper-most wire W comprises the cooperating wheels 10 and 11 forming one pair and cooperating wheels 12 and 13 which constitute the second pair. For feeding the lower-most wire there are provided similar pairs of feed wheels, one pair comprising the wheels 14 and 15 and the other pair comprising the wheels 16 and 17. The wheels 10 to 17 inclusive are peripherally grooved as indicated in Figures 4 and 6 and they are so related that they are operative to grip between them the wires to be fed with sufficient tightness to insure positive feeding of the wire through the coiling mechanism which will presently be described. The wheels 10 to 17 inclusive are respectively mounted on shafts 18 to 25 inclusive.

Driving power is applied separately to the set of wheels 10 to 13 inclusive for feeding the upper wire W and to the set of wheels 14 to 17 inclusive for feeding the lower wire W.

The shafts 22, 19, 24, and 21 are suitably journaled in the side frames of the coiler mechanism substantially as is shown in respect of the shaft 24 in Figure 8. The shafts 18, 20, 23, and 25 are each journaled in bearings movably mounted in the side frames of the apparatus substantially as is shown in respect of the shaft 25 in Figure 8. As there shown, the shaft 25 has one end journaled in a bearing block 32 which is pivoted as indicated at 33 in the side frame of the mechanism for rocking movement about a horizontal axis. The other end of the shaft, i. e., the end which carries the wire feed wheel 17, is journaled in a bearing block 34 which is vertically slidably mounted in a guide-way or slot 35 provided in the adjacent side frame of the apparatus. The bearing block 34 is normally urged to move upwardly by a spring 36 which is interposed between the bearing block 34 and the adjacent end of a screw 37 which threadedly engages a suitably taped opening in a bar 38 which extends across the otherwise open end of the frame slot 35. By adjustment of the screw 37, the pressure exerted by the spring 36 to effect upward movement of the adjacent end of the shaft 25 and the wire feed wheel 17 may be adjusted. The wire feed wheel 17 is thereby caused to effectively cooperate with the feed wheel 16 to grip and feed the wire which is propelled thereby. Similarly the feed wheels 10, 12 and 15 are resiliently urged into cooperative relationship to the feed wheels 11, 13 and 14 respectively.

The gear connections for properly driving the wire feed wheels are shown in Figures 4, 5, 6, and 8 to 11 inclusive. By reference to said figures, it will be seen that the upper wire feeding rolls 10 to 13 inclusive are driven by gear connections to the shaft 21 which may be considered the input shaft of the drive system for said feed wheels.

Intermediate the supporting side frames of the coiler mechanism, the shaft 21 is equipped with a gear 40 which meshes with a gear 41 on the shaft 20 of the feed wheel 12. Hence the feed wheels 12 and 13 are properly driven to cooperate in feeding the upper wire. The shaft 21 also has mounted on it, between the supporting side frames of the mechanism, a gear 42 which meshes with a gear 43 which is mounted on the shaft 24 for free rotation thereon. Said gear 43 meshes with a gear 44 which is keyed to the shaft 19 so as to thereby drive the shaft 19 incident to the said gear connections to the drive shaft 20. In addition to the gear 44 on the shaft 19, there is also a gear 45 which meshes with a gear 46 which is keyed to the shaft 18 to thereby rotate the latter incident to the drive of the shaft 19 as already explained. The gear connections described are of course such as to drive the feed wheels 10, 11, 12, and 13 in the proper direction for feeding the upper wire. The amount of lateral shifting movement which may occur between certain of the above mentioned meshing gears due to the pivoted mounting of the bearing blocks for the ends of certain of the shafts, will of course be understood to be so slight that the efficiency of the driving connections is not materially impaired.

The lower wire feed wheels 14, 15, 16 and 17 are driven from the shaft 22 which is in turn driven through the agency of a gear 216. Between the supporting side frames of the apparatus, the shaft 22 is provided with a gear 48 which is keyed to the shaft to rotate therewith and said gear meshes with a gear 49 which is keyed to the shaft 23 of the wire feed roll 15. The shaft 22 is also provided with a gear 51 which is mounted on the shaft 19 for free rotation thereon. The gear 51 meshes with a gear 52 which is keyed to the shaft 24 of the feed wheel or roll 16 whereby the latter is appropriately driven. In addition to the gears 43 and 52 on the shaft 24, there is also a gear 53 keyed to the shaft and meshing with a gear 54 keyed to the shaft 25 of the feed wheel 17 to thereby drive the latter.

Wire feed drive

The said shafts 21 and 22 are driven by means of gear connections to clutch shafts 210 and 211 on which are mounted clutch pulleys 26 and 27 respectively. The pulleys 26 and 27 are driven through the agency of multiple driving belts 212 which are in turn driven by engagement with a pulley 29 on the shaft of a motor 30. The motor 30 is mounted on a bracket member 31 (see Fig. 5) which is suitably vertically adjustably mounted on the main framework of the apparatus so as to facilitate vertical adjustment of the motor to thereby adjust the tautness of the belts driven by the said pulley 29. The pulleys 26 and 27 are adapted to be clutched to the shafts 210 and 211 respectively by means of suitable clutch mechanisms indicated generally at 28, the details of which form no part of the present invention and are therefore not described. The gear connection between the clutch shaft 210 and the upper wire feed roll shaft 21 comprises a gear 213 which is mounted on the shaft 210 and a gear 214 mounted on an end extension of the shaft 21. The gear connection between the clutch shaft 211 and the lower wire feed roll shaft 23 comprises a gear 215 mounted on the shaft 211, a gear 216 mounted on an end extension of the shaft 22 and an idler pinion 217, the latter meshing with both the gears 215 and 216 and being employed so as to effect rotation of the gear 216 and shaft 22 in the proper direction. Any suitable clutch mechanism, many of which are well known, may be employed for the purpose of interconnecting the pulleys 26 and 27 and their respective shafts 210 and 211 on which they are journaled.

The clutches 28 are here shown as being of a type which are adapted to be engaged by means such as a collar 55 (one for each clutch) which is movable axially of the shaft on which it is slidably supported to spread apart clutch controlling arms as illustrated and as well understood.

The clutches 28 for the respective shafts 21 and 22 are adapted to be automatically engaged to initiate operation of the coiling mechanism, and provision is also made for manually engaging each of the clutches independently of the other and also for mechanically and automatically effecting disengagement of both clutches upon completion of a predetermined cycle of operation and for simultaneously disengaging both clutches for emergency purposes.

The clutches are normally held in disengaged condition by means of a spring 56 which is stretched between a suitable part of the framework of the mechanism and the lower end of a lever or arm 57 which is keyed to or clamped on a shaft 58, the latter being suitably journaled in a bearing opening provided in a frame part or bracket provided for that purpose as best indicated in Figures 13 and 14. The lever 57 extends upwardly from said shaft 58 and is provided at its upper end with a yoke 59 which embraces the clutch-actuating collar 55 and is equipped with suitable chains or rollers 60 which enter peripheral grooves 61 in the respective clutch collars.

It will be understood that in Figures 13 and 14, there is shown the clutch mechanism associated with the shaft 22 and that the clutch mechanism employed in connection with the shaft 21 is identical in form and construction so that the description of the clutch mechanism shown in Figures 13 and 14 is also applicable to the clutch mechanism associated with the shaft 21.

For automatically engaging the respective clutch, each clutch mechanism comprises a bell crank arm 62 rockably mounted on the shaft 58. The upper end of said arm 62 has pivoted to it a dog 63, one end of which is suitably formed to engage a pin 64 carried by the yoke 59. The other end of said dog 63 is connected by a spring 65 to a portion of the arm 62 so as to be thereby normally held in a predetermined operative position as illustrated in Figure 13 but capable of being rocked about its pivot so as to pass under the pin 64 under certain circumstances. In the disengaged condition of the clutch, the forward end of the dog 63 engages the pin 64 so that clockwise rocking movement of the bell crank arm 62 will effect appropriate movement of the clutch collar 55 for effecting engagement of the clutch. The bell crank arm 62 comprises also an arm portion 66 which is suitably connected to mechanism for rocking the bell crank arms 62 and 66 to effect engagement of the clutch in synchronized relation to the operation of the spring assembling mechanism, and particularly with reference to the stopping and starting of the coiling mechanism during the feeding of a new row of springs into operative position in the spring assembling mechanism. The operating connections will hereinafter be described.

The bell crank arm 62 is rocked to move the clutch collar 55 for engaging the clutch but said arm is not maintained in an advanced position but is permitted to return to its normal position to which it is restored by a spring 84 stretched between a portion of the arm 62 and a suitable anchorage carried by the supporting frame structure. For holding the clutch engaged, there is provided a latch member 67 pivotally mounted as indicated at 68 on an adjacent frame part or bracket. Said latch is normally urged to move in a counter-clockwise direction so as to cause its shouldered front end to lockingly engage the clutch collar pin 64 to hold said clutch collar in clutch engaging position. Accordingly the latch 67 is provided with a rearward extension 69 which is connected by means of a spring 70 to a suitably located part of the supporting frame or bracket or a pin extending therefrom as indicated in Figures 13 and 14.

The latch 67 is automatically disengaged from the pin 64 in properly timed relation to other operations of the apparatus to permit disengagement of the clutch. For such automatic, timed disengagement of the clutch latch 67, the latch is provided with a downwardly extending bent arm 71 which has connected to it a downwardly extending link or rod 72, the lower end of which is pivoted to the end of an arm 73 which is rigidly mounted on a shaft 74 suitably journaled in portions of the framework or bracekts mounted thereon. Means for automatically rocking said shaft 74 to effect disengagement of the latch 67 will presently be described.

Wire feed braking mechanism

There is associated with each of the coiler mechanism wire feed shafts 21 and 22, braking mechanism for quickly stopping the operation thereof upon disengagement of the controlling clutches. It will be understood that upon the completion of the feeding of the necessary length of wires for the formation of the necessary lengths of helicals, it is advantageous to quickly stop the operation of the coiler mechanism so as to avoid the feeding of a helical more than a short distance beyond the far side of the spring unit being assembled, thereby to prevent waste of helical wire. Also quick stopping is desired to permit operation of certain cut-off devices and other operations of the assembling mechanism so as to cause the apparatus to operate without unnecessary loss of time, thereby to maintain a high rate of productive capacity.

The brake for each of the coiler mechanism wire feeds may comprise a suitable brake drum 75 securely mounted on the respective shafts 210 and 211 and a brake band 76, one end of which may be anchored as indicated at 77 on a pin rigidly mounted on and secured to a portion of the supporting frame structure. The other end of the brake band 76 is suitably connected to a rod 78 which in turn extends through an opening in the free end of an arm 79 which is rockably mounted on a supporting pin or shaft 80 carried by the supporting framework. Said arm 79 has rigidly connected to it, either directly or through the agency of the pin 80, an upwardly extending arm 81, the upper end portion 82 of which extends upwardly at an angle in such a position as to be engageable by a roller 83 carried by a portion of the pin 64. In the position of the parts shown in Figure 13, the clutch is disengaged and the roller 83 has rocked the arm 81 in a counter-clockwise direction and the arm 79 in a downward direction whereby said arm has pulled the brake band 76 tight on the brake drum 76, whereby rotation of the shaft controlled by the clutch was promptly stopped upon disengagement of the clutch.

As already explained, the clutch latch 67 is adapted to be mechanically actuated in synchronized relation to the operations of the apparatus but provision is also made for disengaging the clutch for emergency purposes. Such emergency disengagement of the clutch may conveniently be effected by means of a solenoid 85 which, when energized, pulls a core 86 into the solenoid. Said core 86 is pivotally connected at its upper end as shown at 87 to the latch 67 so that when said solenoid is energized, the latch may be disengaged whereupon the clutch will automatically disengage itself, usually incident to the force of certain springs constituting part of the clutch structure which normally tends to pull together the clutch operating arms which are spread apart by the clutch collar 55 when the clutch is to be engaged. The solenoid is adapted to be controlled by one or more suitable button switches or the like located at desired points around the apparatus where such switches are accessible to the machine operator or attendant.

*Electrical wiring deenergized when machine not operating*

For the purpose of safeguarding workmen around the machine during such time as the machine is not in operation, provision is made for automatically breaking the electric circuit in the wiring required on the machine for the purpose of the above mentioned emergency stopping switches and for the purpose of certain other switch controls which will presently be described. For that purpose, there is provided a double pole switch mechanism comprising switch units 129 and 130. There is of course one such switch associated with each of the clutch mechanisms for the shafts 210 and 211 and each switch is controlled by means of an arm 274 which is adjustably secured to the shaft 58. The lower end of the arm is operatively connected to a rod 88 which is slidably mounted in a block 89 which carries the contact elements of the switches 85 and 86. The front end of the rod 88 is pointed and is adapted to be moved between suitable blocks 90 and 91 of insulation material carried by the inner-most contact elements of the switch units to move the same outwardly into electrical contact with the outer-most elements. It will be seen that the arrangement is such that when the clutch is engaged, the arm 87 will be moved to the left from the position shown in Figure 13 sufficiently to close the switches 85 and 86. Thus, when the machine is in operation the switches 85 and 86 are closed so that electrical wiring on the apparatus is energized except in so far as other switch means open the circuit. Also, when the clutches are disengaged, the wiring will of course be deenergized by opening of the switches 85 and 86. Hence when the machine is not in operation and an attendant or perhaps a repairman is working on the machine, he is protected from any live electric wiring.

*Provision for manual operation of wire feed and helix-forming mechanism*

To facilitate manual turning of the shafts 210 and 211 for any purpose whatever, there is provided on each of these shafts, a hand wheel 91. The hand wheel is preferably so mounted on the shaft as to be normally free of connection therewith and any suitable manually adjustable clutch or interlocking means may be provided. In this instance, locking pins 92 are indicated and these locking pins, upon movement inwardly, are operative to lock the respective hand wheel 91 to the shafts 210 and 211.

For the purpose of permitting manual engagement and disengagement of the clutches 28, there are provided upwardly extending levers 93, each of which is pivotally mounted at its lower end on the pin 64 of the clutch collar locking mechanism. The clutch collar yoke 59 is provided with an upward extension 94 near the upper end of which there is secured a bolt 95 which passes through a slot 96 in the lever 93. The lever is capable of limited rocking movement about the axis of the pivot pin 64 relative to the arm extension 94 of the clutch yoke. At the lower end of each lever 93 there is provided a laterally offset extension 97 from which a pin 98 extends into overlying relation to the latch 67.

As shown in Figure 13, the hand lever is in the position which it occupies when the clutch is disengaged. It will be apparent that by moving the lever 93 to the right, the clutch yoke 59 will also be moved to the right to thereby adjust the clutch collar 55 to engage the corresponding clutch. By examination of Figure 13, it will also be apparent that when the clutch is engaged and the lever and yoke moved to the right, the lever may be rocked to the left about the axis of the pin 64 without correspondingly moving the yoke because of the pin and slot connection 95—96 between the lever 93 and said yoke arm 94. However, when the lever 93 is so rocked independently of the yoke arm, the pin 98 carried by the lateral extension of the lower end of the lever will engage and move the locking latch 67 downwardly to thereby disengage it from the clutch pin 64, whereupon the clutch is permitted to disengage itself. The upper end of each lever 93 has connected to it a rod 99 which extends across the coiling mechanism and is provided with a handle 100 on the wire coiling side of the mechanism where it is conveniently accessible to an operator or attendant of the machine.

*Automatic wire feed stop*

As already indicated, there is provided means for automatically stopping the operation of the coiling mechanism when a predetermined length of wire has been fed through the coiling mechanism. Relatively independent means for this purpose is provided for the upper wire feed rolls and for the lower wire feed rolls.

The lower wire feed controlling means comprises an endless chain 101 which is carried by an upper sprocket 102 and a lower sprocket 103. The lower sprocket 103 is rotatably supported on a shaft carried by a suitable bracket vertically adjustably mounted on the framework of the apparatus as clearly shown in Figures 5 and 6. The upper sprocket 102 is journaled on a sleeve 104 which is in turn rotatably supported on a stub shaft 105 which is carried by suitable bracket 106 secured to the supporting framework of the mechanism (see Figures 5, 6 and 12). The sprocket 102 is locked against axial shifting on the sleeve 104 by means of a screw 107 which is fastened in a hub portion of the sprocket and caused to project into an annular groove 108 provided in the said sleeve 104. The sleeve 104 has suitably keyed to it a gear 109 which meshes with a gear 110 journaled on a shaft supported by the bracket 106. The gear 110 meshes with the gear 111 which is secured to the shaft 23 of the lower wire feed roll 15. It will be seen that when the lower wire feed rolls are in operation, the gear 111 will transmit rotation through the gears 110 and 109 to the sleeve 104. The outer end of the sleeve 104 is provided with a ratchet formation 112 which cooperates with a dog 113 carried by the sprocket 102 to transmit rotation from said gear 109 and sleeve 104 to said sprocket 102. As indicated in Figure 5, the dog 113 is pivoted at 114 near one end to the sprocket 102 and connected at its other end by means of a spring 115 to the sprocket and thereby yieldingly held in engagement with said ratchet 112.

It will be observed that the chain 101 will be driven so long as the lower wire feed rolls are driven. The chain 101 is provided with a special link which projects outwardly therefrom to form a cam lug 116. Said cam lug is adapted to engage a roller carried by the free end of an arm 117 which is secured to the shaft 74. The cam lug 116, acting on the roller of the arm 117 serves to rock said shaft 74 in the proper direction to move the arm 73 (Figure 14) and rod 72 downwardly to thereby effect disengagement of the clutch latch 67 from the clutch pin 64 whereupon the clutch will be automatically disengaged.

The chain 101 is preferably supported where it is engaged by the roller of the arm 117, by means of a sprocket 121 which is journaled for free rotation on a suitable stub shaft projecting from a bracket 122 which is suitably mounted on the frame work of the mechanism.

The chain 101 is of such length that its cam lug 116 will make one complete circuit around the sprockets 102 and 103 for each length of wire formed into a helical for the tying together of the bottom coils of one pair of adjacent rows of springs of a full width inner construction unit.

To facilitate the use of the apparatus in connection with the production of a smaller sized inner construction unit, there is provided a chain 118 supported by a sprocket 119 and a sprocket 120. The sprocket 119 may be formed integrally with the sprocket 102 so that it is driven simultaneously therewith whereby the chain 118 is also driven. The sprocket 120 may be journaled for free rotation on the stub shaft which also supports the sprocket 121. The chain 118 carries a cam lug 123. The chain 118 is of such length that its lug 123 will make one complete circuit about the supporting sprockets 119 and 120 for each shorter length of wire to be fed for tying together the lower coils of an inner construction unit embodying shorter rows of springs. When the shorter rows of springs are to be tied together, the arm 117 is shifted axially along the shaft 74 sufficiently to cause its free end roller to be engaged by the lug 123 of the smaller chain 118 instead of by the lug 116 of the longer chain 101. The purpose of the pawl and ratchet driving connection between the gear-driven sleeve 104 and the sprockets 102 and 119 will presently be explained.

To prevent over-running of the chains 101 and 118 upon disengagement of the clutch, a friction brake device of the character illustrated in Figure 22 is employed in connection with the sprockets 120 and 121. As there shown, the bracket 122 is provided with an ear 145 which screw threadedly receives a tubular housing 146. Within one end of the housing there is slidably disposed a plug of suitable friction material 147, which is resiliently urged against the adjacent face of the sprocket 120 by a coil spring 148, the compression of the latter being adjustable by means of an adjustable screw plug 149 seated in the opposite or outer end of the housing 146.

The length of wire fed by the upper feed rolls in each cycle of operation of the mechanism is similarly controlled, there being provided a long endless chain 124 and a short endless chain 125 suitably gear-connected to the shaft 20 of the upper wire feed roll 12. Such gear connection is perhaps best shown in Figure 8 wherein a gear 126 is illustrated as being mounted on an extension of the shaft 20, said gear 126 meshing with a gear 127 which is adapted to drive a sprocket 128 through a pawl and ratchet arrangement such as already described for driving the chains 101 and 118. In this instance, however, the shorter chain 125 is driven through the agency of the chain 124 by engagement of a sprocket which is rigidly connected to the sprocket 128 at the lower turn of the longer chain 124. The chains 124 and 125 are equipped with suitable cam lugs for acting against a roller carried by the free end of an arm 117A which is mounted on a shaft 74A, the latter being associated with the clutch mechanism for controlling the drive of the upper wire feed rolls, whereas the arm 117 and shaft 74 are associated with the mechanism for controlling the clutch which controls the drive of the lower wire feed rolls.

The sprocket 127 (and an associated gear, see Figure 6) is supported by a bracket 323 which is rotatably adjustable about the axis of the shaft 20 as best shown in Figure 5, to selected position of adjustment in which it may be securely clamped as indicated. The bracket 106 which carries the sprockets 102 and 119 and the gear 109, is similarly rotatably adjustable about the axis of the gear 110 (see Figures 5, 6 and 12).

Drive of wire supply reels

The supply rolls of wire 4 and 5 may be driven by power derived from the shafts 19 and 22 of the upper and lower wire feed roll sets respectively. For this purpose the shaft 22 of the lower wire feed roll set is provided with a gear 131 which drives a chain 132, which in turn engages a sprocket 133 on a shaft 134 journaled in suitable brackets carried by the frame structure as best shown in Figures 3 and 4. The shaft 134 is provided with a sprocket 135 which drives a chain 136 which in turn drives a sprocket 137 which is connected to the friction wheel 7 for driving the wire roll basket 5.

The upper wire basket is driven by a power take-off from the shaft 19 for which purpose said shaft is provided with a sprocket 138 which drives a chain 139 which in turn drives a sprocket 140 which is secured to a shaft 141 suitably journalled in bearing brackets carried by the framework of the apparatus. Said shaft 141 also has secured to it a sprocket 142 which drives a chain 143 which in turn drives a sprocket 144 rigidly connected to the friction wheel 7 for driving the upper wire roll basket 4.

Helix-forming mechanism

The wires W are guided in their passage between the two pairs of said rolls which feed the wires, in suitable guides 150 which are preferably of such a character that they may be easily dismounted for cleaning and other purposes when desired.

From the last pair of feed rolls for the upper wire, i. e., the rolls 12 and 13, and from the last pair of feed rolls for the lower wire, i. e., the rolls 16 and 17, the wires are delivered to coilers, the construction of which is best shown in Figures 15 to 18 inclusive. As there shown, each coiler comprises a mounting member 151 which has a shaft portion 152 nonrotatably seated in an opening provided in an arbor box 153 which is horizontally slidably mounted in the supporting frame structure of the mechanism. Said arbor box 153 is normally locked in fixed position by means of a nut 154 which is threaded on an extension of the arbor box 153, the opposite side of the arbor box being provided with a laterally extending flange portion 155 which cooperates with the nut to grip the intervening frame portion to thereby hold the arbor box in fixed position. Horizontal adjustment of the box may be effected when desired by loosening the nut 154 and turning an adjusting screw 156 in or out as may be required to effect the desired in or out adjustment of the arbor box. A coil spring 157 recessed into a portion of the supporting frame structure serves to resiliently hold the arbor box in engagement with the end of the adjusting screw 156 during the making of the adjustment while the nut 154 is loose.

The mounting member 151 is bored out to provide a recess in which is seated a more or less cylindrical tubular element 158, the latter being locked in place in the member 151 by a suitable set screw 159 (see Figure 17). Within the sleeve-like member 158, there is disposed a rod or core 160 which is provided with a groove 161, the front end portion of which is substantially straight and parallel with the axis of the core and the rear portion 163 of which extends helically around the core. The pitch of the helical portion 163 of the groove in the core 160 is preferably of slightly greater pitch than the pitch of the helical spring which is to be produced. The core 160 is locked in place in the sleeve 158 by means of a suitable set screw 164. It will be seen that the wire W delivered by the feed rolls 16 and 17 into the coiler tube 158 will be forced into the form of a helical incident to the passage of the wire through the groove 161. Upon emerging from around the core 160, the helical wire is guided around the outside of a core or pin 165 which is preferably formed integrally with the core 160. Said pin 165 extends through an axial opening in a helically grooved collar 166 which is seated on the pin 165 and preferably locked thereon against rotation by means of a pin 167 which extends through the collar and the pin 165 in such a location as to void passing through the helical groove in the collar. The collar is furthermore housed in a suitable recess 168 provided in a holder 169. The holder 169 is provided with a laterally extending post 170 which is horizontally slidably disposed in a suitable opening provided in the mounting member 151. A spring 171 interposed between portions of the mounting member 151 and the member 169 serves to yieldingly urge said member 169 and the parts carried thereby to move away from the mounting member 151 and such movement is adapted to be limited or effected by means of a screw 172 which is freely rotatable in the member 169 and threaded into the mounting member 151. A set screw 173 is employed for further locking the stem portion 170 in fixed position in the mounting member 155.

The pitch of the helical groove in the member 166 is preferably slightly smaller than the pitch of the helical wire delivered from the helical-forming elements 158 and 163 and serves to impart a slight further bending to the wire to bring the pitch of the helical to the desired finished size. For example, the pitch of the groove in the member 166 may be approximately .005 inch less than the pitch of the forming helical groove in the core element 160. The pitch-sizing collar 166 may be easily replaced if it is desired to produce a pitch substantially different from that which may be produced by means of the collar shown. Also, adjustment provided by the described mounting of the member 169 on the member 151 permits the sizing collar to be adjusted toward or from the delivery end of the coiling device to thereby vary the pitch-determining effect of the grooved collar 166. If, for example, the collar is moved nearer to the discharge end of the helical-forming core 160, the coils of the helical wire will be more sharply bent so as to reduce the pitch of the helices. This adjustment is employed to produce the finished size of the helical wire the pitch of which is usually in the neighborhood of .005 inch less than the pitch of the wire as delivered from the helical groove 163 in the core 160.

To facilitate replacement of the collar 166, the member 169 is made in two parts, an end section or part 174 being detachably secured to the member 169 by suitable bolts 175. The recess 168 is formed partially in the member 169 and partially in the member 174 so that upon separation of the member 174 from the member 169, the collar may be easily removed. As shown, the mounting member 151 also includes a removable end piece 176 which is secured by means of suitable bolts 177 to the member 151. The opening in which the part 170 is seated is preferably formed partially in the removable end member 176.

*Helix guide to spring holding mechanism and automatic trouble and wire exhaustion detectors*

The helical wire upon emerging from the coiling and sizing devices enters a channel-like guide 178 which conducts the helix to the spring assembling apparatus. Said guide 178 includes a cover plate 179 which is preferably so mounted as to be easily opened for inspection and other purposes. It may be suitably hinged to the channel body and spring-held in closed position. Near its receiving end, the guide 178 has a side wall portion cut away and replaced by a closure plate 180 which is carried by the upper end of an arm 181. Said arm 181 has secured to it a block 182 which is pivotally mounted as indicated at 183 on a pivot pin which is carried by a pair of side flanges 184 of a block 185. The block 185 is vertically slidably guided in a channeled mounting member 186, side flanges 187 of which are provided with suitable slots such as indicated at 188 for receiving projecting end portions of the pivot pin 183 and of another cross pin 189 which is carried by the block 185. The slots 188 may be provided with seats, such as indicated at 190, for receiving the ends of the pins 183 and 189 in the two positions provided for the block 185. The block 185 is normally urged to move outwardly so as to cause said pin ends to be seated in said seats 190 by a suitable coil spring 191 which is recessed into the block 185 and serves to urge a suitable plunger element 192 into frictional engagement with the adjacent wall of the member 186. It will be seen that the member 185 together with the arm 181 and closure 180 may easily be manually adjusted from operative position as shown in Figure 19 to an inoperative position as shown in Figure 20 when access to the channel guide 178 is desired. When the arm 181 and closure plate 180 are in operative position as shown in Figure 19, any tendency for the helical wire to bulge outwardly will of course cause the closure 180 to move outwardly, thereby rocking the arm 181 about its pivot 183. Outward bulging of the helical within the length of the cover plate 180 is facilitated by bevelling of the bottom of the channel as indicated at 195. The bevelled bottom portion 195 tends to direct the helical to bulge outwardly within the length of the cover plate 180 in the event that some resistance develops to the proper travel of the helical in the guide member.

The arm 181 is extended downwardly and has its lower end portion overlapping the end of a plunger 193 of an electric switch 194 which is suitably mounted in the frame structure. In the event that the arm 181 is rocked as above indicated by an outwardly bulging helical wire, the plunger 193 will be moved inwardly of the switch 194 to thereby close an electric circuit to one of the solenoids 85 for releasing or disengaging the clutch which controls the driving of the wire feed wheels by which the bulging helical wire is being fed. In this manner, any interference with the normal movement of the helical wire will result in stopping of the feed of that particular wire without interfering with the feed of the other wire. As best shown in Figure 24, each of the helical wire guideways 178 is provided with the described mechanism actuated by a bulging helical so that the clutches are independently controlled.

Means is also provided for stopping the operation of the appropriate wire feed rolls in the event of exhaustion of the supply of wire or in the event of a break in the length of the wire drawn from the supply roll to the coiling apparatus. For that purpose there is provided in connection with each wire an electrical switch 196 which is adapted to be closed by the movement of an arm 197. The arm 197 is pivotally mounted on a suitable stationary supporting part and it has a weighted end portion overlying and resting on the wire. In the event that the wire is broken or the supply exhausted so that the support of the wire for the weighted end of the arm 197 is removed, the arm will automatically be rocked incident to the weight at one end thereof and will close the switch 196, which will also serve to energize the appropriate solenoid 85 and to disengage the corresponding clutch which controls feeding of the wire, the end of which has just been detected.

*Spring holding jaws and guides for directing helices around spring coil portions*

The helix wires guided by the tracks 178 are delivered by the latter to lower and upper guide strips or tracks 198 and 198a which extend from side to side of the spring assembling mechanism of the apparatus. The guide strips 198 and 198a are of substantially like construction, each being formed from a plurality of sections disposed in end-to-end relation and provided with uniformly spaced oblique grooves corresponding to the pitch and angle of the coils of the helix. The coils of the helical enter the grooves of said guide strips so that the helical is thereby positively guided and controlled in its travel through the spring assembling mechanism.

The helical guiding and controlling mechanism for the upper helical is substantially a duplicate of the mechanism for guiding and controlling the lower helical. It will of course be understood that the mechanism for the upper helical is disposed in inverted relation to the mechanism for the lower helical and that the upper helical controlling mechanism is mounted on an elevated supporting structure, whereas the lower mechanism is supported by a bed plate. The following explanation of the helical guiding and controlling mechanism, although made in respect of the lower mechanism, will be applicable also to the upper mechanism, except in so far as any details peculiar to either the upper or lower mechanism are particularly pointed out.

The helical wire guide 198 comprises a plurality of units, each of which is somewhat longer than the diameter of the bottom coils of the springs to be assembled. The track is made in relatively short units, assembled in end-to-end relation so as to facilitate production and replacement of the track units which are preferably made of wear-resisting, hard steel. As best shown in Figure 42, the track 198 is seated in a recess 199 provided in the bed plate 200 of the mechanism, the bed plate being in turn supported by a suitable supporting frame as shown.

For holding the end coils of the springs stationary and in fixed relation to the track 198 while the helical is advanced and threaded around such end coils, there are provided pairs of jaws which are slidably mounted on the bed plate 200 for movement transversely of the guide track 198, the jaws of each pair being disposed on opposite sides of the track. There is of course one pair of jaws for each spring in the rows of springs so that each spring will be held by a pair of jaws.

One pair of such jaws is shown in Figure 42 wherein a front jaw is indicated at 201 and a rear jaw at 202 (see also Figure 25a).

The sections which form the track 198 are positioned on the bed plate by means of a plurality of pins 203 which are suitably anchored in the bed plate 200 and slidably but snugly fit in openings provided in the track sections (see Figs. 43 and 51).

Intermediate the pairs of jaws, there is provided on opposite sides of the track 198, wall-forming plates 204 and 205 (see Figures 39, 40 and 41) which are seated at their bottom edges in appropriately enlarged portions of the groove or seat 199 in the bed plate 200. The wall-forming plates 204 and 205 extend upwardly beyond the bottoms of the oblique helical guiding grooves 206 in the track 198 to an extent which is approximately equal to the diameter of the helical to be guided and the width of the track 198 is also approximately equal to the diameter of the helical so that there is formed a channel-like recess, the width and maximum depth of which is substantially equal to the diameter of the helical which is guided. The side wall-forming plates 204 and 205 are riveted or otherwise fastened as shown at 207 (see Figures 43 and 51) to the respective end portions of the sections of the track 198 which they embrace.

The track sections are anchored in place through the side plates 204 and 205 which are locked in place by means of suitable clips 208 having end portions seated on shoulders formed by grooves provided for that purpose in the sides of the plates. The clips 208 are held down by means of suitable screws 210 which are threaded into the bed plate 200 (see Figures 40 and 41). When it is desired to remove a single section, the screws 210 on opposite sides of both end portions of the section are removed, whereupon the section with its four side plates may be pulled off its centering pin 203. Each track section is preferably provided with a notch 324 (Figures 47 and 51) to facilitate the employment of a suitable lifting or prying tool for removing the section from its said positioning pin 203.

For guiding the clamping jaws 201 and 202 in their sliding movement transversely of the length of the helix guide track 198, there is provided intermediate the jaws on each side of the track, plate members 211 and 212 respectively, the same being suitably bolted or otherwise secured in fixed position on the bed plate 200. At each side of each plate 211 and 212, there is provided a recessed guideway 213 which slidably receives a flange-like extension 214 from the adjacent side of the jaw 201 or 202. The jaws at the ends of the two rows thereof have their outer side edges similarly guided by guiding plates indicated at 211a and 212a (Figure 41), these end-guiding plates being of reduced width as shown.

Spring holding jaw operating mechanism

The jaws 201 and 202 are simultaneously moved toward the guide strip 198 (or 198a) for the purpose of clamping the end coils of the springs to be assembled in fixed position relative to said guide track 198 or 198a. For the purpose of so moving the jaws 201 and 202, there are provided pairs of rock arms 215 and 216, each of which is pivoted intermediate its end as indicated at 217 to and between suitable bracket pairs 218 and 219 which are in turn rigidly secured in a suitable recess or seat such as 220, provided in an appropriate portion of the frame structure as best shown in Figures 33 and 35.

One end of each arm 215 and 216 is provided with a reduced portion 221 which enters an opening 222 in the jaw 201 and an opening 223 in the jaw 202. At its other end, each arm 215 and 216 is connected to a toggle collar 224 which is keyed to a lower rock shaft 225 or upper rock shaft 226 (see Figures 35 and 37). As shown in Figure 35, the jaws 201 and 202 are in closed position and as shown in Figure 37, they are in open position. By inspection of these figures, it will be observed that when the rock shaft 225 is rocked in a clockwise direction, the rock arms 215 and 216 will be oppositely rocked to effect simultaneous inward movement of the opposed jaws 201 and 202. Each connection between the arm 215 or 216 and the collar 224 comprises a rod 227 pivoted as shown at 228 to the collar 224. The outer end portion of each rod 227 is slidably mounted in a suitable opening provided in a block 229 which is pivotally secured to the end of the arm 215 or 216. On the outer end of the rods 227, there are provided a pair of nuts 230, one of which acts as a lock nut for the other, said nuts serving to transmit movement of the rod 227 in an inward direction to the arm with which it is connected. By adjustment of the nuts 230, it is possible to effect limited adjustment of the outermost position to which the jaw 201 or 202 is moved. Inward movement of the jaws is effected through the agency of a coil spring 231 which is disposed around each rod 227 and through which outward movement is imparted to the arms, as would be apparent from an inspection of Figures 34, 35 and 37.

The shafts 225 and 226 are adapted to be rocked simultaneously in the same direction by cam mechanism best shown in Figures 24a and 32. As there shown, the shafts 225 and 226 are provided with arms 232 and 233 respectively, each of which have their outer or free ends pivotally connected to a link or rod 234. Said link or rod 234 is, in effect, extended downwardly as indicated at 234a and is pivoted at its lower end to the free end of the cam-actuated arm 235 which is rockably mounted on a shaft 236, the latter being suitably supported in brackets as illustrated. Said arm 235 has rigidly connected to it an ear 237 which carries a roller 238, which in turn operatively engages the periphery of a cam disk 239. Said arm 235 also has rigidly connected to it an extension 240 which carries a roller 241, which in turn engages the periphery of a cam disk 242. The cam disks 239 and 242 are keyed to a main cam shaft 243 which is journaled in suitable bearings provided in the frame structure of the apparatus and continuously driven by means which will hereinafter be described. The cams 239 and 242 are of such form that they are operative to positively rock the arm 235 up and down in properly timed relation to the other operations of the mechanism to effect rocking of the shafts 225 and 226 and in-and-out sliding movement of the spring clamping jaws 201 and 202.

Spring holding jaw details

The end coils of the springs which are to be connected by the helical are initially delivered by means which will hereinafter be described to a position in which portions of the coils are adjacent the helical guide track 198 and in front of the operative ends of the jaws 201 and 202.

The jaw 202 is provided with a removably mounted end structure 244 of suitably hardened metal. Said end structure 244, in the main, overlies the jaw plate 202 as clearly shown in Figure 42 but it has a front end portion 245 which extends downwardly over the front end of said plate part 202 and under a lip portion of the latter (see Figures 42 and 47).

The said jaw structure 244 is provided with a concavely arched shoulder or seat 245 and with a convexly arched shoulder or seat 246 for cooperating with a pair of spring coils which are to be joined. As shown in the drawings (see Figures 42 to 47 inclusive), the concave seat or shoulder portion 245 is adapted to engage the outside or convex side of the lowermost coil A of a spring S which is disposed in overlapping relation to the lowermost coil B of another spring S which is in overlapping relation to the coil A. It will be understood that the shoulders 245 and 246 are divided into separate sections as shown, as an incident to the illustrated notching and slotting of the jaw structure. The notches indicated at 247 are adapted to register with corresponding notches or grooves 248 in the guide track 198 so as to constitute, in effect, helical continuations of said grooves. Said notches 247 serve to permit the helical wire to continue its travel along the guide track 198 while also being fed through said notches 247. The centrally disposed slot 356 in the jaw is provided for the purpose which will presently be described.

In the zone wherein the jaws 201 and 202 grip the coils A and B of each pair of springs to be united by the helical, the guide track 198 is recessed as indicated at 251 to provide a seat for the coil A. The side wall of said recess is concavely arched to substantially correspond to the convexity of the shoulder 246 of the jaw 202.

The jaw 201 is also provided with a convex seat 249 and with a flat seat 250. The convex seat 249 cooperates with the concave seat 245 of the jaw 202 to tightly grip the coil B of the spring as will be apparent from an inspection of Figures 44, 46 and 47. The flat seat 250 of the jaw 201 engages the adjacent side of the guide track 198 to support the same, while the convex seat 246 of the jaw 202 cooperates with the concave seat 251 of the guide track to tightly grip the coil A of the other spring (see Figures 45, 46 and 47).

By reference to Figures 46 and 47, it will be seen that the coils A and B are completely housed by the jaws 201 and 202 and the guide track 198. It will be understood that the notches 247 in the jaw 202 and similar notches 252 in the jaw 201 register respectively with the notches 248 in the guide track 198 to form continuations thereof through which the helix H may be threaded incident to rotation and forward movement of the helix. The grooves 248 and the continuations thereof in the jaws correspond in pitch and angle to the pitch and angle of the turns of the helix so that said helix may easily be advanced along the track 198 incident to its rotation and forward movement as already mentioned. It will of course be apparent that incident to the definite path of travel of the helix, the advancing end thereof will be carried around the coil portions A and B when they are gripped between the jaws and the guide track in the manner explained.

It is preferred that the seat 249 of the jaw 201 and the seat 246 of the jaw 202 be arched to a larger radius than that of the engaged coil portions A and B so that said coil portions will be flexed to a somewhat larger radius. The seats need not be formed on a true radius but they may be more or less flattened lengthwise as shown particularly in respect of the seat 246 of the jaw 202 in Fig. 45. The seat 246 is preferably flattened to a greater extent than the seat 249 of the jaw 201. The straightening of the coil portions thus effected, serves to insure free movement of the helix around the jaw-held coil portions. When the coils are released, a desirable snug fit of the coils within the helices results from the resilient return of the coils A and B to approximately their normal curvature. It also serves to prevent noisy shifting of the springs and helices relative to each other. Portions of the coil B are supported by engagement with bevelled corners 253 of the adjacent side plates 204 (see Fig. 44) and portions of the coil A are supported by engagement with the bevelled corners 254 of the adjacent side plates 205. The seats 245 and 251 are shaped complementary to the respective seats 249 and 246 with which they cooperate.

The jaw 201 is also provided with a lip-like extension 255, said extension being operative to overlie and close the upper side of the helix guide channel between the jaws 201 and 202, as is best shown in Figures 46 and 47.

Guide track covers

For preventing the helix wire from bulging upwardly from the guide track 198 intermediate the pairs of jaws 201 and 202, there are provided cover plates 256 which are mounted for movement from operative or closing position to open position wherein the helix wire may be lifted out of the track and moved laterally as occurs upon completion of one cycle of operation. In other words, when a helix has been fed endwise across the entire width of the inner construction unit being produced, the helical together with the springs which are thereby united is lifted out of the track 198 and from between the side plates 204 and 205 so as to permit lateral advancement of the inner construction unit transversely of the length of the helical guide track 198.

Each cover plate 256 is mounted on the bifurcated end 257 of a rock arm which is pivotally mounted at its other end as indicated at 258 in spaced side portions of a mounting block 259. The mounting block 259 is seated in a groove 260 provided in the slide plate 211 and movably secured therein by a bolt or the like as shown (see Figures 39 and 42). Intermediate its ends, the arm 257 has pivoted to it a depending rod 261, the latter extending downwardly through an opening provided in the mounting block, bed plate and other parts, and having its lower end slidably mounted in a block 262 which is pivoted to the free end of a rock arm 263 (see Figures 34, 38 and 39.) The rod 261 is provided with an enlargement or shoulder 264 which is engaged by the block 262 so that upon upward rocking movement of the arm 263, the rod 261 will be moved upwardly and the arm 257 and cover plate 256 correspondingly moved upwardly. The lower end portion of the rod 261 is provided with a compression spring 265 which is confined between a pair of nuts threaded on the extreme end portion of the rod 261 and the adjacent side of the pivoted block 262. When the rock arm 263 is rocked downwardly, its downward movement will be transmitted through the spring 265 to the rod 261 so as to thereby move the latter and the cover plate 256 downwardly to closed position as shown in Figures 34 and 39. It will be seen that the closure plate 256 is thereby resiliently held in closed position and that extreme accuracy in respect of the downward movement of the rock arm 263 is not required. It will also be understood that in respect of the closure plate 256 for the upper helical guide track 198a, the arm 263 is rocked upwardly instead of downwardly to close the helical guideway, the structure shown in Figure 38 being that employed in connection with the closure plates for said upper helical guide track.

The arms 263 for operating the lower guide track cover plates are keyed to a rock shaft 266 which is mounted in suitable bearings carried by the stationary frame structure and the rock arms 263 for the upper guide track closure plates are secured to a rock shaft 267 which is suitably journaled in bearings carried by the stationary frame structure.

The rock shaft 266 is rocked to effect opening and closing of the closure plate 256 by means of a cam 268 keyed to the rock shaft 225 which is actuated by the cams 239 and 242 as already explained. Said cam 268 acts against a pair of rollers 269 and 270 carried by integrally formed arms which are keyed on the shaft 266. The cam 268 is of such shape that rocking movement of the shaft 225 will be imparted to the shaft 266 in properly timed relationship to other operations of the apparatus and to the extent required to effect the desired opening and closing movements of the closure plate 256.

The shaft 267 which actuates the upper guide track closing plates is rocked by means of a suitable cam 271 which is keyed to the shaft 226, the latter being also actuated as previously explained by means of the cams 239 and 242. Said cam 271 acts against a pair of rollers 272 and 273 which are carried by integrally formed arms mounted on the shaft 267. It will of course be understood that the cam 271 is appropriately shaped to effect rocking of the shaft 267 as is required for the purpose of opening and closing the upper track closure plates 256 in properly timed relation to the other operations of movements of the mechanism.

Helix cutting and end trimming

When the operation of feeding a helical across the assembling mechanism is completed, the coiler mechanism is stopped so that the helicals come to a rest. It is then necessary to sever that portion of the helical wire which extends across the width of the spring construction unit from the continuous length of helical wire which is being fed to the assembling mechanism by the coiler. Also, as a practical matter, it is found advisable to advance the helical slightly beyond the far side of the spring construction unit and to trim off excess end portions of the helical, thereby to effectively insure the provision of uniformly extended helicals at the far side of the spring construction unit, it being understood that the far side of the unit refers to that side thereof which is remote from the coiler mechanism. Helical cut-off devices are accordingly provided at both sides of the spring assembling unit and for both the top and bottom helicals. Each of the four cut-off mechanisms thus provided is of substantially like construction, it being understood of course that those for cutting off the upper helical are inverted with reference to those employed for cutting off the lower helical and also that the cut-off mechanisms in the opposite sides are right-hand and left-hand arrangements respectively.

Each of the cut-off mechanisms comprise a longitudinally movable cutting bar 275 and a normally stationary cutting member 276. Two of the cutting units appear in Figure 33 and the other two appear in Figure 34. Similarly in Figure 25, two of the cutting units are indicated in dotted lines and the other two are similarly shown in Figure 25a. As shown in the plan views Figures 25 and 25a, the cutting units are angularly disposed to be thereby more efficient in acting on an angularly disposed portion of the helical.

As best shown in Figures 33, 34, 41, 43, 51, 52, and 52a, the longitudinally movable cutter member is slidably mounted between a pair of side members 277 and 278, on top of a block or plate 279 and under a cover plate 280. The cutter block or plate 278 is in turn mounted on a portion of the bed plate 200.

Each longitudinally movable cutter bar 275 comprises an upper, hardened metal rod 281 and a lower supporting member 282, the latter being extended rearwardly or outwardly beyond the guiding structure and provided with a fork or clevis 283 which embraces and is pivoted to the end of a rod 284.

The rod 284 is connected to mechanism, which will presently be described, for reciprocating the cut-off member at the proper time.

The stationary cut-off element 276 is vertically adjustably mounted in suitable apertures provided in the bed plate 200, the underlying frame part and in the adjacent end portion of the overlying helical guide track portion 198. The member 276 is snugly fitted in the apertures as explained and is vertically adjustably supported by means of a lever piece 285, one end of which bears against an overlying portion of the frame structure as indicated at 286 and the other end of which supports the cut-off member 276 as indicated at 287. A screw 288 threaded into the overlying frame part passing through a suitable opening in the lever 285 supports both the lever 285 and the cut-off member 276 and facilitates vertical adjustment of the latter to the required co-operative relationship to the cut-off member 275. A suitable set screw 291 is employed for locking the cut-off member 276 in adjusted position. The upper end portion of the cut-off member 276 is preferably of flat-sided form and slidably fitted in a correspondingly shaped opening which will effectively prevent rotation of the member about its vertical axis. As shown, the upper end portion of the member is so shaped that its operative face 276a is substantially parallel to the operative or cutting end 281a of the cut-off member 281.

The operative face 276a of the stationary cut-off member 276 is further strengthened by imbedment therein of an extra hard alloy metal tip element 276b and the movable cut-off member 281 is similarly provided with a hardened alloy insert element 281b to more effectively resist dulling and wear of the cutting edges. The hardened inserts 276b and 281b will be of any selected metal, alloy or material which is suitable for the cutting of tempered spring wire such as is employed in the helices H. One such alloy material is known as "Firthaloy."

As best shown in Figure 43, the end section of the track 198 in which the cut-off member 276 is mounted has the recess for receiving the upper portion of the cut-off member disposed at an opening to one side of the section. In order to adequately prevent the cut-off member from being displaced sideways out of the open side of the member, the cut-off member and the recess in which it is fitted are given the more or less wedge shape shown. Said wedge shape also avoids excessive recessing and weakening of the track section through which the cut-off member passes.

The cut-off devices are operative to cut the helices in a horizontal plane approximately midway of the vertical height of the respective helices. At the free ends of the helices, short end portions are trimmed off and permitted to drop into chutes which guide the trimmings into a suitable receptacle. At the helix-receiving side of the spring assembling mechanism there are of course no excess or waste pieces trimmed off but the helix is severed at the proper point to separate a spring row uniting length thereof from the incoming supply length of the helical.

For the purpose of collecting the trimmed-off free end portions of the helical, the adjacent free end portions of the lower track element 198 is bevelled or tapered downwardly as shown at 198b and a suitable opening is provided in the underlying portion of the bed plate 200 to permit dropping of the cut-off helical portions into a conveyor chute 289 (see Figures 34 and 41) which is suitably mounted in the framework of the apparatus. Said chute has a branch 290 (see Figure 34) which extends upwardly to receive portions cut from the upper helical.

The mechanism for actuating the cut-off members 275 at the side where the free ends of the helicals are trimmed off, comprises a pair of cams 292 and 293 which are carried by the main cam shaft 243 (see Figures 24a, 25a and 27). The cams 292 and 293 respectively act against rollers 294 and 295 which are carried by an arm 296 which is pivotally mounted intermediate said rollers on the supporting frame structure. One end of said arm is connected by means of a link rod 297 to the end of one arm of a bell crank lever 298 which is pivotally mounted as indicated at 299 in a suitable bracket carried by the frame structure. Said bell crank 298 has its other arm pivotally connected to the rod 284 which, as already explained, is pivotally connected to the reciprocable cutter member. The other end of the lever 296 is connected by means of a short link 300 to the free end of an arm 301 which is secured to a rock shaft 302 journaled in suitable bearing brackets carried by the frame structure. Said shaft 302 has another arm 303 secured to it, the free end of said arm 303 being connected by means of an adjustable link 304 to the free end of one arm of a bell crank lever 305. The bell crank lever 305 is suitably pivoted to the frame structure and has an upwardly extending arm portion which has its free end pivoted to the rod 284 of the lower helical cutting member, said rod 284 being in turn pivoted to the longitudinally reciprocable lower cutting member as already explained.

The means for operating the cut-offs at the other side of the apparatus is best shown in Figures 24, 25, 28, and 33. Said mechanism comprises a pair of cams 306 and 307 which respectively act against rollers 308 and 309 carried by the opposite ends of a lever 310 which is pivotally mounted intermediate its ends as indicated at 311 on the framework of the apparatus. Said cams 306 and 307 are keyed to the main cam shaft 243 and are so formed as to positively rock the lever 310 about its pivot. One end of said lever 310 is connected by means of an adjustable link 312 to one arm of a bell crank lever 313 which is in turn pivotally mounted as indicated at 314 on a suitable bracket or the like carried by the frame structure. The other arm of said bell crank is suitably pivotally connected to the rod 284 which in turn is pivotally connected to the longitudinally reciprocable cut-off member 275 of the lower helical cutting device.

The other arm of the rock lever 310 is connected by means of a link 315 to the free end of an arm 316 which is carried by a rock shaft 317 suitably journaled in bearings carried by the frame structure. Near its other end, said shaft 317 is provided with an arm 318 which is connected by means of a short link 319 to the free end of one arm of a bell crank lever 320, the other arm of which is suitably pivoted to the rod 284 of the longitudinally reciprocable member of the upper helical cutting device.

It will be apparent that as an incident to rotation of the cam shaft 243 and the action of the cams 292, 293, 306, and 307, the four cutting mechanisms may be simultaneously actuated in the desired synchronized relation to other operations of the mechanism.

*Spring supplying conveyor mechanism*

As already explained, rows of springs are delivered to the spring assembling apparatus by means of a conveyor 1. Said conveyor comprises a pair of endless chains 325 and 326 which travel around driven sprockets 327 and 328 respectively, which are keyed to a shaft 329 constituting a part of the spring assembling apparatus proper, and corresponding sprockets such as represented at 330 (Figure 1) which are suitably supported by means of an upright stand 331. The conveyor chains 325 and 326 cooperate to support individual spring pockets or spring holders 332. Each of the spring holders 332 comprises a pair of oppositely facing C-shaped sheet metal members, each having a lower leg extending inwardly of the pocket of which it forms a part, secured to transversely aligned elongated links of the conveyor chains 325 and 326 (see Figure 24). The upper ends of said C-shaped members are united by means of a cross member 333 so as to hold the members rigidly in spring-holding position as shown. The connecting member 333 is transversely slotted as indicated at 334 and the chain link to which the lower legs of the spring holder parts are secured are similarly slotted as shown at 335. The required springs may be inserted either manually or automatically into the spring holders of the conveyor 1 and, in the case of an inner construction unit wherein there are eleven springs in each row, the conveyor will be advanced intermittently in steps of such length that a row of eleven springs will be brought into position in front of the spring assembling apparatus for delivery from the conveyor to the assembling apparatus.

In the present embodiment of the invention, the springs are inserted by hand into the conveyor pockets. The conveyor has only a very short rest period while the springs are being transferred therefrom to the assembling mechanism. Hence the springs are inserted while the conveyor is travelling to deliver a row of springs to the transfer point.

To facilitate the operation of inserting the springs in the conveyor pockets or holders, there are provided shelves 357 and 358 respectively (see Figs. 2 and 25a) on opposite sides of that portion of the upper reach of the conveyor which is beyond the assembling mechanism proper. Such shelves are suitably mounted on a table strip 359 which underlies and supports the conveyor.

Workmen standing on opposite sides of the conveyor place springs in the conveyor pockets one by one by placing each spring on the shelf 357 or 358, compressing the spring and moving it laterally into a selected pocket while the conveyor continues to travel. The shelves 357 and 358 are so positioned that the compressed springs may be slid sidewise from the shelves into the pockets.

To automatically force the springs into the pockets (in the event that the workmen insert the springs only partially), there are provided stationary guide or cam plates 483 and 484 (Fig. 25a) on opposite sides of the conveyor.

The conveyor is actuated step by step by means of a pair of cams 336 and 337 which are keyed to the main cam shaft 243. The cam 336 acts against a roller carried by an arm 338 (see Figures 24, 28, 29, 30 and 31) and the cam 337 acts against a roller carried by the arm 339. The arms 338 and 339 are each pivotally mounted at one end as indicated at 340 in a suitable supporting bracket structure and their free ends are connected respectively to the ends of a chain 341 which engages a sprocket 342 rotatably mounted on the shaft 329. Said sprocket 342 has connected to or formed integrally with it, an arm 343 which carries a pawl 344, the front end of which is operative to drivingly engage a shoulder 345 formed in a disk-like element 346, the latter being keyed or otherwise secured to the shaft 329 which carries the conveyor chain sprockets 327 and 328. By examination of Figure 28, it will be seen that incident to the opposed rocking movement of the arms 338 and 339, the chain 341 will transmit to the sprocket 342 an oscillating movement. Movement of the sprocket 342 in one direction will be transmitted through the pawl 344 to the shaft 329 so as to correspondingly drive the conveyor chain sprockets 327 and 328. The movement imparted to the chain 341 is of course of such an extent that the movement imparted to the conveyor sprockets 327 and 328 will be sufficient to advance the spring-carrying conveyor a distance equal to the length of a row of springs. On reverse movement of the sprocket 342 and pawl 344, the pawl 344 will of course move freely around the periphery of the disk 346 and will come to rest with its front end in position for re-engagement with the shoulder 345 upon the next advancing movement of the sprocket 342. The chain 341 is guided intermediate the sprocket 342 and the ends of the arms 338 and 339 by means of suitable guide wheels or sprockets such as indicated at 347, the latter being suitably mounted on the frame structure or brackets carried thereby.

For holding the conveyor in fixed position when the springs are to be moved from the conveyor into the spring assembling mechanism, there is provided a locking bar 348 which is longitudinally slidably mounted in a suitable bracket or like part carried by the frame structure. One end of said locking bar is operative to enter between a pair of stop lugs 349 formed on the adjacent side of the sprocket 328 to thereby prevent rotation of the latter. The locking bar 348 is automatically actuated by means of a cam 350 which is carried by the main cam shaft 243. Said cam 350 acts against a roller carried by the free end of an arm 351 which is secured to a shaft 352. Said shaft 352 is suitably journaled in the frame structure and has secured to another portion thereof an arm 353 which has its upper end disposed in engagement with a roller 354 carried by the outer end of the locking bar 348. A spring 355 stretched between pins respectively carried by the frame structure and the locking bar serves to normally urge the locking bar into locking engagement with the sprocket 328. The cam 350 serves to rock the arms 351 and 353 in a counter-clockwise direction (as seen in Figure 30), so as to cause the arm 353 to withdraw the locking bar when movement of the sprocket 328 is to be initiated.

As shown in Figure 31, the cam shaft 343 and the cams thereon are in a partially advanced position. The shaft 343 is caused to make one complete rotation for each cycle of operation and it will be understood that upon the completion of one cycle of operation, the cam 350 will come to rest in such a position that the locking bar 348 will be caused to engage the stops 349 of the sprocket 328.

*Transfer of springs from conveyor to holding jaws*

The means for advancing a row of springs from the spring conveyor 1 into position for being united to a previously inserted row, comprises a reciprocated spring pushing arrangement which is actuated by cams carried by the cam shaft 243. The spring row feeding or pushing structure is best shown in Figures 24, 24a, 25, 25a, 27, 28, 32, 36 and 37.

As seen in the last mentioned figures, the spring feeding mechanism comprises a bar 360 which is provided at its ends with suitable brackets 361 having outwardly faced channel formations slidably engaging elongated supporting bars 362 which are fixedly mounted on the frame structure through the agency of suitable frame brackets as shown. The bar 360 is movable toward and from the row of springs carried into predetermined position by the spring conveyor 1. Individual spring pushers are carried by the bar 360 and each comprises a base member 363 rigidly but detachably secured at its rear or outer end to the bar 360.

When the mechanism is to be employed for making spring units of twin bed size, i. e., employing eight instead of eleven springs in each row, the three pushers at the righthand side of the mechanism (Fig. 24a) are removed so that only the remaining eight pushers will operate to feed a row of only eight springs.

The front end of each base 363 is provided with an upstanding arm 364. The upper ends of some of the upstanding arms 364 are provided with sidewise offset spring knot-engaging fingers 365 disposed at one side of the upright part 364 and other uprights 364 have similar spring knot-engaging elements 365 offset to the other side of the upright. Also, certain of the uprights have spring knot-engaging fingers 366 offset to one side or the other from the lower end of the upright (see Figure 36). The purpose of the offset knot-engaging portions 365 and 366 is to effect delivery of the springs into position for uniting to other springs with the knots of the connected springs disposed in a predetermined, substantially uniform arrangement.

One selected disposition of the knots is indicated diagrammatically in Figure 2 where the knots are designated X.

As nearly as practicable, the springs S are formed so that their terminal coil knots X are disposed in approximately vertical alignment at the same side of the spring. When the springs are first placed in the spring conveyor pockets, they are so placed that the knots of a row of springs will be disposed approximately in the selected arrangement which may be as indicated in Figure 2 or otherwise. In any event, it is desirable that the knots be so disposed that they will not interfere with the progress of a helix which is to be threaded around the terminal coils of the springs to unite adjacent spring rows. The knot-engaging fingers 365 and 366 on the spring-feeding uprights 364, serve to automatically adjust the springs so as to quite accurately position the knots in the desired arrangement.

The knot-engaging fingers 365 and 366 are preferably so arranged that they will engage the knots of a spring between the terminal and adjacent coils thereof substantially as illustrated in Figure 35. The upper coil knot would be engaged in the case of the spring shown in Figure 35, the turning effect of the upper knot engagement being sufficient for the purpose indicated. However, as to the next spring in the row, i. e., the spring having knots disposed adjacent the knots of the spring shown in Figure 35, the knot-engaging finger would be a lower finger 366 (see Figure 24a) which would have access to the lower coil knot intermediate the two lowermost coils of the spring, substantially in the same relationship as is illustrated in respect of the finger 365 and the two uppermost coils of the spring in Figure 35.

Upon inward movement of the bar 360 and the spring-engaging uprights 364, the upper and lower end portion of each member 364 is operative to engage the adjacent portion of the top and bottom coils of respective springs S. The grooves 334 and 335 previously referred to, provide clearance for the free passage of the end portions of the spring-feeding pushers.

The fingers 365 and 366 are made of flexible metal so as to permit the fingers to flex with the springs upon expansion (or contraction) thereof incident to movement of the springs from the conveyor to the assembling mechanism.

Movement of the spring-feeding pushers is effected by means of a shaft 367 which is oscillated by means presently to be described. The shaft 367 is suitably journaled in the frame structure and is provided near each end with a spur gear 368 which meshes with a rack bar 369 secured to the reciprocating pusher end members 361 (see Figure 32). The shaft 367 is oscillated by means of a pair of cams 370 and 371 which respectively act against rollers carried by arms 372 and 373. The cams 370 and 371 are so formed that they will cooperate to positively effect movement of the chain 375 alternately in opposite directions, thereby to impart alternately oppositely directed rotation to the shaft 367. A cover or guard plate 322 is provided for the shaft 367 and adjacent parts.

The extent of feed movement of the pushers is such that the new row of springs is fed to such a position that the leading portions of the upper and lower coil thereof (which are to be united to adjacent, rearward coil portions of a previously delivered row of springs) will be disposed in front of the front or advancing ends of the jaws 201 so that said jaws will be operative to engage and, in cooperation with its complementary jaw 202, hold said coil portions in operative relation to the helix guide tracks 198 (or 198a) as illustrated in Figure 37. When the springs emerge from the conveyor pockets, they expand slightly so that the upper and lower coils thereof will be disposed in proper position for engagement by the front ends of the jaws 201.

*Displacement of helices and connected springs from guide channels and holding jaws*

After a helix has been threaded about the adjoining portions of the newly delivered row of springs and the previously delivered row and after the cut-off mechanisms have operated, the helix connected coils of the springs are displaced from the helix guide channels to a position above (or below) the holding jaws. This displacement is effected preparatory to and as a part of the next step of movement of the connected spring rows.

For that purpose, there are provided a series of fingers 377, there being one such finger for each coil in the row. The fingers 377 are mounted on cross bars, such as 378, and the free ends of the fingers are equipped with teeth or hooks 379 and 380. During the time that the helices are being fed endwise and threaded around jaw-held spring coil portions, the fingers 377 are moved rearwardly, that is to say from an advanced position substantially as shown in Fig. 37 towards the jaws. The fingers enter the slots 356 in the jaws 202 and pass under the helix during a portion of the opening movement of the jaws. The track 198 is provided with a notch 381 which permits the fingers 377 to pass under the helix while the latter is in position on said track.

When the jaws are opened, the hooked fingers 377 raise from the position illustrated in Fig. 48 to lift the helix and spring coils from the track 198 and above the plane of the top surfaces of the jaws 202. This is effected by rocking the bar 378 about its axis so as to move the hooked ends of the fingers laterally in the direction indicated. The hooked fingers 377 are illustrated in the latter described position in Figure 53.

The hooked fingers are then advanced to effect the desired forward movement of the connected spring rows so as to make room for an incoming new row of springs. The hooked fingers 377 are not alone relied upon for actually moving the connected springs forwardly, although they may to some extent advance the springs. Other means presently to be described are provided for exerting the main force for advancing the connected spring rows. The hooks 379 and 380 are adapted to hook around the lower row coil portion, as clearly shown in Figure 48, so as to be able to exert the said advancing effect on the connected springs and provision of the hook 380 is, in effect, a safety measure for the purpose of catching the spring coil in the event that the first hook 379 should for any reason fail to do so.

The fingers 377 are rocked in the manner already explained incident to rocking of the cross bars 378 which are journaled near their ends in a bracket element 382 which is slidably mounted on a relatively stationary shaft 383, the latter being suitably mounted in the frame structure or brackets carried thereby.

For rocking the bar 378, there is provided a pair of cams 384 and 385 which are carried by the main cam shaft 243. The cam 384 acts against a roller carried by one end of an arm 386 which is pivotally mounted intermediate its ends as indicated at 387, and the cam 385 acts against a roller carried by the other end of said arm 386. One end of said arm 386 is connected by means of an adjustable link 388 to an arm 389 which extends from and is secured to the lowermost cross bar 378. The cams 384 and 385 are so formed that the arm 386 will be positively rocked and the link 388 will serve to transmit such rocking movement to the lowermost cross bar 378 and to the fingers 377. Corresponding but oppositely directed movement of the upper cross bar 378 and fingers 377 is effected by means of a pair of arms 390 extending from the cross bars 378 and interconnected by a link 391. The rocking movement thus imparted to the fingers 377 serves as already indicated, to move the helices out of the channel-like helical guide tracks, the coil springs being incidentally somewhat compressed.

The bracket 382 in which the finger-carrying cross bars 378 are journaled are next advanced along the supporting bars 383. For this purpose there are provided a pair of cams 392 and 393 also carried by the main cam shaft 243. Said cams 392 and 393 act against rolls carried by the opposite ends of an arm 394 which is mounted intermediate its ends on a suitably journaled shaft 395 (see Figures 26, 53, 53a and 58). At its opposite ends, the shaft 395 has secured to it upwardly extending arms 396 which are connected by means of suitable links such as 394, to the respective slidable brackets 382. The cams 392 and 393 are of course so formed that they will effect the desired reciprocating movement of the slide bracket 382 and the rockable fingers 377 carried thereby. Such sliding movement is timed to cooperate with other means for also feeding the connected spring structure, such other means being, however, operative only after the connected spring structure comprises four or five connected rows of springs. Until that many spring rows have been interconnected, the fingers 377 adequately serve the purpose of both releasing the helices from the helical guide tracks and advancing the connected spring rows as already explained.

*Guides for the connected springs*

As best shown in Figure 37, the coil springs S are supported between the upper and lower fingers 377 during the course of their movement from the helical guide tracks. They are further guided by means of guide arms 398 which are also carried by the transverse rock bars 378. The guides 398 may be in the form of continuous flange structures or they may be in the form of fingers, more or less in continuation of the fingers 377. From between the upper and lower guide arms 398, the connected coil springs are delivered between upper and lower stationary guides 399. Such guides are preferably located in line with transversely aligned springs as will appear from Figs. 25 and 26. The upper and lower guides are so spaced from each other that the spring construction unit will be somewhat compressed as shown.

The fingers 377, guide arms 398, and stationary guides 399 are preferably so formed that they will bear against portions of the upper and lower spring coils intermediate turns of the connecting helices. For this purpose, the fingers 377 and arms 398 are provided with relatively thin or narrow rib-like projections 377a and 398a respectively. This relationship between the finger 377 and the springs is indicated in dotted lines in Fig. 48. The stationary guides 399 are in the form of pairs of spaced bars positioned on edge on opposite sides of conveyor chains 402 which will presently be described (see Figs. 25 and 26) and single bars on edge at the opposite sides of the mechanism. By thus guiding the structure without engaging the helices, the latter will not be turned as an incident to the advancing of the spring construction. In other words, the helices will not be caused to act as rollers on which to roll the spring construction forward.

The upper and lower guides 399 are supported adjacent their front ends through the agency of suitable brackets which are connected to transversely extending angle iron frame members 400 and at their rear ends said members 399 are supported by connection to other angle iron frame members 401 (see Figures 25, 25a, 32, and 37).

Feed of the connected springs

The means for feeding the spring construction unit after it has been built up to include, say five or six rows of coil springs, comprises cooperating pairs of upper and lower endless chains 402 and 403. The upper chains 402 are supported by suitable sprockets supported by front and rear shafts 404 and 405 respectively, all of the sprockets being preferably fastened on the shafts so as to rotate in unison therewith. The lower chains 403 are similarly supported by means of suitable sprockets carried by shafts 406 and 407. The shafts 404, 405, 406 and 407 are journaled at their opposite ends in suitable bearings provided in the side frames of the apparatus, as best shown in Figures 25, 25a, 26, 27, and 32.

The chains 402 and 403 are each provided with a series of special links 408 having toothed formation whereby said links are adapted to embrace the helically connected spring coil portions, as clearly shown in Figures 54, 56 and 57. It should be observed that the links 408 are of relatively thin material which will engage the spring coil portions intermediate adjacent turns of the helical. Incident to the compression of the coil springs between the upper and lower feed chains 402 and 403, the terminal coils of the springs will of course be resiliently urged into place in the toothed links 408 so that feeding movement of the chains will be effective to simultaneously move the spring construction in unison with the movement of the chains.

The chains 402 and 403 are driven step by step in unison as an incident to power applied to the shaft 406, as in the manner presently to be explained and incident to an interconnecting train of gears between the shafts 405 and 407. The latter train of gears comprises a gear 409 secured to the shaft 407, an idler gear 410 meshing with said gear 409, an idler gear 411 meshing with the gear 410 and a gear 412 secured to the shaft 405 and meshing with the gear 411 (see Figures 26 and 37).

Driving power is applied to the shaft 406 through the agency of a pawl and ratchet mechanism which is actuated by suitable cams carried by the main cam shaft 243. The pawl and ratchet mechanism is best shown in Figures 54, 55, 57 and 57a. The ratchet embodies two disk-like portions 413 and 414, the same being integrally or otherwise rigidly connected together and keyed to the shaft 406. The ratchet disk 413 is provided with a series of teeth 415 and the ratchet disk 414 is provided with an oppositely facing series of teeth 416. Intermediate the ratchet disks 413 and 414, there is an arm 417, the same being suitably mounted for rocking movement about the axis of the shaft 406. At its outer end, the arm 417 has pivotally mounted on it, a pair of dogs 418 and 419, the dog 418 being adapted to engage the teeth 415 of the ratchet disk 413 and the dog 419 being adapted to engage the ratchet teeth 416. A suitable leaf spring embodying separate prongs 420 and 421 is secured to the arm 417 in such a way that its prongs engage and yieldingly hold the pawls 418 and 419 in operative engagement with the ratchets 413 and 414.

Rocking movement is imparted to the arm 417 by means of a link 422, one end of which is connected to the arm 417 as indicated at 423, the other end of the link being connected as indicated at 424 to the free end of an arm 425 which is mounted on and keyed to a sleeve 426 on the shaft 395.

The sleeve 426 and said arm 425 are rocked by means of a pair of cams 427 and 428 which respectively engage suitable rollers carried by the opposite ends of an arm 429 which is mounted intermediate its ends on said sleeve 426 and keyed thereto. The cams 427 and 428 are keyed to the main cam shaft 243 and are so shaped that they will effect rocking movement of the sleeve 426 to the extent required for rocking the arm 417 and the pawls carried thereby to effect the desired feeding of the spring conveying chains 402 and 403.

The pawl 418 is provided with a roller 430 which engages a stationary cam plate 431. Said cam plate 431 is adjustably mounted on a suitable flanged bracket 432 which is in turn secured to one of the side frames of the apparatus as best shown in Figure 58.

Upon the completion of the helical cutting operations and at about the same time that the hooked fingers 377 begin their forward movement to feed the spring construction forwardly, the cams 427 and 428 cause corresponding forward movement of the conveyor chains 402 and 403, such movement being imparted thereto by the pawl 419 being in operating engagement with the teeth of the ratchet 413. Simultaneously with such advancing of the spring construction, a new row of springs is of course being fed into place for the next helical-tying operation. In order that the last row of springs advanced by the cooperative action of the hooked fingers 377 and conveyor chains 402 and 403 may be accurately positioned with respect to the helical guides 198 and 198a and in order to facilitate the proper operation of the jaws 202, the conveyor chains 402 and 403 are actuated so as to feed the spring construction forwardly to such an extent that the rearmost top and bottom coil portions of the last row of springs in the constructin will pass the helical guides 198 and 198a. Thereupon the conveyors 402 and 403 are caused to travel in a reverse direction for a short distance in substantial synchronism with the movement of the jaws 202 to operative spring coil-clamping position. By such movement the rear jaws 202 are relieved of the necessity of pulling the entire weight of the spring construction unit rearwardly and the principal functions of the jaws are hence more efficiently performed.

For effecting the said reverse or rearward movement of the conveyor chains 402 and 403, the cams 427 and 428 are so shaped that after effecting the desired extent of forward movement in the conveyor chains 402 and 403, reverse rocking motion is imparted to the sleeve 426 and to the pawl-carrying arm 417. Thereupon the dog 418, acting through one of the ratchet teeth 416 will impart the desired rearward or reverse movement to the said conveyor chains. The extent of such rearward movement may of course be determined by the cams 427 and 428 but to facilitate adjustment thereof, the operative engagement of the dog 418 with the ratchet 414 is controlled by the cam 431.

In Figure 54, the pawls 418 and 419 are shown substantially to the limit of their advance movement, having just completed one step of forward movement of the conveyor chains 402 and 403. As shown in Figure 54, the roller 430 of the pawl 418 is disposed adjacent a recessed or low portion of the cam 431 with the front end of the dog in engagement with one of the teeth of the reverse motion ratchet 414. Upon reverse movement of the pawl-carrying arm 417, the pawl 418 will then be operative to impart reverse movement to the chains 402 and 403. The operative engagement of the pawl or dog 418 is, however, of limited duration owing to the cam 431 which is so shaped that, acting through the roller 430, it will throw the pawl 418 out of operative engagement with the ratchet 414 and permit continued reverse movement of the pawl-carrying arm 417 to initial position substantially as shown in Figure 57, without effecting any further reverse movement of said conveyor chains. The cam 431 is so mounted that it may be adjusted circumferentially of the ratchet members 413 and 414 to thereby permit accurate adjustment of the extent and timing of the reverse movement of the conveyor chains 402 and 403.

For preventing overrunning of the conveyors 402 and 403, that is to say, to provide for prompt stopping of the movement of the conveyors 402 and 403, a friction brake acting on the shaft 406 is provided. Such brake means is best shown in Figures 26, 58 and 59, and comprises a normally stationary arm 433 secured at its lower end to a frame bracket or post 434. The upper end of said arm 433 extends over the shaft 406 and is suitably recessed and lined to frictionally resist rotation of the shaft 406. A member 435 is hinged as shown at 436 to the stationary member 433 and is resiliently urged by suitable spring means, such as indicated at 437, to move toward the stationary shaft-engaging portion of the arm 433. Said hinged member 435 is also suitably recessed and lined to frictionally engage and resist rotation of the shaft 406. The braking action of the structure shown in Figure 59 need not be so great as to materially resist normal operation of the mechanism but it should be sufficient to prevent continuation of normal movements of the conveyor structure as an incident to momentum.

Helix end flattening and closing

For the purpose of preventing displacement of the helices from the springs (which might occur by rotation of the helices incident to flexing of the bed spring or other causes) the end portions of the helical are flattened or crimped to an oval shape snugly embracing the overlapped and connected coil portions. The flattened or crimped helical portions are then deformed to the oval condition indicated at 438 in Figure 64 with the result that the helix will not readily rotate around the overlapped and connected spring coil portions. In addition the end turns of the helix are closed up as best shown at 439 in Figure 65. The helical crimping and end closing operations are performed during the time that the inner construction unit remains stationary after having been retracted slightly as already explained. The mechanism for effecting the crimping and closing operations may be seen in Figures 26, 32, 54, 58, 60, and 61 to 67 inclusive.

Said crimping and closing mechanism comprises relatively stationary upper and lower anvils 440 and 441 respectively, there being a pair of such anvils at each side of the apparatus for crimping both ends of each of the upper and lower helices. It will accordingly be understood that the following explanation particularly referring to the mechanism at one side, also is applicable to similar mechanism at the other side. Upper and lower hammers 442 and 443 are provided for respectively cooperating with the said anvils to crimp or flatten between them interposed end portions of the helix. The hammers 442 and 443 are carried by arms 444 and 445 which are pivotally mounted as indicated at 446 and 447 respectively on suitable ears or lugs provided for that purpose and formed on the adjacent end of a slide plate 448. Said slide plate 448 is mounted for in and out sliding movement in a suitable guideway formed in a mounting member 449 which is bolted or otherwise rigidly secured to the supporting framework of the apparatus. It should be observed that in order to permit advancing of the spring construction step by step as additional rows of springs are united to the construction, the hammers 442 and 443 must be moved to an out-of-the-way or retracted position substantially as illustrated in Figure 61. However, for the purpose of cooperating with the stationary anvils 440 and 441, the said hammers must be moved inwardly into alignment with said hammers and then moved toward the same. Accordingly, the hammers are pivotally carried by the inwardly and outwardly slidable plate 448.

For moving the hammers 442 and 443 toward the stationary anvils 440 and 441 respectively, there is provided another slidable mounted member 450, the same being slidably mounted in the slidable plate 448 so as to be initially movable with said plate 448. At its inner end, the slide 450 is forked and has pivotally mounted in its forked end a pair of rollers 451 and 452. Said rollers 451 and 452 respectively engage the adjacent faces 453 and 454 of the hammers 442 and 443 and are adapted, upon moving from recessed portions of said faces, such as indicated at 455 and 456, to spread said hammers or, in other words, to move the respective hammers toward the anvils 440 and 441 with sufficient force to effect the crimping or flattening of the helices. The hammers 442 and 443 are resiliently held against the rollers 451 and 452 by means of coil springs 457 which are stretched between pins extending from the arms of said hammers.

The slide members 448 and 450 are actuated by means of a pair of cams 458 and 459 carried by the cam shaft 243. Said cams respectively operate against rollers carried by the opposite ends of an arm 460 which is mounted intermediate its ends and keyed to a sleeve 461 which is rotably mounted on the shaft 395 (see Figures 26 and 58). Said sleeve 461 also has mounted on and keyed to it, an arm 462, the lower or free end of which is connected by means of a link 463 to the free end of an arm 464 which is in turn secured to a shaft 465. The shaft 465 is suitably journaled at its ends in bearings carried by the side frames of the apparatus and said shaft has suitably secured to it near each end, an arm such as shown at 466. The arm 466 is connected by means of an adjustable link 467 to the free end of one arm of a bell crank lever 468 which is pivotally mounted as indicated at 469 in a stationary frame or bracket part. The other arm of said bell crank lever 468 has its free end bifurcated and embracing a block 470 which is rockably mounted on a suitable pin 471 which projects laterally from the slide 450. It will be apparent that cams 458 and 459, operating through the connections just explained, will effect rocking movement of the bell crank 468 which is in turn transmitted into reciprocatory sliding movement of the slide 450.

Sliding movement is imparted from the slide 450 to the slide 448 by means of a spring connection, such as is best shown in Figures 25a, 61 and 65. As there shown, the slide 450 has a pin 472 extending outwardly therefrom and a tension spring 473 is connected at one end to said pin 472 and at its other end to a suitable pin 474 which extends endwise and then laterally from a suitable bracket 475 which is secured to the outer end of the slide 448. Said bracket 475 is also provided with a laterally extending portion 476 which carries an adjustable stop screw 477 adapted to engage the outer end of the slide plate mounting member 449. When the bell crank arm 468 is rocked (clockwise as shown in Figure 61) to effect inward movement of the slide 450, such inward movement will be transmitted through the spring 473, the pin 474 and the bracket 475 to the slide 448. The movement so transmitted to the slide 448 is, however, limited by the engagement of the stop screw 477 with the outer end of the stationary mounting member 449. The stop screw 477 is adjusted to permit sufficient inward movement of the slide 448 to position the hammers 442 and 443 in vertical alignment with the anvils 440 and 441. During the inward movement of the hammers, there is of course no movement between the slide 450 and its rollers 451 and 452 relative to the hammers 442 and 443 so that when the hammers arrive in their aligned relation to the anvils, the rollers 451 and 452 and the hammers 442 and 443 remain in the relationship illustrated in Figure 61.

The bell crank 468 is, however, rocked in excess of the amount required to adjust the slide 448 and hammers to their inwardly disposed position and the continued movement of the bell crank 468 effects further inward movement of the slide 450 independently of and relative to the slide 448. Such relatively independent continued movement of the slide 450 is of course permitted by the spring 473 which will then be stretched, since the slide 448 to which the spring is connected remains stationary. Said further inward movement of the slide 450 and rollers 451 and 452 causes said rollers to cam the hammers 442 and 443 upwardly and downwardly respectively into cooperation with the anvils 440 and 441 to thereby effect the helix flattening or crimping operation heretofore explained.

The helix end coil closing operation is performed as an incident to continued inward movement of the slide 450 while the hammers and anvils cooperate to grip and hold the helices stationary. For that purpose the slide 450 is provided with upwardly and downwardly extending ears or lugs 478 and 479 respectively. Helix end closing cups 480 and 481 are respectively adjustably mounted on said ears in substantially co-axial alignment with the upper and lower helices. Said helix closing cups have inwardly tapered recesses, as best shown in Figure 66 which act on the end turns of the helices to compress and close them as shown at 439 in Figure 65. The helix closing cup is provided with diametrically opposed slots such as indicated at 481' for receiving the end coils of the springs connected by the helix upon which the cups 480 are acting (see Figure 67). The operative effect of the cups 480 and 481 may be controlled by adjusting the cups inwardly and outwardly so as to correspondingly increase or decrease the compressive effect thereof on the end turns of the helices.

The hammers 442 and 443 are preferably made of hardened metal or they are at least provided with hardened operative end portions.

Similarly, the anvils 440 and 441 are preferably provided with removable and replaceable hardened face elements as indicated in Figures 61 and 64. As there shown, the removable face portions of the anvils are connected to the respective supporting brackets by means of dovetail connections, and suitable retaining members 482 which are secured by a bolt and nut to the supporting members are provided for preventing displacement of said hardened faces.

Main drive

The main cam shaft 243 is normally driven continuously by an electric motor 485, the shaft of which is equipped with a pulley 486 for receiving a series of belts 487. The belts 487 also engage a main clutch pulley 488 which constitutes the free running part of a clutch, of which the other part is indicated at 489. The clutch part 489 has secured to it a gear 490 which meshes with a gear 491 secured to one end of a counter shaft 492 suitably journaled in a supporting bracket 493 (see Figures 7 and 24). The other end of said counter shaft 492 has secured to it a gear 493 which meshes with a gear 494 carried by the adjacent and overlying end portion of the main cam shaft 243. The clutch comprising the parts 488 and 489 may be of a type which is adapted to be controlled by an axially movable collar 495 which is slidably mounted on the clutch shaft 321 to which the clutch part 489 and gear 490 are secured. The clutch collar 495 is adapted to spread apart arms such as indicated at 496 (Figure 5) to engage the clutch so as to transmit rotation from the motor 485 to the cam shaft 243. Spring mechanism contained within the clutch normally urges the clutch to a disengaged position. The details of the clutch structure are well known and are therefore not herein described.

In addition to the normal spring structure within the clutch for effecting its disengagement, it is normally urged to a disengaged position by means of a tension spring 497 which is stretched between a fixed portion of the base plate or frame structure of the apparatus and the lower end of an arm 498. The arm 498 is pivoted intermediate its ends as shown at 499 to a suitable supporting bracket and the upper end portion of said lever 498 is forked so as to embrace the clutch collar. The ends of the forked portion of the lever 498 carry pins 500 which enter a suitable circumferential groove in the collar 495 to thereby transmit any rocking movement of the lever 498 to the clutch collar.

The last mentioned clutch is adapted to be engaged against the tension of the spring 497 through the agency of an upwardly extending lever 50 which is pivotally mounted near its lower end on an outward extension of the pin 500. Intermediate its ends, the lever 501 carries a pin 502 which enters a slot 503 provided in the upper end portion of an extension of one side of the clutch collar-embracing yoke. It will be observed that when the lever 501 is moved to the right (Figure 21), the pin 502 will come into engagement with the right-hand end of the slot 503 in the upper end of the yoke lever 498 and will thereupon be operative to rock the lever 498 clockwise against the tension of the spring 497 to thereby shift the clutch collar 495 so as to engage the clutch.

The clutch is adapted to be locked in engaged position by means of a latch lever 504 which is pivotally mounted intermediate its ends on an appropriately provided supporting element, one end of the latch being provided with a shoulder 505 adapted to engage with a flattened side of an extension of the pin 500 so as to prevent outward or releasing movement of the clutch collar 495 under the influence of the spring 497. A spring 506 stretched between the other end of the latch lever 504 and a conveniently located supporting part serves to yieldingly hold the latch 504 in clutch locking position. A solenoid 507 is connected into the electrical control circuit shown in Figure 23 and it has its plunger pivotally connected to the latch arm 504 so that when the circuit is energized, the latch arm will be electrically disengaged from the pin 500 to thereby permit the spring 497 to disengage the clutch. Hence when the electrical circuit shown in Figure 23 is energized to effect disengagement of the coiler mechanism operating clutches, the cam shaft driving clutch will also be disengaged. As soon as the mechanism is again made ready for operation, the main cam shaft clutch and either one or both of the coiler mechanism clutches may again be engaged.

The clutch may also be manually disengaged. For that purpose the lever 501 is provided with a laterally extending end portion 508 which carries a pin 509 extending into overlying relation to the latch arm 504. By rocking the lever 501 counter-clockwise (in Figure 21) the pin 509 will be caused to move downwardly and to thereby move the latch arm 504 downwardly to effect disengagement of the clutch as mentioned.

Manual control of the cam shaft clutch 488—489 from adjacent the front of the coiler mechanism may be facilitated by the provision of a lever 510 connected at one end by a link 511 to the upper end of the lever 501. The lever 510 is pivotally mounted intermediate its ends as indicated at 512 on a bracket or other part provided for that purpose and said lever may extend forwardly from its pivot 512 to a position in the front of the coiler mechanism as is best illustrated in Figures 3 and 6.

Automatic starting of wire feed and helix-forming mechanism

It will be recalled that the operation of the coiler mechanism is automatically stopped by means of cam lugs such as 116 on chains 101 and 124, or cam lugs such as 123 on chains 118 and 125 (Figure 5). For automatically initiating operation of the coiler mechanism when a new row of springs has been delivered and clamped by the jaws 201 and 202 in position for receiving the helix, there is provided a cam 513 on the cam shaft 243. (See Figures 7, 30 and 69). Said cam 513 acts against a roller carried by one end of an arm 514 which is pivotally mounted intermediate its ends on a shaft 515 suitably supported by a bracket provided for that purpose. The other end of said arm 514 is connected to one end of a chain 516. Said chain 516 is guided around a suitable idler roll 517 and is connected to a pair of chains 518 and 519 (see Fig. 5). The chain 518 extends around a suitably supported guide roll 520 and then upwardly to have its other end connected to the lever 66 (see Figs. 4 and 5) which is pulled downwardly to engage one of the coiler mechanism clutches. The other chain 519 is guided around a suitable idler roll 521 and then upwardly to have its other end connected to the other clutch-operating arm 66 (see Figs. 4, 5 and 6).

Main drive braking mechanism and provision for manual operation of main drive The clutch shaft 321 through which the main cam shaft 243 of the spring assembling mechanism is driven is extended and provided with a hand wheel 522 to facilitate manual operation of the apparatus for the making of various adjustments and other purposes. A braking mechanism is provided for quickly stopping said shaft 321 when the clutch 488—489 is disengaged. Said braking mechanism comprises a drum 523 secured to the shaft 321 to rotate therewith and a brake band 524 adapted to grip the periphery of said drum 523. One end of said brake band 523 is fixedly anchored as indicated at 525 to a pin or the like extending from a stationary bearing bracket and the other end of said brake band is suitably connected to the free end of one arm of a bell crank lever 526 which is pivotally mounted intermediate its ends as indicated at 527. The free end of the other arm of said bell crank lever 526 is suitably formed to engage a roller 528 which is carried by an outward extension of the clutch collar-engaging pin 500 at one side of the clutch collar 495. It will be seen that when the clutch collar is adjusted to clutch-disengaging position, the arm 526 will be rocked in such a direction as to tighten the brake band about the brake drum 523 to thereby quickly stop the rotation of the clutch shaft 321.

Manual adjustment of the apparatus through the agency of the hand wheel 522 is of course effected only when the clutch 488—489 is disengaged. Accordingly, provision is made for releasing the brake band 524 to permit manual operation through the agency of said hand wheel 522. For that purpose, the pivot pin 527 on which the brake arm 526 is pivoted is mounted for vertical adjustment whereby, upon upward adjustment of the pivot pin, the brake may be released to the extent required.

One convenient way of so mounting the pivot pin 527 is to construct it as a part of an arm 529 which is in turn pivotally mounted in the supporting brackets on pivots 530 which are disposed in eccentric relation to the pivot shaft 527. A weight 531 on the free end of the arm 529 is provided to normally hold the pivot shaft 527 in its operative position, as illustrated in Figures 5 and 14A. The arm 529 is supported in such operative position by means of a stop pin 532 projecting from the arm in position to engage a stop shoulder 533 provided on a segmental flange 534 formed integrally with or rigidly connected to the pivot pin 530. By inspection of Figure 14A, it will be seen that by manually rocking the lever 529 upwardly around the pivot pin 530 until the stop pin 532 engages another stop shoulder 535 formed on the segmental flange 534, the pivot pin 527 may be rotated through an arc of 180° to thereby adjust its axis upwardly. By so adjusting the pivot pin 527 upwardly, the brake-actuated lever 526 is also adjusted upwardly with a resulting release of the brake band 524. When the mechanism is again to be automatically actuated, the weighted lever 529 is of course again restored to the position illustarted in Figures 5 and 14A to thereby render the brake fully operative.

Automatic disabling of electrical controls

When the coiler mechanism clutches 28 are disengaged by means of the electrical controls, the main cam shaft controlling clutch 488—489 is of course also electrically disengaged inasmuch as the solenoid 507 is incorporated in the circuits of the solenoids 85. In the absence of provision for preventing it, the electrical controls could be so actuated as to attempt to effect stopping of the apparatus at such time as the cam 513 is positively holding the clutches 28 engaged. The cam 513 is so formed that it holds the coiler mechanism clutches 28 engaged only momentarily, the clutch latches 67 becoming immediately operative to hold the clutches in engagement after the cam 513 no longer does so. To prevent operation of the electrical controls or disengaging means during the short interval that the cam 513 holds the clutches 28 in engagement, there is provided on the face of the cam 384 (see Figures 26 and 69) a short cam ledge 536 mounted on one face of the cam 384. Said cam ledge 536 is so disposed as to act against a roller carried by an arm 537 which is connected to an electric switch 538, the latter being suitably supported by a bracket or the like as indicated. When the cam 536 engages the roller on the arm 537, the arm is rocked in such a manner as to open the switch 538. The switch 538 is incorporated in the electrical circuit of the clutch electrical controls in such a manner that when the switch 538 is open, the circuit cannot be completed by any of the switches which are otherwise operative to complete a circuit to actuate either of the coiler mechanism clutches and the cam shaft clutch. As shown in Figure 69, the relationship of the cam ledge 536 on the face of the cam 384 to the cam 513 which automatically engages the clutches 28 is such that when the clutches would be held in engagement by the cam 513, the switch 538 is open and thereby prevents the electrical disengagement of various clutches by the electrical controls provided. The cam 536 and electrical switch 538 are associated with the cam 384 merely by choice and because the cam 384, in the arrangement disclosed, is easily accessible. However, it will be understood that inasmuch as all of the cams on the shaft 243 are in fixed relation to each other, said cam 536 and switch 538 could be associated with any of the other cams and even with the cam 513 if preferred.

Spring row counting and spring construction separation

Provision is also made for automatically preventing the feeding into the spring assembling apparatus of one row of springs after a predetermined number thereof have been delivered. For example, if an inner spring construction unit embodying twenty (20) rows of spring coils are being produced on the apparatus, twenty rows of coils would be successively fed into the assembling apparatus and although another row of springs is carried by the conveyor 1 and held in position for delivery to the assembling apparatus as a twenty-first row, said conveyor is not advanced to bring such twenty-first row of springs into position for delivery to the assembling apparatus. Said twenty-first row, instead of being advanced and fed to the assembling apparatus, becomes the No. 1 row of a succeeding unit. As already indicated, after the twentieth row of springs has been tied to the preceding row, the twenty rows of springs are advanced one step in the assembling apparatus as usual but during that step of movement of the construction unit, no new springs are delivered to the apparatus. Hence on the next operation of the helical-forming mechanism, helices will be delivered and threaded around the rear or trailing portions of the top and bottom coils of the twentieth or rear border row of springs to tie the springs of that row to each other.

For automatically interrupting the feed of a row of springs from the conveyor 1 to the spring assembling apparatus after the delivery of the required number of rows has been effected, a spring-row counting and spring-row feed disabling mechanism is provided.

The spring-row counting and delivery-interrupting mechanism appears in Figures 24, 29 and 30 of the drawings. It comprises a ratchet wheel or disk 539 rotatably mounted on a shaft 540 which is suitably supported in a bracket attached to the frame structure. Said ratchet is provided with twenty-one teeth and it is actuated step by step, one tooth at a time, by a suitable cam 541 carried by the cam shaft 243. Said cam 541 acts against a roller carried by one end of a bell crank lever 542 which is pivotally mounted intermediate its ends on the supporting shaft 515. The free end of the other arm of said bell crank 542 is connected by means of a link 543 to the free end of an arm 544 which is rockably mounted on the shaft 546. Said arm 544 carries a pawl 545 which is resiliently urged into operative engagement with the teeth of the ratchet 539. A tension spring 553 connected between suitable points of the link 543 and the base plate or supporting frame structure of the apparatus serves to resiliently maintain operative engagement between the cam 541 and the roller on the bell crank arm 542, whereby the rocking movement of the arm 544 definitely follows the pattern of the cam 541. The cam 541 is so formed as to rock the arm 544 an extent sufficient to advance the ratchet wheel 539 a distance of one tooth for each rotation of the cam shaft 243. It will of course be understood that each time the cam shaft 243 makes one complete rotation, a row of springs is fed from the conveyor 1 to the spring assembling apparatus and further that the conveyor 1 is advanced the distance required to position another row of springs for subsequent delivery to the spring assembling apparatus.

A cam disk 546 is secured to the ratchet 539 to move therewith and said cam disk is provided with a cam hump 547 which approximately corresponds in its length to the peripheral travel of the disk for each step of movement imparted thereto. The cam disk 546 acts against a roller carried by an arm 548 which is pivotally secured, as indicated at 549, to the supporting frame structure. Said arm 548 is connected by a link 550 to an arm 551. One end of the arm 551 is pivotally secured as shown at 552 to the supporting frame structure and its other end underlies the outer end of the pawl 344.

When the cam 546 moves the arm 548 upwardly, the arm 551 is correspondingly swung upwardly so as to engage the tail of the pawl or dog 344 so as to rock it on its pivot to such an extent that when the pawl 344 is next actuated to advance the conveyor 1, said pawl will be inoperative but will ride idly over the tooth of the ratchet disk 346. This condition occurs at the time that the conveyor 1 would normally be advanced to position a twenty-first row of springs for delivery to the spring assembling apparatus and hence such twenty-first row will not be delivered. Under these conditions the next operation of the spring feeding plunger 364 will be an idle operation since the spring pockets or holders 332 of the conveyor 1 then in operative relation to the spring assembling apparatus would have previously been emptied when the twentieth row of springs was delivered to the spring assembling apparatus.

When the ratchet 539 and cam disk 546 are moved another step, the pawl 344 will of course be restored to its operative relation to the ratchet disk 346 so that after one idle operation, said conveyor-advancing pawl 344 will again be operative.

It will of course be apparent that the reference to the twentieth and twenty-first row of springs is merely by way of example and that the spring row-counting arrangement may be modified by the substitution of ratchet disks, such as 539, embodying other numbers of teeth for the automatic production of inner construction units embodying different numbers of spring rows. Suitable provision should of course be made to effect movement of the ratchet disk 539 to the extent of one tooth for each cycle of operation. Such provision may include a cam 541 embodying an adjustable throw or any other suitable arrangement available to those skilled in the art. In the illustrated construction, a non-adjustable cam 541 is illustrated.

*Operation*

Workmen standing on opposite sides of the right-hand portion of the conveyor 1 as shown in Figure 1, insert springs in the pockets of the conveyor 1. In order to avoid conflict as to which pockets each workman fills, the upper ends thereof may be painted with various colors or otherwise marked to provide a guide for the workmen. For example, the upper ends of some of the pockets might be painted red to designate pockets to be filled from one side of the conveyor by one workman. Other pockets may have their upper ends painted blue to designate certain pockets to be filled by a workman on the other side of the conveyor. Similarly if more than one workman is employed on either side of the conveyor, additional markings may be employed to designate other pockets to be filled by a designated workman. The conveyor 1 is intermittently driven and it is locked in a stationary position for only a short interval of time while the pushers 364 are reciprocated to feed a row of springs from the conveyor to the spring holding jaws which are locked in the receiving end of the spring assembling mechanism proper. The short interval of rest thus required for the conveyor 1 is not sufficient to enable workmen to fill the conveyor pockets with springs and it will therefore be understood that the springs are inserted during the travel of the conveyor, care being exercised by the workman to be sure that all of the pockets are filled so that a complete row of springs will be delivered to the spring assembling mechanism.

When full sized inner spring construction units are being made, each row of springs comprises eleven springs. For the production of a smaller sized unit, such as is employed in the production of twin bed size mattresses, only eight springs are placed in each row.

The apparatus herein described is adapted to the production of inner construction units of both sizes. When the smaller sized units are to be made, three of the eleven pushers 364 are removed so that only eight of them remain and operate to feed a row of eight springs. The conveyor is nevertheless advanced the full length of a row of eleven springs but each time the conveyor comes to a rest position, only eight of an eleven-spring row are fed to the assembling mechanism.

In accordance with size standards heretofore adopted for full and twin size mattresses, and to secure the most desirable spacing of the springs in both sizes of mattresses, the arrangement herein described provides slightly greater spacing between the eighth spring of a row indicated at T (Figure 1) and the ninth spring thereof indicated at Y. As a practical matter, the increase in spacing as indicated in Figure 2 between the springs T and Y as compared with the spacing between other springs in the row, is substantially equal to the pitch of the helix H so that the helix H can easily be guided into encircling relation to all of the coil portions without compressing or stretching the helix. It will also be understood that the spacing of all of the springs is determined by the pitch of the helices H so as to insure free movement of the helices around the spring coil portions and substantially like relationships between each helix and each group of encircled coil portions.

When the mechanism is used for the production of full sized spring construction units, the cam lugs carried by the chains 101 and 124 (Figure 5) are relied upon to stop the operation of the wire feeding and coil mechanism upon the completion of helices of sufficient length to extend across the entire width of the unit. When twin bed size mattress units are being made, the cam lugs carried by the shorter chains 118 and 125 are relied upon for stopping the operation of the wire feed and coiling mechanism upon completion of a correspondingly shortened length of helix.

The driving of the chains 101, 124, 118, and 125 through the agency of ratchets 112 (Figures 5 and 12) is for the purpose of facilitating certain adjustments in the event that some failure of operation interrupts the production of a full length of a helix. For example, if, due to some unpredictable cause, a helix is imperfectly formed so that after perhaps only one-half a length thereof has been completed and delivered to the spring assembling mechanism, the remaining half may be fed into the apparatus by hand so as to complete the tying of the spring rows. Nevertheless it may be that one of the two helices would be completed in the normal manner. Under such circumstances the wire feed for the completed helix would have operated for the full cycle to produce a full length of helix whereas the wire feed mechanism for the interrupted helix would have been stopped (usually automatically by the devices explained) after the production of only a partial length of helix. The result then would be that the cam lugs carried by the chain 124 (for example) would be out of time with the cam lugs carried by the chain 101. Proper timed relation may then be restored simply by manually moving the chain 124 rearwardly (as permitted by the pawl and ratchet drive) until the proper timed relationship is restored. Proper feeding of the helix control chains is thus facilitated. The first operation of the apparatus after readjustment in the manner explained should be an idle operation in respect of the uniting of any spring coils inasmuch as a certain length of helix must be formed to extend from the coiling mechanism to the receiving side cut-off mechanisms. The unused helix thus formed by such idle operation would be laid aside and utilized whenever a portion of a helix must be completed and fed into place by hand as the result of some failure such as already referred to.

When the mechanism is used for the production of small sized spring construction units, the helix coils and closing devices at the righthand side of the assembling mechanism as represented in Figure 1 are idle since the helices do not extend into the zone of operation of the righthand coiling and closing side devices. Similarly the trimming cutters at the righthand side of the mechanism are idle when small sized construction units are being made. When stating that the righthand side devices are idle, it is meant primarily that they do not operate all the helices although they may be driven through their usual movements. However, it will be understood that if preferred, the driving connections for the respective devices may be broken so that the devices would remain stationary and be not actuated.

When the small sized construction units are being made, the righthand or outer ends of the helices may be manually trimmed, crimped and closed with the aid of such tools as may be suitable for that purpose. However supplementary or auxiliary trimming, crimping and closing mechanism may be provided if desired. Such auxiliary mechanism may be mounted on the framework of the apparatus so as to be adjustable from an inoperative or idle position out of the path of travel of a full sized construction unit to an operative position relative to the said outer ends of the helices.

The structure described and the details illustrated in the drawings represent a selected embodiment of the apparatus whereby inner spring construction units and like spring structures or assemblies are produced by an improved method and with considerable speed, economy and general efficiency. Many changes may be made therein while retaining the improved features of the apparatus and method and without departing from the spirit of the invention as defined by the following claims which should be construed as broadly as possible consistent with the state of the art.

I claim:

1. In apparatus for making spring assemblies, means for holding in predetermined position a pair of rows of springs with predetermined coils of the springs of one row in juxtaposed relation to predetermined coils of the springs of the other row, means for feeding a wire helix endwise and rotating the same, means for guiding said helix so as to cause the coils thereof to encircle said juxtaposed coil portions, and means for flattening a turn of said helix adjacent certain of said juxtaposed coil portions to lock the helix against rotation and removal from said coil portions.

2. In apparatus for making spring assemblies, means for holding in predetermined position a pair of rows of springs with predetermined coils of the springs of one row in juxtaposed relation to predetermined coils of the springs of the other row, means for feeding a wire helix endwise and rotating the same, means for guiding said helix so as to cause the coils thereof to encircle said juxtaposed coil portions, and means for flattening a turn of said helix around the encircled coil portions to thereby lock the helix against removal from said coil portions.

3. In apparatus for making spring assemblies, means for holding in predetermined position a pair of rows of springs with predetermined coils of the springs of one row in juxtaposed relation to predetermined coils of the springs of the other row, means for feeding a wire helix endwise and rotating the same, means for guiding said helix so as to cause the coils thereof to encircle said juxtaposed coil portions, and means for flattening certain turns of said helix adjacent said juxtaposed coil portions to thereby prevent rotation and removal of the helix, and means for closing end turns of the helix.

4. In apparatus for making a spring assembly, the combination of a conveyor for delivering a row of springs to a predetermined position, means for receiving said row of springs from said conveyor and operative to hold the same in another predetermined position, means for feeding the row of springs from said conveyor to said receiving means, means for feeding a wire helix endwise and rotating the same about its own axis, means for guiding the helix so as to cause its turns to encircle predetermined coil portions of the springs of said row of springs, and means for feeding said spring row to an advanced position relative to said receiving means to permit delivery of another row of springs to said receiving means and into juxtaposed relation to said first mentioned row of springs, whereby a subsequently fed wire helix will be directed by said guiding means into encircling relation to juxtaposed coil portions of both of said rows of springs to thereby unite the same.

5. Apparatus according to claim 4 wherein there is provided means for automatically advancing said conveyor step by step to deliver successive rows of springs to said predetermined position for delivery to said receiving means.

6. Apparatus according to claim 4 wherein said spring conveyor delivers said spring row in an endwise direction to said predetermined position.

7. Apparatus according to claim 4 wherein said conveyor delivers the spring row in an endwise direction to said predetermined position and wherein there is provided means for automatically actuating said conveyor step by step, each step of movement being such as to deliver a complete row of springs to said predetermined position.

8. Apparatus according to claim 4 wherein there is also provided means for automatically advancing said conveyor step by step so as to deliver a complete row of springs to said predetermined position for each step of movement of the conveyor, means for periodically interrupting the actuation of said conveyor so as to thereby cause a wire helix to be fed so as to encircle only the coil portions of a trailing row of springs of an assembly thereof.

9. Apparatus according to claim 4 wherein said conveyor delivers said rows of springs in an endwise direction to said predetermined position and wherein there is provided means for actuating said conveyor step by step so as to deliver a row of springs for each step of movement of the conveyor, means for automatically periodically interrupting the operation of said conveyor while continuing the normal operations of the apparatus, thereby to cause a wire helix to be fed so as to encircle predetermined coil portions at the rear edge of a trailing row of springs of an assembly thereof and subsequently to cause another wire helix to be fed so as to connect predetermined coil portions at the leading edge of a single row of springs delivered to said receiving means on the first operation of the conveyor after said interruption of the feeding movement thereof.

10. Apparatus for making spring assemblies comprising means for feeding wire helices endwise and rotating the same so as to cause turns thereof to encircle juxtaposed coil portions of the springs of adjacent rows thereof, a pair of endless conveyors adapted to receive between them the spring assembly, means for advancing step by step said conveyors in unison, means for distorting predetermined turns of said helices to lock the same against rotation and removal from the spring assembly, and means carried by said conveyors for positioning the spring assembly and the helices thereof in operative relation to said distorting means.

11. Apparatus for making spring assemblies comprising means for feeding wire helices endwise and rotating the same so as to cause turns thereof to encircle juxtaposed coil portions of the springs of adjacent rows thereof, a pair of endless conveyors adapted to receive between them the spring assembly, means for advancing step by step said conveyors in unison, means for closing the end turns of said helices to lock the same against rotation and removal from the spring assembly, and means carried by said conveyors for positioning the spring assembly and the helices thereof in operative relation to said closing means.

12. Apparatus according to claim 10 wherein said conveyors are provided with means adapted to engage juxtaposed coil portions intermediate turns of said helices for positioning the spring assembly relative to the distorting means.

13. Apparatus according to claim 11, wherein said conveyors are provided with means adapted to engage juxtaposed coil portions intermediate turns of said helices for positioning the spring assembly relative to the closing means.

14. Apparatus for making spring assemblies comprising means for holding a pair of rows of springs in predetermined relationship with coil portions of the springs of one of said rows in predetermined juxtaposition relative to predetermined coil portions of the other row of springs, means for feeding a wire helix endwise and rotating the same, means for guiding said helix so as to cause the helix to encircle said juxtaposed coil portions, conveyor means for advancing the connected spring rows step by step, and means for actuating said conveyor and comprising means for effecting limited reverse movement of the conveyor whereby the connected springs are initially advanced and subsequently moved rearwardly for positioning relative to said helix guiding means.

15. In apparatus of the class described, the combination of means for assembling rows of springs and uniting the same by means of a wire helix threaded around juxtaposed coil portions of the springs of said rows, means for forming the helix, means for guiding the helix from the forming means to said spring assembling means and means associated with said guiding means and adapted to be actuated by the helix wire in the event of failure of normal movement of the helix to stop the operation of said forming mechanism.

16. In apparatus of the class described, the combination of means for assembling rows of coil springs and uniting the same by means of wire helices threaded around juxtaposed portions of the opposite end coils of the springs of said rows, means for simultaneously forming said helices, a pair of guides for conducting the helices from said forming means to said spring assembling means, and means associated with each of said guides and adapted to be actuated by the respective helices in the event of failure of normal movement of the helices along said guides to stop the forming of the helix which has failed to move normally as aforesaid.

17. In apparatus of the class described, the combination of means for assembling rows of coil springs and uniting the same by means of wire helices threaded around juxtaposed portions of the opposite end coils of the springs of said rows, means for simultaneously forming said helices, a source of power for actuating said forming means, driving connections between said source of power and each of said forming means and embodying relatively independent clutches for independently controlling the operation of said forming means, a pair of guides for conducting the helices from said forming means to said assembling means, means associated with each of said guides and adapted to be actuated by the helix conducted by the respective guides in the event of failure of normal movement of the helices along said guides, and connections between said last mentioned means and the respective clutches to effect disengagement thereof so as to stop the forming of the helix which has failed to move normally as aforesaid.

18. Apparatus of the class described comprising means embodying movable members for assembling rows of springs with portions of the opposite end coils of one row of springs juxtaposed to portions of the end coils of the other row of springs, means for guiding wire helices so as to cause the same to encircle said juxtaposed coil portions, thereby to unite said spring rows, clutch controlled means for actuating said movable members, a pair of means for forming said wire helices, a pair of guides for conducting said helices from said forming means to said spring assembling means, relatively independent drives for said pair of forming means and embodying independently operable clutches respectively associated with the drives for said pair of forming means, a pair of devices respectively associated with said guides and adapted to be actuated by the respective helices conducted thereby in the event of failure of normal movement of the respective helices along said guides, and connections between each of said devices and the respective clutches of said forming means and said clutch of the spring assembling means to disengage the clutch of said assembling means and the clutch of the means which formed the helix which actuated one of said devices.

19. In apparatus of the class described, means for forming a wire helix comprising a pair of rolls for feeding the wire to be formed into a helix, means for driving said rolls, clutch means for controlling the transmission of power from said driving means to said feed rolls, a pair of endless chains of different length also driven by said drive means, each of said endless chains being provided with a cam element, means adjustable for engagement selectively by the cam of either of said chains, and means connecting said cam engaging means with said clutch mechanism for effecting disengagement thereof when said cam-engaging means is actuated by the cam of either of said chains.

20. In apparatus of the class described, mechanism for forming a pair of wires into helices, a pair of feed rolls for feeding one of the wires, another pair of feed rolls for feeding the other of said pair of wires, a source of power embodying a drive pulley for driving said wire feed rolls, a pair of relatively independent clutch pulleys respectively connected with said pairs of wire feed rolls, relatively independent belt means for transmitting rotation from said drive pulley to the respective clutch pulleys, and independently operable clutch mechanisms associated with said clutch pulleys for controlling the drive of the respective pairs of wire feed rolls.

21. In apparatus of the class described, mechanism for forming a pair of wires into helices, a pair of feed rolls for feeding one of the wires, another pair of feed rolls for feeding the other of said pair of wires, a source of power embodying a drive pulley for driving said wire feed rolls, a pair of relatively independent clutch pulleys respectively connected with said pairs of wire feed rolls, relatively independent belt means for transmitting rotation from said drive pulley to the respective clutch pulleys, independently operable clutch mechanisms associated with said clutch pulleys for controlling the drive of the respective pairs of wire feed rolls, two pairs of endless chains, one pair being associated with the feed rolls for one wire and the other pair being associated with the feed rolls for the other wire, the chains of said pairs being of different length and mounted for movement through predetermined paths, a cam element carried by each of said chains, a cam-engaging member adjustably mounted so as to be selectively alignable with the chains of the respective pairs for engagement by the cams thereof, and means connecting said arms to the respective clutches of said wire feeding means for disengaging the respective clutches upon actuation of said cam-engaging means by a cam, the different lengths of said conveyor chains serving to facilitate the driving of each of said wire feed means to form wire helices of different lengths.

22. Apparatus of the class described comprising means for holding rows of springs in predetermined position with adjacent portions of predetermined coils of the springs of one row juxtaposed with portions of predetermined coils of the other row, means for conducting a wire helix longitudinally of said rows while the helix is being rotated so as to cause the same to encircle said juxtaposed coil portions to thereby unite said spring rows, a driven cam shaft, a cam on said shaft, means actuated by said cam for advancing said united spring rows, means for feeding a wire endwise and forming the same into said helix, means for driving said wire feed means, a clutch for controlling the transmission of power from said drive means to said wire feed means, another cam on said cam shaft, and means actuated by said last mentioned cam for effecting engagement of said clutch to initiate operation of said wire feed and helix-forming means.

23. Apparatus of the class described comprising means for holding rows of springs in predetermined position with adjacent portions of predetermined coils of the springs of one row juxtaposed with portions of predetermined coils of the other row, means for conducting a wire helix longitudinally of said rows while the helix is being rotated so as to cause the same to encircle said juxtaposed coil portions to thereby unite said spring rows, a driven cam shaft, a cam on said shaft, means actuated by said cam for advancing said united spring rows, means for feeding a wire endwise and forming the same into said helix, means for driving said wire feed means, a clutch for controlling the transmission of power from said drive means to said wire feed means, another cam on said cam shaft, means actuated by said last mentioned cam for effecting engagement of said clutch to initiate operation of said wire feed and helix-forming means, and means driven by said wire feed driving means for automatically effecting disengagement of said clutch to thereby stop the feeding of said wire.

24. Apparatus according to claim 22 wherein there is provided a pair of wire feeding and helix-forming mechanisms respectively controlled by relatively independent clutches and wherein the respective helices are caused to encircle juxtaposed coil portions adjacent opposite ends of the springs and wherein said clutch-actuating cam is operatively connected to both of the wire feeding clutches so as to simultaneously effect engagement thereof, there being also relatively independent means driven by said wire feeding means for effecting disengagement of each of said clutches.

25. Apparatus according to claim 22 wherein there is provided a pair of wire feeding and helix-forming mechanisms respectively controlled by relatively independent clutches and wherein the respective helices are caused to encircle juxtaposed coil portions adjacent opposite ends of the springs and wherein said clutch-actuating cam is operatively connected to both of the wire feeding clutches so as to simultaneously effect engagement thereof, there being also relatively independent means driven by said wire feeding means for effecting disengagement of each of said clutches, and manually operable means for selectivly effecting disengagement of said clutches.

26. Apparatus according to claim 22 wherein there is provided a pair of wire feeding and helix-forming mechanisms respectively controlled by relatively independent clutches and wherein the respective helices are caused to encircle juxtaposed coil portions adjacent opposite ends of the springs and wherein said clutch-actuating cam is operatively connected to both of the wire feeding clutches so as to simultaneously effect engagement thereof, there being also relatively independent means driven by said wire feeding means for effecting disengagement of each of said clutches and a pair of devices adapted to be respectively actuated by the helices formed by said forming mechanism and connected to the respective clutches for disengaging the same in the event of abnormal movement of the respective helices.

27. In apparatus of the class described, movable means for positioning a pair of rows of coil springs in predetermined relationship and for uniting the same by means of a wire helix fed endwise and rotated so as to be threaded around juxtaposed portions of predetermined coils of the springs in each row, means for actuating said movable means embodying clutch mechanism for transmitting power from said actuating means to said movable means and a brake for stopping the operation of said movable means when said clutch is disengaged, and means for automatically engaging said brake when said clutch is disengaged.

28. In apparatus of the class described, movable means for positioning a pair of rows of coil springs in predetermined relationship and for uniting the same by means of a wire helix fed endwise and rotated so as to be threaded around juxtaposed portions of predetermined coils of the springs in each row, means for actuating said movable means embodying clutch mechanism for transmitting power from said actuating means to said movable means and a brake for stopping the operation of said movable means when said clutch is disengaged, means for automatically engaging said brake when said clutch is disengaged, and manually adjustable means for releasing said brake while maintaining said clutch disengaged to permit manual operation of said positioning means.

29. Apparatus according to claim 27 wherein said clutch-disengaging and brake-engaging means comprises an arm which is rocked in a predetermined direction as an incident to disengagement of the clutch, a lever operatively connected to said arm so as to be actuated as an incident to the movement of the latter and connected to the brake for engaging the latter as an incident to movement of said lever, and wherein there is provided means for effecting disengagement of said brake while maintaining said clutch disengaged, said last mentioned means comprising an eccentrically mounted pivot for said lever, and means for rotating said eccentric pivot to adjust the location of the axis thereof.

30. In apparatus of the class described, means for feeding a wire endwise comprising a pair of rolls, means for driving said feed rolls, clutch means for controlling the transmission of power from said driving means to said feed rolls, an endless chain operatively connected to said feed rolls so as to be driven thereby, a cam lug carried by said chain, and means adapted to be actuated by said cam lug and operatively connected to said clutch for effecting disengagement thereof as an incident to engagement of said means by said cam lug.

31. In apparatus of the class described, means for feeding a wire endwise comprising a pair of rolls, means for driving said feed rolls, clutch means for controlling the transmission of power from said driving means to said feed rolls, an endless chain operatively connected to said feed rolls so as to be driven thereby, a cam lug carried by said chain, means adapted to be actuated by said cam lug and operatively connected to said clutch for effecting disengagement thereof as an incident to engagement of said means by said cam lug, said operative connection between said chain and said wire feed clutch comprising a sprocket for driving said chain, a shaft rotatably supporting said sprocket, a rotary member operatively connected to said feed wheel driving means to be thereby driven, and disengageable driving means interconnecting said member and sprocket for effecting rotation of the latter as an incident to the drive of said member, said disengageable driving connection serving to permit adjustment of said chain independently of said driving connection to thereby facilitate setting of the cam lug carried thereby for timing purposes.

32. In apparatus of the class described, means for feeding a wire endwise comprising a pair of rolls, means for driving said feed rolls, clutch means for controlling the transmission of power from said driving means to said feed rolls, an endless chain operatively connected to said feed rolls so as to be driven thereby, a cam lug carried by said chain, means adapted to be actuated by said cam lug and operatively connected to said clutch for effecting disengagement thereof as an incident to engagement of said means by said cam lug, said operative connection between said chain and said wire feed clutch comprising a sprocket for driving said chain, a shaft rotatably supporting said sprocket, a rotary member operatively connected to said feed wheel driving means to be thereby driven, and a one-way driving connection between said member and said sprocket for driving said chain as an incident to the drive of said member, said one-way driving connection being such as to permit free movement of the chain in a reverse direction to thereby facilitate adjustment of the position of the cam lug carried by the chain for timing purposes.

33. Apparatus of the class described comprising means for holding in predetermined relationship a pair of rows of springs, means for forming and delivering to said spring holding means a helix for uniting said spring rows by encirclement of juxtaposed coil portions of said springs, said helix-forming means embodying means for feeding a wire in an endwise direction toward said spring-holding means, means adapted to engage and bend the wire into a helix, and means for mounting said wire-bending means for adjustment toward and from said spring holding means, thereby to facilitate registration of the turns of the helix with said spring holding means and the springs held thereby.

34. In apparatus of the class described, a pair of relatively stationary units of mechanism, one of said units embodying means for positioning a pair of rows of springs with coil portions of the springs in one row juxtaposed to coil portions of the springs in the other row and spirally grooved means for guiding a wire helix into encircling relation to said juxtaposed coil portions as an incident to endwise and rotary movement of the helix, the other of said units embodying means for feeding a wire endwise, means for engaging said wire to bend the same into a helix as an incident to its said movement, and means for adjustably mounting said wire bending means for movement toward and from said spring-holding and helix-guiding means to thereby facilitate registration of the turns of the helix with the grooves of said spirally grooved guide.

35. In apparatus for assembling rows of springs in predetermined relation a conveyor for delivering a row of springs to a position adjacent said spring assembling means, said conveyor comprising a plurality of spring holders operative to hold individual springs under compression, and means movable transversely of said spring holders for engaging the respective springs and feeding the same from said holders to said assembling mechanism.

36. Apparatus of the class described comprising a conveyor for moving a row of springs in an endwise direction into predetermined position, said conveyor embodying a series of frames respectively adapted to receive and hold a spring under compression, and means movable transversely of the conveyor through the respective frames for feeding the springs from the conveyor.

37. Apparatus of the class described comprising means for assembling into predetermined relationship to each other, a pair of rows of spiral wire springs, the ends of the wire of each spring being knotted around a coil portion of the spring, a conveyor for feeding a spring row in an endwise direction into predetermined relationship to said assembling means, said conveyor embodying a series of frames respectively adapted to receive and hold a spiral spring under compression, and means for feeding the springs from said frames to said assembling means with the knots of the springs disposed in predetermined relation to each other.

38. Apparatus of the class described comprising means for assembling into predetermined relationship to each other, a pair of rows of spiral wire springs, the ends of the wire of each spring being knotted around a coil portion of the spring, a conveyor for feeding a spring row in an endwise direction into predetermined relationship to said assembling means, said conveyor embodying a series of frames respectively adapted to receive and hold a spiral spring under compression, and means for feeding the springs from said frames to said assembling means, said feeding means comprising a series of pushers movable transversely through said frames to engage and thereby move the springs from said frames, said pushers having means for engaging the knotted portion of the springs to thereby effect rotary positioning of the respective springs as an incident to the movement thereof from said frames.

39. In apparatus for assembling and uniting rows of coil springs by means of a wire helix, means for holding a pair of rows of springs with coil portions of the springs in one row in predetermined relation to coil portions of the springs in the other row, a track for guiding the wire helix in an endwise direction while being rotated upon its own axis to cause it to wind around said predetermined coil portions, said guiding track comprising a plurality of elongated sections disposed in end-to-end relation and provided with transversely angularly extending grooves matching the pitch and lead of the helix and means for independently mounting said sections to thereby facilitate removal and replacement thereof.

40. In apparatus for assembling and uniting rows of coil springs by means of a wire helix, means for holding a pair of rows of springs with coil portions of the springs in one row in predetermined relation to coil portions of the springs in the other row, a track for guiding the wire helix in an endwise direction while being rotated upon its own axis to cause it to wind around said predetermined coil portions, said guiding track comprising a plurality of elongated sections disposed in end to end relation, side flanges extending upwardly from each of said sections and co-operating therewith to form a channel for the helix, and means for independently mounting each of said flanged sections.

41. In apparatus for assembling and uniting rows of coil springs by means of a wire helix, means for holding a pair of rows of springs with coil portions of the springs in one row in predetermined relation to coil portions of the springs in the other row, a track for guiding the wire helix in an endwise direction while being rotated upon its own axis to cause it to wind around said predetermined coil portions, side flanges extending upwardly on opposite sides of the end portions of each section and rigidly united thereto, said side flanges cooperating with the end portions of said sections to form channels for guiding said helix adjacent the opposite ends of said coil portions, and displaceable means for covering said channeled end portions so as to retain the helix in guiding engagement with said grooved sections.

42. In apparatus for assembling and uniting rows of coil springs by means of a wire helix, means for holding a pair of rows of springs with coil portions of the springs in one row in predetermined relation to coil portions of the springs in the other row, a track for guiding the wire helix in an endwise direction while being rotated upon its own axis to cause it to wind around said predetermined coil portions, side flanges extending upwardly on opposite sides of the end portions of each section and rigidly united thereto, said side flanges cooperating with the end portions of said sections to form channels for guiding said helix adjacent the opposite ends of said coil portions, and displaceable means for covering said flanged end portions so as to retain the helix in guiding engagement with said grooved sections, said spring row assembling means comprising a pair of members which cooperate to hold said coil portions fixedly in said predetermined relation and provide, in effect, continuations of said guide channels.

43. In apparatus of the class described, means for holding adjacent coil portions of a pair of springs disposed side by side in predetermined position to facilitate the threading of a wire helix around such portions, said means comprising a normally stationary track member provided with transversely extending angularly disposed grooves respectively adapted to receive and guide the turns of the helix in an endwise direction when rotated, a pair of jaws respectively disposed on opposite sides of said track member and movable toward and from the same, said jaws having their adjacent ends grooved substantially in continuation of the grooves of said track and provided with seats for engaging and holding said coil portions, one of said jaws having a lip portion adapted to overlie the path of travel of the helix intermediate the adjacent ends of said jaws to thereby cooperate with said grooved jaw ends and said grooved track member to form a closed guideway for the helix around said predetermined spring coil portions.

44. In apparatus of the class described, means for holding adjacent coil portions of a pair of springs disposed side by side in predetermined position to facilitate the threading of a wire helix around such portions, said means comprising a normally stationary track member provided with transversely extending angularly disposed grooves respectively adapted to receive and guide the turns of the helix in an endwise direction when rotated, a pair of jaws respectively disposed on opposite sides of said track member and movable toward and from the same, said jaws having their adjacent ends grooved substantially in continuation of the grooves of said track and provided with seats for engaging and holding said coil portions, one of said jaws having a lip portion adapted to overlie the path of travel of the helix intermediate the adjacent ends of said jaws to thereby cooperate with said grooved jaw ends and said grooved track member to form a closed guideway for the helix around said predetermined spring coil portions, and means for forming closed guideways for said helix on opposite sides of said jaws.

45. In apparatus of the class described, a track provided with transversely extending, angularly disposed grooves for guiding a wire helix in an endwise direction when rotated, a pair of relatively movable jaws on opposite sides of said track, said jaws being movable from initially spaced, open relation to said track to a cooperative, closed position relative to the track, the adjacent ends of said jaws being provided with grooves constituting, in effect, continuations of the grooves of said track, the grooved end of one of said jaws being provided with seats respectively adapted to engage the inside of one spring coil portion and the outside of another spring coil portion to position said spring coil portions in predetermined relationship, and said track having a shoulder cooperating with one of said jaw seats and the other jaw also having a shoulder cooperating with the other of said jaw seats to hold said spring portions in said predetermined relation.

46. In apparatus of the class described, a track provided with transversely extending, angularly disposed grooves for guiding a wire helix in an endwise direction when rotated, a pair of relatively movable jaws on opposite sides of said track, said jaws being movable from initially spaced, open relation to said track to a cooperative, closed position relative to the track, the adjacent ends of said jaws being provided with grooves constituting, in effect, continuations of the grooves of said track, the grooved end of one of said jaws being provided with seats respectively adapted to engage the inside of one spring coil portion and the outside of another spring coil portion to position said spring coil portions in predetermined relationship, said track having a shoulder cooperating with one of said jaw seats and the other jaw also having a shoulder cooperating with the other of said jaw seats to hold said spring portions in said predetermined relation, one of said jaws having a lip portion adapted to overlie said track portion intermediate the jaws when in closed position to thereby cooperate with said track and said grooved jaw ends to form a substantially closed guideway for said helix.

47. In apparatus of the class described, a track provided with transversely extending, angularly disposed grooves for guiding a wire helix in an endwise direction when rotated, a pair of relatively movable jaws on opposite sides of said track, said jaws being movable from initially spaced, open relation to said track to a cooperative, closed position relative to the track, the adjacent ends of said jaws being provided with grooves constituting, in effect, continuations of the grooves of said track, the grooved end of one of said jaws being provided with seats respectively adapted to engage the inside of one spring coil portion and the outside of another spring coil portion to position said spring coil portions in predetermined relationship, said track having a shoulder cooperating with one of said jaw seats and the other jaw also having a shoulder cooperating with the other of said jaw seats to hold said spring portions in said predetermined relation, one of said seats and the shoulder cooperating therewith being formed so as to effect substantial flattening of the coil portion engaged thereby, whereby when said coil portion is permitted to return to normal circular position frictional engagement is resiliently effected with certain turns of the encircling helix.

48. In apparatus for uniting springs disposed side by side by means of a wire helix fed endwise and rotated so as to encircle predetermined juxtaposed coil portions of said springs, means for locking the helix against rotation so as to prevent removal thereof from said coil portions, said means comprising a pair of relatively movable members respectively disposed on opposite sides of the helix portion encircling said juxtaposed coil portions, and means for moving said members toward each other to thereby flatten said helix portion.

49. In apparatus for uniting springs disposed side by side by means of a wire helix fed endwise and rotated so as to encircle predetermined juxtaposed coil portions of said springs, means for locking the helix against rotation so as to prevent removal thereof from said coil portions, said means comprising a normally stationary anvil disposed on one side of the portion of said helix which encircles said juxtaposed spring coil portions, a hammer mounted for movement toward and from said anvil on the opposite side of said helix, and means for moving said hammer toward said anvil to thereby crush or flatten said helix portion.

50. In apparatus for uniting springs disposed side by side by means of a wire helix fed endwise and rotated so as to encircle predetermined juxtaposed end coil portions of said springs, means for locking the helix against rotation so as to prevent removal thereof from said coil portions, said means comprising a normally stationary anvil disposed beyond the united ends of said springs and in overlying relation to a portion of said helix which encircles said juxtaposed end coil portions, a hammer mounted for movement toward and from said anvil for cooperating therewith to flatten said portion of the helix, and means carrying said hammer and movable laterally toward and from said anvil, said laterally movable means being normally disposed in a laterally outwardly offset position with said hammer offset laterally from said anvil, thereby to permit free movement of the united springs past said hammer, means for moving said hammer carrying means inwardly to position said hammer in cooperatively aligned relation to said anvil, and means for moving said hammer toward said anvil when the hammer is in said aligned relation to the anvil.

51. In apparatus for uniting springs disposed side by side by means of a wire helix fed endwise and rotated so as to encircle predetermined juxtaposed end coil portions of said springs, and means for locking the helix against rotation so as to prevent removal thereof from said coil portions, said means comprising a normally stationary anvil disposed outwardly of the united ends of the springs and in overlapping relation to a portion of said helix which encircles said juxtaposed end coil portions, a slidably mounted member movable in the direction of the length of said helix, a hammer pivotally mounted on said slide, said hammer and slide being normally disposed in a laterally offset position relative to said anvil, means for moving said slide and hammer inwardly to align said hammer and anvil, and means for moving said hammer toward said anvil when in said alignment therewith to cooperate with the anvil to flatten said portion of the helix.

52. Apparatus according to claim 51 wherein the means for moving the hammer towards the anvil comprises a part slidably mounted in said slidably mounted member for additional sliding movement in continuation of the inward sliding movement of said slidably mounted member, and wherein the inward sliding movement of said member and part is effected by force applied to said part and transmitted through a spring to said member, there being means for limiting the inward movement of said member so as to position the hammer in said alignment with the anvil, the spring permitting continued movement of said part and the latter being provided with camming engagement with said hammer for moving the latter towards the anvil as an incident to said extended or continued movement of said part.

53. In apparatus of the class described, the combination of means for positioning rows of springs and uniting the top and bottom coils of the springs in one row to the top and bottom coils respectively of the springs in the other row by means of wire helices fed endwise and rotated so as to cause turns thereof to encircle juxtaposed portions of said top and bottom coils, means for feeding the united spring rows laterally, means for flattening turns of the helices which encircle said juxtaposed top and bottom coil portions, said flattening means comprising relatively stationary top and bottom anvils respectively disposed above and below the top and bottom coils of said united spring rows and aligned with said turns of said helices, a member mounted for movement transversely of the direction of feed of said united spring rows, upper and lower hammers respectively pivotally mounted on said member, said hammers being disposed intermediate said upper and lower anvils and respectively adapted to cooperate therewith to flatten said turns of the helices and being normally supported in laterally spaced relation to the path of travel of said united spring rows so as to permit said movement of the latter, a part mounted for movement initially with said member and subsequently independently thereof, means connected to said part for effecting said initial movement of said part and said member, yieldable means for transmitting sliding movement from said part to said member, means for stopping movement of said member so as to position said hammers in operative alignment with said anvils while permitting continued movement of said part, and means carried by said part for moving said hammers toward said anvils as an incident to said continued movement of the part.

54. In apparatus of the class described, the combination of means for positioning rows of springs and uniting the top and bottom coils of the springs in one row to the top and bottom coils respectively of the springs in the other row by means of wire helices fed endwise and rotated so as to cause turns thereof to encircle juxtaposed portions of said top and bottom coils, means for feeding the united spring rows laterally, means for flattening turns of the helices which encircle said juxtaposed top and bottom coil portions, said flattening means comprising relatively stationary top and bottom anvils respectively disposed above and below the top and bottom coils of said united spring rows and aligned with said turns of said helices, a member mounted for sliding movement transversely of the direction of feed of said united spring rows, upper and lower hammers respectively pivotally mounted on said slidable member, said hammers being disposed intermediate said upper and lower anvils and respectively adapted to cooperate therewith to flatten said turns of the helices and being normally supported in laterally spaced relation to the path of travel of said united spring rows so as to permit said movement of the latter, a part slidably mounted in said slidably mounted member for movement initially therewith and subsequently independently thereof, cam means connected to said part for effecting reciprocation thereof, spring means for transmitting inward sliding movement from said part to said member, means for stopping inward movement of said member so as to position said hammers in operative alignment with said anvils while permitting continued movement of said part, and means carried by said part for moving said hammers toward said anvils as an incident to said continued movement of the part.

55. In apparatus of the class described, the combination of means for positioning rows of springs and uniting the top and bottom coils of the springs in one row to the top and bottom coils respectively of the springs in the other row by means of wire helices fed endwise and rotated so as to cause turns thereof to encircle juxtaposed portions of said top and bottom coils, means for feeding the united spring rows laterally, means for flattening turns of the helices which encircle said juxtaposed top and bottom coil portions, said flattening means comprising relatively stationary top and bottom anvils respectively disposed above and below the top and bottom coils of said united spring rows and aligned with said turns of said helices, a member mounted for sliding movement transversely of the direction of feed of said united spring rows, upper and lower hammers respectively pivotally mounted on said slidable member, said hammers being disposed intermediate said upper and lower anvils and respectively adapted to cooperate therewith to flatten said turns of the helices and being normally supported in laterally spaced relation to the path of travel of said united spring rows so as to permit said movement of the latter, a part slidably mounted in said slidably mounted member for movement initially therewith and subsequently independently thereof, cam means connected to said part for effecting reciprocation thereof, spring means for transmitting inward sliding movement from said part to said member, means for stopping inward movement of said member so as to position said hammers in operative alignment with said anvils while permitting continued movement of said part, and means carried by said part for engaging and closing the end turns of said helices as an incident to said continued movement of said part.

56. In apparatus of the class described, means for assembling a pair of rows of springs and uniting the same by means of a wire helix fed endwise and rotated so as to cause the same to encircle juxtaposed portions of the springs in said rows, means for flattening turns of said helix which encircles said juxtaposed coil portions, said means comprising a pair of relatively movable members adapted to be moved, one toward the other to effect said flattening of the helix, and means movable longitudinally of said helix for engaging and closing the free end turns of the same outwardly of said coil-encircling turns, said end closing means being moved inwardly of the helix while the flattened turns thereof are held between said movable members.

57. The method of making a spring assembly which consists in successively feeding rows of spring coils endwise into substantially parallel side by side relationship, feeding a wire helix endwise in the direction of said spring rows while rotating the helix and guiding the same so as to cause it to encircle predetermined juxtaposed coil portions of the springs of a pair of said rows of springs, feeding the united spring rows laterally, and deforming turns of the helix which encircle certain of said predetermined coil portions of springs fed from their helix receiving position so as to prevent further rotation of the helix.

58. The method of making spring assemblies which consists in successively feeding rows of springs endwise to a predetermined position, successively feeding said rows of springs laterally into side-by-side relationship, feeding a wire helix endwise in the direction of said spring rows and rotating and guiding the same so as to cause it to encircle predetermined portions of juxtaposed coils of a pair of mutually adjacent spring rows, advancing the united spring rows laterally step by step, and, after so advancing a united pair of rows and during a period of rest thereof, distorting a portion of said wire helix adjacent an encircled coil portion so as to prevent further rotation of the helix.

59. The method of making spring assemblies which consists in successively feeding rows of springs endwise to a predetermined position and successively feeding such rows laterally to dispose the same in side-by-side relationship, feeding a pair of wire helices endwise in the same direction and longitudinally of said rows of springs while rotating and guiding said helices so as to cause the same to encircle predetermined upper and lower coil portions of the springs of adjacent rows to thereby unite the same.

60. The method of making spring assemblies which consists in feeding rows of springs into side-by-side relationship, feeding a pair of wire helices endwise in the same direction and longitudinally of said rows of springs while rotating and guiding said helices so as to cause the same to encircle predetermined upper and lower coil portions of the springs of adjacent rows to thereby unite the same, advancing the united spring rows laterally step by step, and simultaneously deforming portions of said wire helices which encircle said spring coil portions so as to prevent further rotation of the helices.

61. Apparatus for making inner spring construction units, comprising a plurality of mechanisms for holding a plurality of pairs of spring in predetermined juxtaposition, means for rotating and feeding a helix in an endwise direction, a grooved track for guiding such helix into encircling relation to predetermined portions of said juxtaposed pairs of springs, certain pairs of spring holding mechanisms being spaced from each other and one of said pairs being spaced differently than the others to the extent of the pitch of the helix or hole multiples thereof.

62. Apparatus for making spring construction units embodying rows of coil springs having the bottom coils of the springs of one row connected to the bottom coils of the springs of an adjacent row by means of a helix encircling juxtaposed portions of said bottom coils, means for advancing the connected spring rows, and means for supporting and guiding the connected spring rows comprising guide strips of such width and so disposed as to engage the connected spring coil portions intermediate adjacent turns of the connecting helix, thereby to prevent turning of the helix as an incident to the movement of the connected spring rows.

63. The method of making spring assemblies which consists in successively feeding rows of springs in an endwise direction to a predetermined position, feeding said spring rows laterally from said position to a position alongside another row of springs with predetermined coil portions of said rows of springs in juxtaposed relation, feeding a wire helix in an endwise direction longitudinally of said rows of springs and rotating and guiding the helix so as to cause the same to encircle said juxtaposed coil portions to thereby unite said rows of springs.

EDWARD E. WOLLER.